US010768395B2

(12) United States Patent
Wenren et al.

(10) Patent No.: US 10,768,395 B2
(45) Date of Patent: Sep. 8, 2020

(54) CAMERA LENS ASSEMBLY AND CAMERA DEVICE EQUIPPED WITH CAMERA LENS ASSEMBLY

(71) Applicant: ZHEJIANG SUNNY OPTICAL CO., LTD, Ningbo (CN)

(72) Inventors: Jianke Wenren, Ningbo (CN); Lin Huang, Ningbo (CN); Saifeng Lv, Ningbo (CN)

(73) Assignee: Zhejiang Sunny Optical Co., Ltd. (CN)

( * ) Notice: Subject to any disclaimer, the term of this patent is extended or adjusted under 35 U.S.C. 154(b) by 0 days.

(21) Appl. No.: 15/766,294

(22) PCT Filed: Apr. 20, 2017

(86) PCT No.: PCT/CN2017/081196
§ 371 (c)(1),
(2) Date: Apr. 5, 2018

(87) PCT Pub. No.: WO2018/076630
PCT Pub. Date: May 3, 2018

(65) Prior Publication Data
US 2019/0243093 A1    Aug. 8, 2019

(30) Foreign Application Priority Data
Oct. 28, 2016    (CN) .......................... 2016 1 0963755

(51) Int. Cl.
*G02B 13/00*    (2006.01)
*G02B 9/62*    (2006.01)
(52) U.S. Cl.
CPC ........... *G02B 13/0045* (2013.01); *G02B 9/62* (2013.01)

(58) Field of Classification Search
CPC ....... B01L 2200/025; B01L 2200/0668; B01L 2300/0816; B01L 2300/123;
(Continued)

(56) References Cited

U.S. PATENT DOCUMENTS

2016/0062083 A1    3/2016 Hsueh et al.
2016/0139368 A1*    5/2016 You ..................... G02B 13/0045
359/713

FOREIGN PATENT DOCUMENTS

CN    205333956 U    6/2016
CN    105938238 A    9/2016
(Continued)

OTHER PUBLICATIONS

Chinese Office Action (translated) for Chinese Patent Application No. 201610963755, dated Jun. 11, 2018, 6 pgs.

*Primary Examiner* — Joseph P Martinez
*Assistant Examiner* — Vipin Patel
(74) *Attorney, Agent, or Firm* — Barnes & Thornburg LLP

(57) ABSTRACT

The present application discloses a camera lens assembly and a camera device equipped with the camera lens assembly. The camera lens assembly includes: a first lens, a second lens, a third lens and multiple subsequent lenses arranged in sequence from an object side to an image side along an optical axis. The first lens, the second lens, the third lens and the multiple subsequent lenses jointly form a total effective focal length f, wherein a combined focal length f12 of the first lens and the second lens and a focal length f3 of the third lens satisfy: −0.7<f12/f3<0.

21 Claims, 33 Drawing Sheets

(58) Field of Classification Search
CPC ....... B01L 2400/0427; B01L 2400/043; B01L 3/502715; B01L 3/50273; B01L 3/502761; B01L 3/502792; B01L 3/508; C02F 1/484; G02B 13/0045; G02B 9/62
See application file for complete search history.

(56) References Cited

FOREIGN PATENT DOCUMENTS

| | | |
|---|---|---|
| CN | 106338815 A | 1/2017 |
| KR | 20160107436 A | 9/2016 |
| TW | I548895 B | 9/2016 |

\* cited by examiner

US 10,768,395 B2

CAMERA LENS ASSEMBLY AND CAMERA DEVICE EQUIPPED WITH CAMERA LENS ASSEMBLY

CROSS-REFERENCE TO RELATED APPLICATION

This application is a U.S. national counterpart application of international application serial No. PCT/CN2017/081196 filed Apr. 20, 2017, which claims priority to Chinese Patent Application No. 201610963755.0, filed Oct. 28, 2016. The disclosures of both PCT/CN2017/081196 and Chinese Patent Application No. 201610963755.0 are hereby incorporated by reference.

TECHNICAL FIELD

The present application relates to a camera lens assembly and a camera device equipped with the camera lens assembly.

BACKGROUND

In recent years, with the improvement of the Semiconductor Manufacturing Technology, pixel sizes of photosensitive elements are continuously reduced. Accordingly, a camera lens assembly equipped on an electronic product, such as a mobile phone or a digital camera, gradually develops toward a field of miniaturization and high pixels.

In general, in order to meet requirements of high pixels, a conventional camera lens assembly usually adopts a configuration of a large aperture, resulting in a longer size of a lens assembly, and thus, it is hard to match a high pixel photosensitive chip. Meanwhile, in order to meet requirements of high image quality, there is a certain limit on an increase of a field-of-view angle, which is usually overcome by adding a number of lenses. However, this cannot meet the requirements of miniaturization and lightweighting.

In general, the existing lens assembly is mainly configured with a first positive lens and a second negative lens. For instance, as described in Patent Application No. CN201420702086.8, the configuration makes the lenses have larger focal power at a light entering side, which often causes a larger system sensitivity of the second negative lens, and is not conducive to processing.

Therefore, an optical system that can be applied to portable electronic products and has at least one beneficial effect of high pixels and good image quality and a low sensitivity is required.

SUMMARY

The present application is intended to solve at least some of the above-mentioned technical problems in the existing camera lens assembly.

A camera lens assembly is provided by an implementation according to the present application. The camera lens assembly may include a first lens, a second lens, a third lens and multiple subsequent lenses arranged in sequence from an object side to an image side along an optical axis. The first lens, the second lens, the third lens and the multiple subsequent lenses jointly forma a total effective focal length f. A combined focal length f12 of the first lens and the second lens and a focal length f3 of the third lens satisfy: $-0.7 < f12/f3 < 0$, and may further satisfy, for example, $-0.67 \leq f12/f3 \leq -0.28$.

According to the implementation of the present application, the first lens has positive focal power, and an object-side surface of the first lens is a convex surface; and the second lens has positive focal power, and an object-side surface and image-side surface of the second lens are convex surfaces.

According to the implementation of the present application, the multiple subsequent lenses include a fourth lens, a fifth lens and a sixth lens arranged in sequence from the third lens to the image side. The fifth lens has positive or negative focal power, and an object-side surface of the fifth lens at a position near the axis is a convex surface. The sixth lens has negative focal power, and an image-side surface of the sixth lens at a position near the axis is a concave surface.

According to the implementation of the present application, a combined focal length f56 of the fifth lens and the sixth lens and the total effective focal length f satisfy: $|f/f56| \leq 0.3$, for example, $|f/f56| \leq 0.29$.

According to the implementation of the present application, a center thickness CT2 of the second lens and a center thickness CT5 of the fifth lens satisfy: $0.8 < CT2/CT5 < 1.5$, for example, $0.9 \leq CT2/CT5 \leq 1.33$. An axial spacing T34 between the third lens and the fourth lens and a center thickness CT4 of the fourth lens satisfy: $1.0 < T34/CT4 < 1.5$, for example, $1.04 \leq T34/CT4 \leq 1.29$.

According to the implementation of the present application, a radius of curvature R9 of the object-side surface of the fifth lens and a radius of curvature R12 of the image-side surface of the sixth lens satisfy: $0 < R12/R9 < 0.5$, for example, $0.15 \leq R12/R9 \leq 0.33$.

According to the implementation of the present application, an effective focal length f1 of the first lens satisfies: $0.2 < f/f1 < 0.8$, for example, $0.25 \leq f/f1 \leq 0.75$. A combined focal length f23 of the second lens and the third lens satisfies: $0 < f/f23 < 0.65$, for example, $0.04 \leq f/f23 \leq 0.61$.

According to the implementation of the present application, an axial spacing T23 between the second lens and the third lens and an axial spacing T12 between the first lens and the second lens satisfy: $T23/T12 \leq 0.2$, for example, $T23/T12 \leq 0.18$.

According to the implementation of the present application, a radius of curvature R5 of an object-side surface of the third lens and a radius of curvature R6 of an image-side surface of the third lens satisfy: $0 < (R5-R6)/(R5+R6) < 1.0$, for example, $0.24 \leq (R5-R6)/(R5+R6) \leq 0.73$. An object-side surface of the sixth lens at the position near the axis is a convex surface. A radius of curvature R11 of the object-side surface of the sixth lens and the radius of curvature R12 of the image-side surface of the sixth lens satisfy: $0 < (R11-R12)/(R11+R12) < 0.5$, for example, $0.11 \leq (R11-R12)/(R11+R12) \leq 0.36$. An effective focal length f4 of the fourth lens and an effective focal length f5 satisfy: $|f/f4| + |f/f5| < 1.0$, for example, $|f/f4| + |f/f5| \leq 0.62$.

According to the implementation of the present application, an entrance pupil diameter EPD of the camera lens assembly satisfies: $1.5 < f/EPD \leq 2.4$, for example, $1.78 \leq f/EPD \leq 2.4$. An axial distance TTL from the object-side surface of the first lens to an image-side surface of a photosensitive component and ImgH, ImgH being half a diagonal length of an effective pixel area of the photosensitive component, satisfy: $TTL/ImgH \leq 1.65$.

A camera lens assembly is provided by another implementation according to the present application. The camera lens assembly includes a first lens, a second lens, a third lens and multiple subsequent lenses arranged in sequence from an object side to an image side along an optical axis. The first lens, the second lens, the third lens and the multiple subsequent lenses jointly form a total effective focal length f. The first lens has positive focal power, and an object-side surface of the first lens is a convex surface. The second lens has positive focal power, and an object-side surface and image-side surface of the second lens are convex surfaces. The third lens has negative focal power. A combined focal length f23 of the second lens and the third lens satisfies: 0<f/f23<0.65.

The present application further provides a camera device equipped with the camera lens assembly described above.

The camera lens assembly according to the implementations of the present application has higher pixels, higher image quality and a lower sensitivity, so that the camera lens assembly is conducive to production and processing, and can be applied to portable electronic products.

BRIEF DESCRIPTION OF THE DRAWINGS

The above and other advantages of the implementations according to the present application will become apparent through detailed description given with reference to accompanying drawings, and the accompanying drawings are intended to illustrate exemplary implementations of the present application, rather than a limitation to the exemplary implementations of the present application. In the accompany drawings.

DETAILED DESCRIPTION OF EMBODIMENTS

Figure 1:
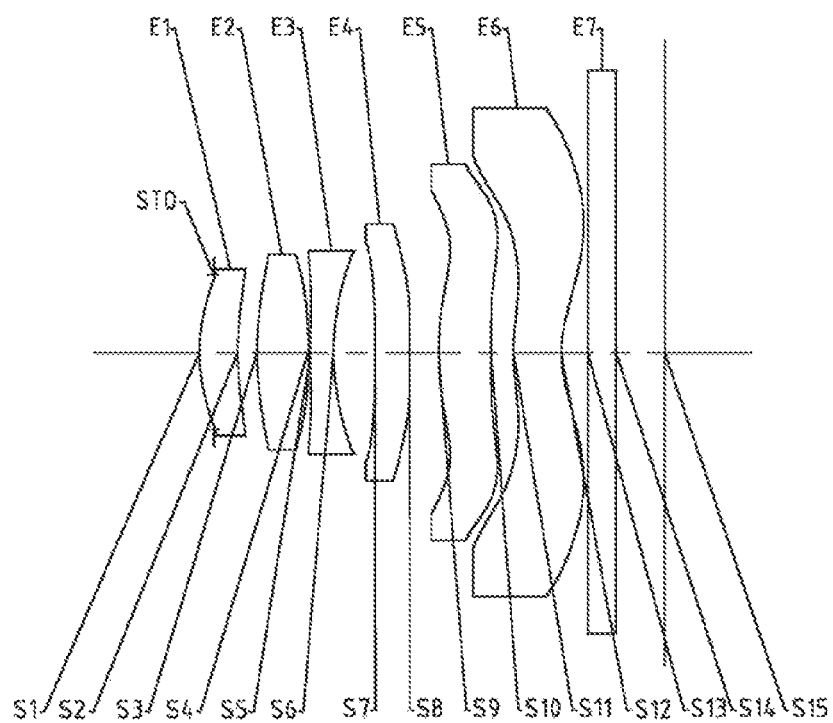
FIG. 1 is a schematic structural diagram of a camera lens assembly according to Embodiment 1 of the present application.

Various aspects of the present application will be described in more detail with reference to the accompanying drawings, so as to better understand the present application. It should be appreciated that the detailed description is merely an explanation for exemplary implementations of the present application, rather than a limitation to the scope of the present application in any way. The statement "and/or" includes any and all combinations of one or more of the associated listed items.

It should be noted that, in the Specification, statements, such as "first" and "second" are merely used to distinguish one feature from another feature, not to represent any limitations to features. Thus, a first lens discussed below also could be termed a second lens without departing from the teachings of the present application.

In the accompanying drawings, for convenience of the description, thicknesses, sizes and shapes of lenses have been slightly exaggerated. Specifically, spherical or aspheric shapes shown in the accompanying drawings are illustrated with examples. That is, spherical or aspheric shapes are not limited to the spherical or aspheric shapes shown in the accompanying drawings. The accompanying drawings are merely examples, not strictly drawn to scale.

In addition, an area near an axis indicates an area near an optical axis. The first lens is a lens closest to an object, and a sixth lens is a lens closest to a photosensitive element. In the present application, a surface closest to the object in each lens is referred to as an object-side surface, and a surface closest to an image plane in each lens is referred to as an image-side surface.

It will be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or groups thereof. In addition, expressions, such as "at least one of," when preceding a list of elements, modify the entire list of elements rather than an individual element in the list. Further, the use of "may", when describing embodiments of the present application, relates to "one or more embodiments of the present application." Also, the term "exemplary" is intended to refer to an example or illustration.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A camera lens assembly according to exemplary implementations of the present application may include a first lens, a second lens, a third lens and multiple subsequent lenses arranged in sequence from an object side to an image side along an optical axis, wherein these lenses jointly form a total effective focal length f.

The first lens may have positive focal power, and an object side of the first lens is a convex surface, which has, for example, a meniscus shape. A focal length f1 of the first lens and the total effective focal length f may satisfy: $0.2<f/f1<0.8$, for example, $0.25 \le f/f1 \le 0.75$. By reasonably setting focal power of the first lens, a sensitivity of the first lens E1 can be effectively reduced, which is more conducive to processing and assembly. In practice, an axial distance TTL from an object-side surface of the first lens to an image-side surface of a photosensitive component and ImgH, ImgH being half a diagonal length of an effective pixel area of the photosensitive component, may satisfy: $TTL/ImgH \le 1.65$, so as to ensure miniaturization of the lens assembly, which is more conducive to the use environment of the lens assembly.

The second lens may have positive focal power, and an object-side surface of the second lens may be a convex surface, an image-side surface of the second lens may be a convex surface.

The third lens may have negative focal power. A negative focal length f3 of the third lens and a positive combined focal length f12 of the first lens and the second lens may satisfy: $-0.7<f12/f3<0$. In a situation of a condition above an upper limit value of this conditional formula, a longitudinal chromatic aberration will be produced gravely in a wide angle state. In a situation of a condition below a lower limit value of this conditional formula, it is difficult to obtain good image quality. Accordingly, for example, the negative focal length f3 of the third lens and the positive combined focal length f12 of the first lens and the second lens may be set to satisfy $-0.67 \le f12/f3 \le -0.28$. By reasonably distributing the positive focal power and negative focal power of these lenses, the longitudinal chromatic aberration can be effectively corrected, which is conducive to obtaining better image quality. Moreover, a combined focal length f23 of the second lens and the third lens and the total effective focal length f may satisfy: $0<f/f23<0.65$, and may further satisfy, for example, $0.04 \le f/f23 \le 0.61$. By setting a combined focal length of the second lens assembly E2 and the third lens assembly E3 in such a way, sensitivities of the second lens E2 and the third lens E3 can be effectively reduced, which is more conducive to the processing and the assembly.

The camera lens assembly according to the implementations further includes a fourth lens, a fifth lens and a sixth lens arranged in sequence on the optical axis and positioned between the third lens and the image side. The fourth lens may have positive focal power or negative focal power. An object-side surface of the fifth lens at a position near the axis is a convex surface. The sixth lens has negative focal power, and an object-side surface of the sixth lens at a position near the axis is a convex surface, and an image-side surface of the sixth lens at the position near the axis is a concave surface. For instance, the object-side surface of the sixth lens may have a protuberant meniscus shape. Focal lengths f4 and f5 and the total effective focal length f may satisfy: $|f/f4|+|f/f5|<1.0$, and may further satisfy, for example, $|f/f4|+|f/f5|<0.62$. By reasonably setting the focal lengths f4 and f5, a total length of an optical system can be further reduced. Moreover, a combined focal length f56 of the fifth and sixth lenses and the total effective focal length f may satisfy $|f/f56| \le 0.3$, and may further satisfy, for example, $|f/f56| \le 0.29$. The fifth and sixth lenses are configured with lower focal power, which is conducive to reducing a sensitivity of the optical system, so that the system is more advantageous to the production and the processing.

In the implementations of the present application, thicknesses of various lenses may be optimized. For instance, a center thickness CT2 of the second lens and a center thickness CT5 of the fifth lens may satisfy: $0.8<CT2/CT5<1.5$, and may further satisfy, for example, $0.9 \le CT2/CT5 \le 1.33$. By reasonably setting center thicknesses of the second lens E2 and the fifth lens E5, distoration of the optical system can be effectively corrected, thereby reducing losses of image effects.

In the implementations of the present application, radii of curvature of an object-side surface and image-side surface of each lens may be optimized. For instance, a radius of curvature R5 of an object-side surface of the third lens and a radius of curvature R6 of an image-side surface of the third lens may satisfy: $0<(R5-R6)/(R5+R6)<1.0$, and may further satisfy, for example, $0.24 \le (R5-R6)/(R5+R6) \le 0.73$. The third lens E3 is mainly curved toward a photographed object side, which is conducive to improving resolution of the lens assembly, so that picture quality photographed actually becomes clearer.

For instance, a radius of curvature R9 of the object-side surface of the fifth lens and a radius of curvature R12 of the image-side surface of the sixth lens may satisfy: $0<R12/R9<0.5$, and may further satisfy, for example, $0.15 \le R12/R9 \le 0.33$. By reasonably setting the radius of curvature of the object-side surface of the fifth lens E5 and the radius of curvature of the image-side surface of the sixth lens E6, the axial chromatic aberration of the optical system can be effectively corrected, which is conducive to obtaining better image quality.

For instance, a radius of curvature R11 of the object-side surface of the sixth lens E6 and the radius of curvature R12 of the image-side surface the radius of curvature may satisfy: $0<(R11-R12)/(R11+R12)<0.5$, and may further satisfy, for example, $0.11 \le (R11-R12)/(R11+R12) \le 0.36$. By setting the sixth lens E6 to have a meniscus shape, the axial chromatic aberration of the optical system can be further corrected, which is more conducive to obtaining better image quality.

Requirements for the radii of curvature of the lenses are described above. The image-side surfaces and object-side surfaces of these lenses at positions near the axis may be formed of aspheric surfaces or planes, which is conducive to the processing and assembly adjustment of the lenses.

In the implementations, axial spacings between various lenses may be optimized. For instance, an axial spacing T23 between the second lens and the third lens and an axial spacing T12 between the first lens and the second lens may satisfy: $T23/T12 \le 0.2$, and may further satisfy, for example, $T23/T12 \le 0.18$. An axial spacing T34 between the third lens E3 and the fourth lens E4 and a center thickness CT4 of the fourth lens E4 may satisfy: $1.0<T34/CT4<1.5$, and may further satisfy, for example, $1.04 \le T34/CT4 \le 1.29$. By reasonably setting a spacing distance between the third lens E3 and the fourth lens E4, the total length of the optical system can be effectively reduced, which is more conducive to the use environment of the lens assembly.

In the implementations, an entrance pupil diameter of the camera lens assembly may also be optimized. For instance, the total effective focal length f of the camera lens assembly and the entrance pupil diameter EPD of the camera lens assembly may satisfy: $1.5 \le f/EPD \le 2.4$, and may further satisfy, for example, $1.78 \le f/EPD \le 2.4$. By using a large aperture, it can be ensured that the lens assembly obtains a larger amount of light admitted, so that the shooting screen becomes brighter.

In the implementations according to the present application, multiple lenses (e.g., the above-mentioned six lenses) may be used to reasonably distribute focal lengths and surface forms of various lenses, axial spacings between various lenses, and so on, thereby implementing a camera lens assembly having high pixels, good image quality and a low sensitivity, so that this system is more conducive to the generating and the assembly, and can be applied to portable electronic products. However, it should be understood by those skilled in the art that, in a situation without departing from the technical solution sought to be protected by the present application, a number of lenses forming the lens assembly can be changed, to obtain various results and advantages described beneath. For instance, in the description of the first implementation, a camera lens assembly having six lenses is used as an example to describe, but the camera lens assembly is not limited to include six lenses. If necessary, the camera lens assembly may also include other numbers of lenses.

Specific embodiments applicable to the camera lens assembly of the above two implementations will be further described below with reference to FIG. 1 to FIG. 26D.

Embodiment 1

Embodiment 1 of the camera lens assembly according to the above implementations of the present application will be described below with reference to FIG. 1 to FIG. 2D.

As shown in FIG. 1, a camera lens assembly in Embodiment 1 includes a first lens E1, a second lens E2, a third lens E3, a fourth lens E4, a fifth lens E5 and a sixth lens E6. The first lens E1 has an object-side surface S1 and an image-side surface S2, the second lens E2 has an object-side surface S3 and an image-side surface S4, the third lens E3 has an object-side surface S5 and an image-side surface S6, the fourth lens E4 has an object-side surface S7 and an image-side surface S8, the fifth lens E5 has an object-side surface S9 and an image-side surface S10, and the sixth lens E6 has an object-side surface S11 and an image-side surface S12. The camera lens assembly may further include a diaphragm (unshown) and a filter E7 having an object-side surface S13 and an image-side surface S14 and used for filtering out infrared light. In the camera lens assembly of this embodiment, an aperture STO may further be disposed to adjust the amount of light admitted. Light from an object sequentially passes through the surfaces S1 to S14 and finally forms an image on an image plane S15.

Table 1 below shows effective focal lengths f1 to f6 of the lenses, a total effective focal length f of the camera lens assembly, and a total track length TTL and a half field-of-view (diagonal) angle HFOV of the camera lens according to Embodiment 1.

TABLE 1

| f1 (mm) | 7.71    | f (mm)     | 3.95  |
|---------|---------|------------|-------|
| f2 (mm) | 3.97    | TTL (mm)   | 4.94  |
| f3 (mm) | -4.86   | HFOV (deg) | 36.83 |
| f4 (mm) | -132.06 |            |       |

TABLE 2

| surface number | surface form | radius of curvature | Thickness (CT) | material   | conic coefficient |
|----------------|--------------|---------------------|----------------|------------|-------------------|
| OBJ            | spherical    | infinite            | infinite       |            |                   |
| STO            | spherical    | infinite            | -0.1800        |            |                   |
| S1             | aspheric     | 1.8932              | 0.4055         | 1.54, 56.1 | -13.6062          |
| S2             | aspheric     | 3.1909              | 0.2038         |            | -11.7805          |
| S3             | aspheric     | 3.1855              | 0.5449         | 1.54, 56.1 | -7.0350           |
| S4             | aspheric     | -6.3224             | 0.0250         |            | -14.9190          |
| S5             | aspheric     | 13.1911             | 0.2430         | 1.64, 23.5 | 10.9712           |
| S6             | aspheric     | 2.4980              | 0.4419         |            | -21.4249          |
| S7             | aspheric     | -101.9109           | 0.3690         | 1.65, 21.5 | -99.0000          |
| S8             | aspheric     | 550.3680            | 0.3075         |            | -99.0000          |
| S9             | aspheric     | 3.6409              | 0.5564         | 1.54, 56.1 | -15.2205          |
| S10            | aspheric     | -1000.0000          | 0.2392         |            | 98.1511           |
| S11            | aspheric     | 2.2228              | 0.5040         | 1.54, 56.1 | -5.0339           |
| S12            | aspheric     | 1.1747              | 0.2835         |            | -4.0223           |
| S13            | spherical    | infinite            | 0.3000         | 1.52, 64.2 |                   |
| S14            | spherical    | infinite            | 0.5177         |            |                   |
| S15            | spherical    | infinite            |                |            |                   |

TABLE 3

| surface number | A4        | A6        | A8        | A10       | A12       | A14       | A16       | A18       | A20       |
|----------------|-----------|-----------|-----------|-----------|-----------|-----------|-----------|-----------|-----------|
| S1             | 2.1295E-  | -3.4126E- | 4.3571E-  | -4.3416E- | 2.6155E-  | -7.6595E- | 3.7855E-  | 1.8589E-  | 0         |
| S2             | -1.9535E- | -6.8519E- | 1.1086E-  | -1.6731E- | 1.8787E-  | -1.0973E- | 3.0664E-  | -3.3666E- | 0         |
| S3             | -3.0287E- | 1.0420E-  | -1.1694E- | 3.3330E-  | -4.5712E- | 4.2005E-  | -2.2905E- | 5.2318E-  | 0         |
| S4             | 1.5657E-  | -4.3932E- | 1.3096E+  | -2.4201E  | 2.8936E+  | -2.1162E  | 8.4603E-  | -1.3999E- | 0         |
| S5             | -1.0035E- | -3.5746E- | 1.0914E+  | -2.0945E  | 2.6633E+  | -2.1052E  | 9.2317E-  | -1.6857E- | 0         |
| S6             | 1.3616E-  | -2.7493E- | 5.4356E-  | -8.4831E- | 8.9611E-  | -5.4628E- | 1.5480E-  | -7.5426E- | 0         |
| S7             | -8.0132E- | 2.0234E-  | 1.3537E-  | -3.7111E- | 5.2379E-  | -4.2855E- | 1.9205E-  | -3.7861E- | 0         |
| S8             | -1.0455E- | -6.7280E- | 2.3229E-  | -2.8980E- | 2.1840E-  | -9.0332E- | 1.7326E-  | -1.0536E- | 0         |
| S9             | 1.1700E-  | -2.3640E- | 2.6556E-  | -2.6873E- | 1.8946E-  | -8.4515E- | 2.2933E-  | -3.4580E- | 2.2158E-  |
| S10            | 8.8290E-  | 3.0245E-  | -1.2845E- | 9.4689E-  | -3.6096E- | 7.7157E-  | -8.5036E- | 3.4272E-  | 4.5436E-  |
| S11            | -3.0465E- | 2.4296E-  | -1.3388E- | 4.7889E-  | -1.1455E- | 1.9048E-  | -2.1470E- | 1.4575E-  | -4.4108E- |
| S12            | -1.8172E- | 1.3373E-  | -7.0604E- | 2.4417E-  | -5.5196E- | 8.1453E-  | -7.5931E- | 4.0600E-  | -9.4640E- |

TABLE 1-continued

| f5 (mm) | 6.67  |
|---------|-------|
| f6 (mm) | -5.51 |

The effective focal length f1 of the first lens E1 and the total effective focal length f satisfy: f/f1=0.51.

In this embodiment, a combined focal length f12 of the first lens E1 and the second lens E2 and an effective focal length of the third lens E3 satisfy: f12/f3=−0.58. A combined focal length f23 of the second lens E2 and the third lens E3 and the total effective focal length f satisfy: f/f23=0.27. The effective focal length f4 of the fourth lens E4, the effective focal length f5 of the fifth lens E5 and the total effective focal length f satisfy: |f/f4|+|f/f5|=0.62. A combined focal length f56 of the fifth lens E5 and the sixth lens E6 and the total effective focal length f satisfy: f/f56=0.03. The total effective focal length f and an entrance pupil diameter EPD of the camera lens assembly satisfy: f/EPD=2.40.

Table 2 shows a surface form, radius of curvature, thickness, material and conic coefficient of each lens in this embodiment. Table 3 shows high-order coefficients A4, A6, A8, A10, A12, A16, A18 and A20 that can be applied to the aspheric mirror surfaces S1-S12 in this embodiment.

Referring to table 2 and table 3, a center thickness CT2 of the second lens E2 and a center thickness CT2 of the fifth lens E5 satisfy: CT2/CT5=0.98.

In Embodiment 1, a radius of curvature R5 of the object-side surface of the third lens E3 and a radius of curvature R6 of the image-side surface thereof satisfy: (R5−R6)/(R5+R6)=0.68. A radius of curvature R9 of the object-side surface of the fifth lens E5 and a radius of curvature R12 of the image-side surface of the sixth lens E6 satisfy: R12/R9=0.32. A radius of curvature R11 of the object-side surface of the sixth lens E6 and a radius of curvature R12 of the image-side surface thereof satisfy: (R11−R12)/(R11+R12)=0.31.

Moreover, in Embodiment 1, an axial spacing T23 between the second lens E2 and the third lens E3 and an axial spacing T12 between the first lens E1 and the second lens E2 satisfy: T23/T12=0.12. An axial spacing T34 between the third lens E3 and the fourth lens E4 and a center thickness of the fourth lens E4 satisfy T34/CT4=1.20. An axial distance TTL from the object-side surface of the first lens to an image-side surface of a photosensitive component and ImgH, ImgH being half a diagonal length of an effective pixel area of a photosensitive component, satisfy: TTL/ImgH≤1.65.

Figure 2A:
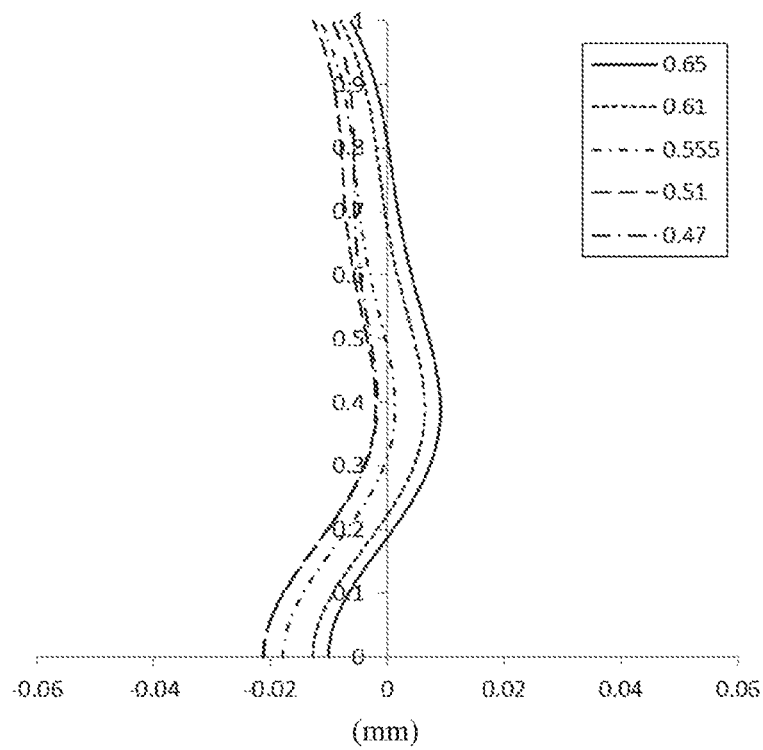
FIG. 2A illustrates an longitudinal aberration curve of the camera lens assembly according to Embodiment 1.
Figure 2B:
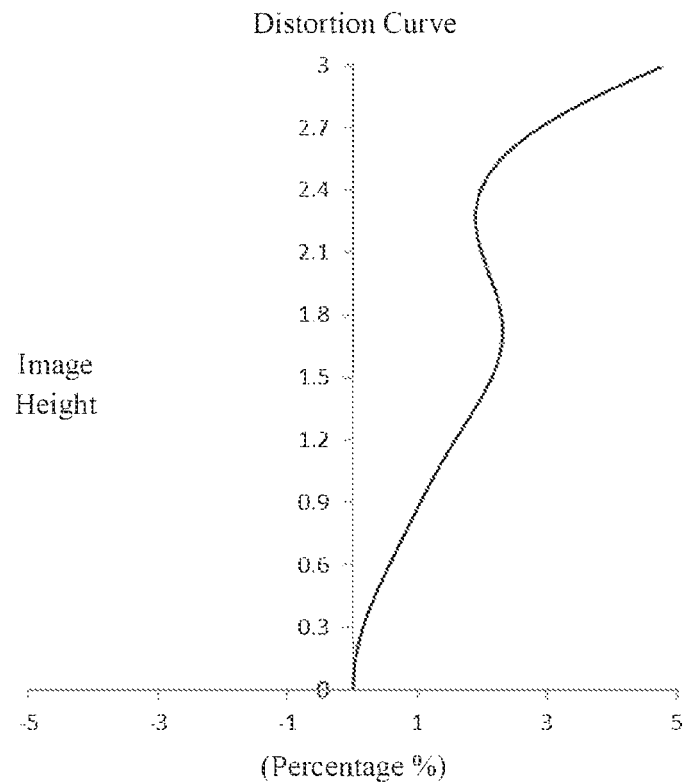
FIG. 2B illustrates a distortion curve of the camera lens assembly according to Embodiment 1.
Figure 2C:
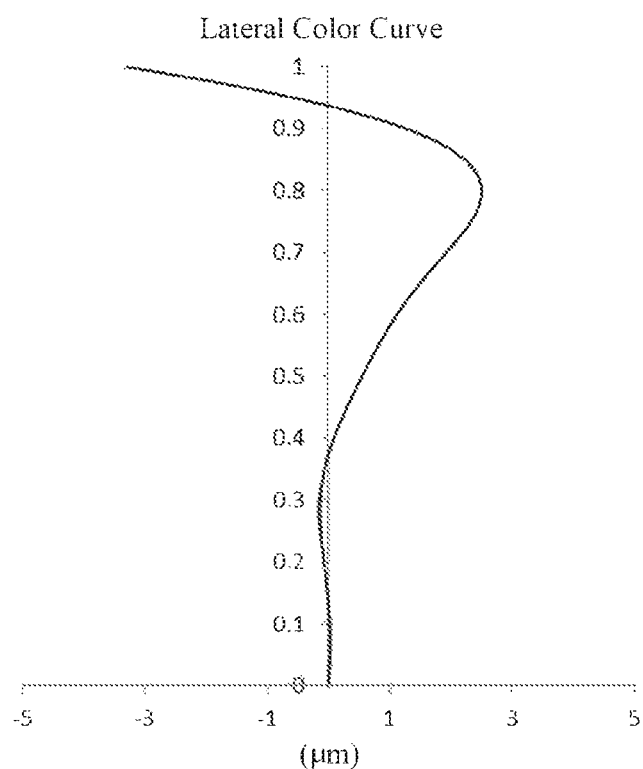
FIG. 2C illustrates a lateral color curve of the camera lens assembly according to Embodiment 1.
Figure 2D:
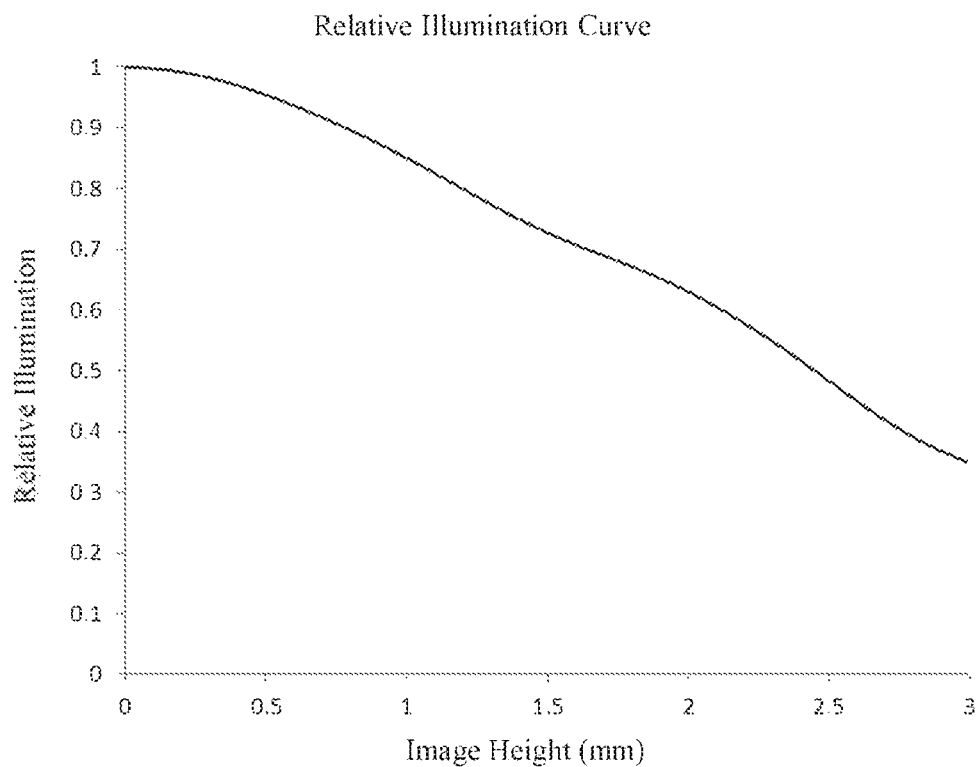
FIG. 2D illustrates a relative illumination curve of the camera lens assembly according to Embodiment 1.

FIG. 2A illustrates an longitudinal aberration curve of the camera lens assembly according to Embodiment 1, representing deviations of focal points of light of different wavelengths converged after passing through an optical system. FIG. 2B illustrates a distortion curve of the camera lens assembly according to Embodiment 1, representing amounts of distortion at different viewing angles. FIG. 2C illustrates a lateral color curve of the camera lens assembly according to Embodiment 1, representing deviations of different image heights on an image plane after light passes through the camera lens assembly. FIG. 2D illustrates a relative illumination curve of the camera lens assembly according to Embodiment 1, representing ratios of central illuminations to peripheral illuminations. It can be seen from FIG. 2A to FIG. 2D that the camera lens assembly provided in Embodiment 1 achieves good image quality.

Embodiment 2

Embodiment 2 according to the above camera lens assembly of the present application will be described below with reference to FIG. 3 to FIG. 4D. Except parameters of each lens of the camera lens assembly, for example, except a radius of curvature, thickness, material, conic coefficient, effective focal length and axial spacing of each lens, and a high-order coefficient of each mirror surface, the arrangement of the camera lens assembly described in Embodiment 2 and the following embodiments is the same as that in Embodiment 1. For the purpose of brevity, the description of parts similar to those in Embodiment 1 will be omitted.

Figure 3:
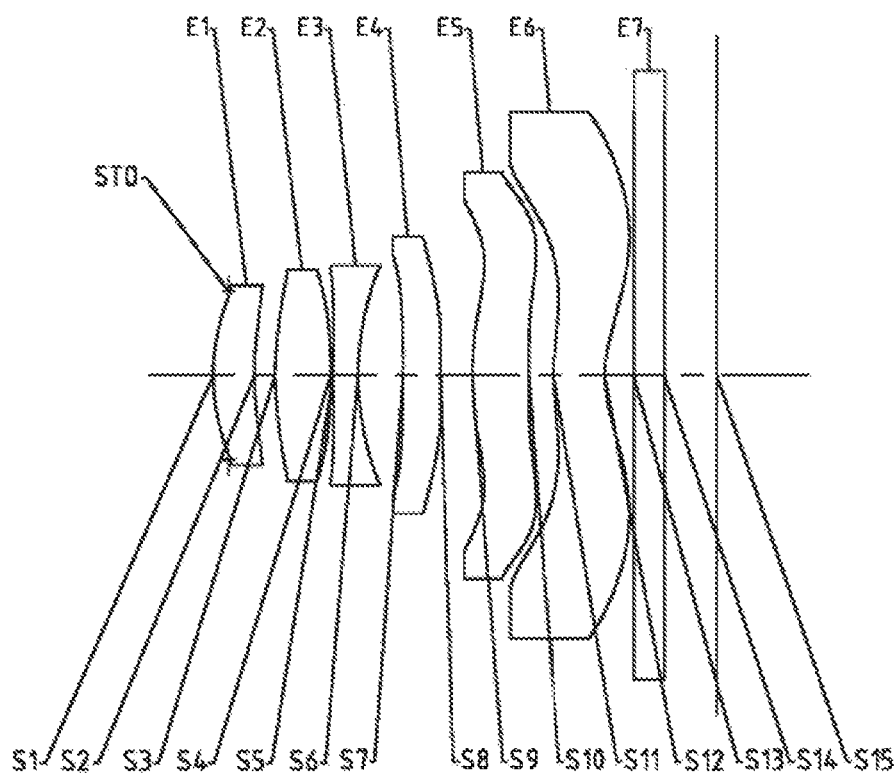
FIG. 3 is a schematic structural diagram of a camera lens assembly according to Embodiment 2 of the present application.

FIG. 3 is a schematic structural diagram of a camera lens assembly according to Embodiment 2 of the present application. As shown in FIG. 3, the camera lens assembly according to Embodiment 2 includes a first lens to a sixth lens E1-E6 respectively having an object-side surface and an image-side surface.

Table 4 below shows effective focal lengths f1 to f6 of the lenses, a total effective focal length f of the camera lens assembly, and a total track length TTL and a half field-of-view (diagonal) angle HFOV of the camera lens in Embodiment 2.

TABLE 4

| f1 (mm) | 7.71 | f (mm) | 3.96 |
| f2 (mm) | 3.97 | TTL (mm) | 4.94 |
| f3 (mm | −4.86 | HFOV (deg) | 36.80 |
| f4 (mm) | −132.06 | | |
| f5 (mm) | 6.74 | | |
| f6 (mm) | −5.51 | | |

In Embodiment 2, the effective focal length f1 of the first lens E1 and the total effective focal length f satisfy: f/f1=0.51.

Moreover, in Embodiment 2, a combined focal length f12 of the first lens E1 and the second lens E2 and an effective focal length of the third lens E3 satisfy: f12/f3=−0.58. A combined focal length f23 of the second lens E2 and the third lens E3 and the total effective focal length f satisfy: f/f23=0.27. The effective focal length f4 of the fourth lens E4, the effective focal length f5 of the fifth lens E5 and the total effective focal length f satisfy: |f/f4|+|f/f5|=0.62. A combined focal length f56 of the fifth lens E5 and the sixth lens E6 and the total effective focal length f satisfy: f/f56=0.02. The total effective focal length f and an entrance pupil diameter EPD of the camera lens assembly satisfy: f/EPD=2.40.

Table 5 shows a surface form, radius of curvature, thickness, material and conic coefficient of each lens in Embodiment 2. Table 6 shows high-order coefficients A4, A6, A8, A10, A12, A16, A18 and A20 that can be applied to the aspheric mirror surfaces S1-S12 in Embodiment 2.

TABLE 5

| surface number | surface form | radius of curvature | thickness | material | conic coefficient |
| --- | --- | --- | --- | --- | --- |
| OBJ | spherical | infinite | infinite | | |
| STO | spherical | infinite | −0.1800 | | |
| S1 | aspheric | 1.8932 | 0.4055 | 1.54, 56.1 | −13.6062 |
| S2 | aspheric | 3.1909 | 0.2038 | | −11.7805 |
| S3 | aspheric | 3.1855 | 0.5449 | 1.54, 56.1 | −7.0350 |
| S4 | aspheric | −6.3224 | 0.0250 | | −14.9190 |
| S5 | aspheric | 13.1911 | 0.2430 | 1.64, 23.5 | 10.9712 |
| S6 | aspheric | 2.4980 | 0.4419 | | −21.4249 |
| S7 | aspheric | −101.9109 | 0.3690 | 1.65, 21.5 | −99.0000 |
| S8 | aspheric | 550.3680 | 0.3075 | | −99.0000 |
| S9 | aspheric | 3.6409 | 0.5564 | 1.54, 56.1 | −15.2205 |
| S10 | aspheric | 500.0000 | 0.2392 | | 98.1511 |
| S11 | aspheric | 2.2228 | 0.5040 | 1.54, 56.1 | −5.0339 |
| S12 | aspheric | 1.1747 | 0.2835 | | −4.0223 |
| S13 | spherical | infinite | 0.3000 | 1.52, 64.2 | |
| S14 | spherical | infinite | 0.5177 | | |
| S15 | spherical | infinite | | | |

Referring to Table 5 and Table 6, a center thickness CT2 of the second lens E2 and a center thickness CT5 of the fifth lens E5 satisfy: CT2/CT5=0.98.

In Embodiment 2, a radius of curvature R5 of the object-side surface of the third lens E3 and a radius of curvature R6 of the image-side surface thereof satisfy: (R5−R6)/(R5+R6)=0.68. A radius of curvature R9 of the object-side surface of the fifth lens E5 and a radius of curvature R12 of the image-side surface of the sixth lens E6 satisfy: R12/R9=0.32. A radius of curvature R11 of the object-side surface of the sixth lens E6 and a radius of curvature R12 of the image-side surface thereof satisfy: (R11−R12)/(R11+R12)=0.31.

TABLE 6

| surface | A4 | A6 | A8 | A10 | A12 |
| --- | --- | --- | --- | --- | --- |
| S1 | 2.1295E−0 | −3.4126E− | 4.3571E−0 | −4.3416E−0 | 2.6155E−0 |
| S2 | −1.9535E− | −6.8519E− | 1.1086E−0 | −1.6731E−0 | 1.8787E−0 |
| S3 | −3.0287E− | 1.0420E−0 | −1.1694E− | 3.3330E−0 | −4.5712E− |
| S4 | 1.5657E−0 | −4.3932E− | 1.3096E+ | −2.4201E+ | 2.8936E+ |
| S5 | −1.0035E− | −3.5746E− | 1.0914E+ | −2.0945E+ | 2.6633E+ |
| S6 | 1.3616E−0 | −2.7493E− | 5.4356E−0 | −8.4831E−0 | 8.9611E−0 |
| S7 | −8.0132E− | 2.0234E−0 | 1.3537E−0 | −3.7111E−0 | 5.2379E−0 |
| S8 | −1.0455E− | −6.7280E− | 2.3229E−0 | −2.8980E−0 | 2.1840E−0 |
| S9 | 1.1700E−0 | −2.3640E− | 2.6556E−0 | −2.6873E−0 | 1.8946E−0 |
| S10 | 8.8290E−0 | 3.0245E−0 | −1.2845E− | 9.4689E−0 | −3.6096E− |
| S11 | −3.0465E− | 2.4296E−0 | −1.3388E− | 4.7889E−0 | −1.1455E− |
| S12 | −1.8172E− | 1.3373E−0 | −7.0604E− | 2.4417E−0 | −5.5196E− |

TABLE 6-continued

| surface | A14 | A16 | A18 | A20 |
|---------|-----|-----|-----|-----|
| S1 | −7.6595E−0 | 3.7855E−0 | 1.8589E−0 | 0 |
| S2 | −1.0973E−0 | 3.0664E−0 | −3.3666E− | 0 |
| S3 | 4.2005E−0 | −2.2905E− | 5.2318E−0 | 0 |
| S4 | −2.1162E+ | 8.4603E−0 | −1.3999E− | 0 |
| S5 | −2.1052E+ | 9.2317E−0 | −1.6857E− | 0 |
| S6 | −5.4628E−0 | 1.5480E−0 | −7.5426E− | 0 |
| S7 | −4.2855E−0 | 1.9205E−0 | −3.7861E− | 0 |
| S8 | −9.0332E−0 | 1.7326E−0 | −1.0536E− | 0 |
| S9 | −8.4515E−0 | 2.2933E−0 | −3.4580E− | 2.2158E−0 |
| S10 | 7.7157E−0 | −8.5036E− | 3.4272E−0 | 4.5436E−0 |
| S11 | 1.9048E−0 | −2.1470E− | 1.4575E−0 | −4.4108E− |
| S12 | 8.1453E−0 | −7.5931E− | 4.0600E−0 | −9.4640E− |

Moreover, in Embodiment 2, an axial spacing T23 between the second lens E2 and the third lens E3 and an axial spacing T12 between the first lens E1 and the second lens E2 satisfy: T23/T12=0.12. An axial spacing T34 between the third lens E3 and the fourth lens E4 and a center thickness of the fourth lens E4 satisfy T34/CT4=1.20. An axial distance TTL from the object-side surface of the first lens to an image-side surface of a photosensitive component and ImgH, ImgH being half a diagonal length of an effective pixel area of a photosensitive component, satisfy: TTL/ImgH≤1.65.

Figure 4A:
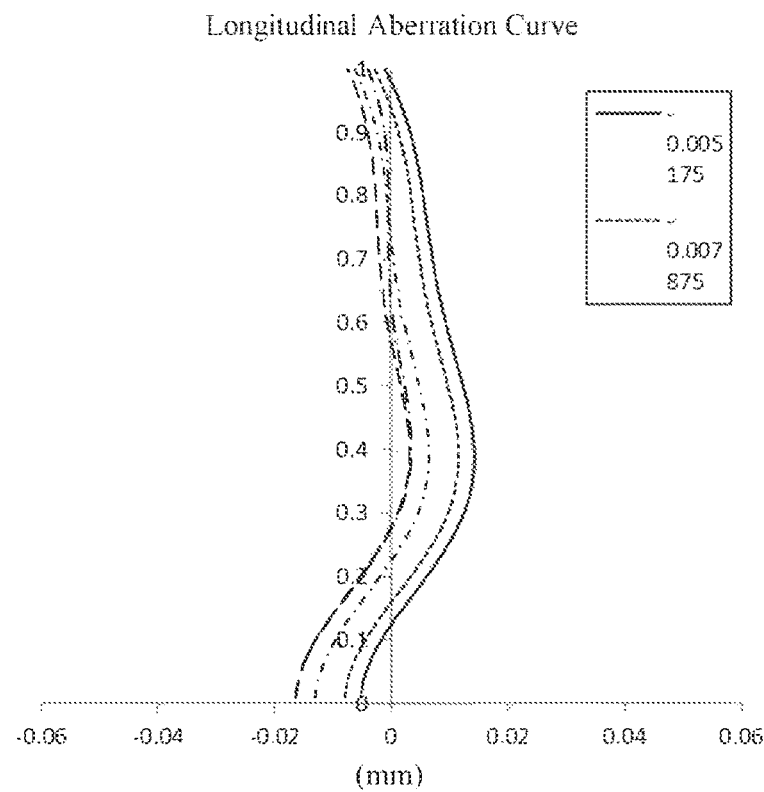
FIG. 4A illustrates an longitudinal aberration curve of the camera lens assembly according to Embodiment 2.
Figure 4B:
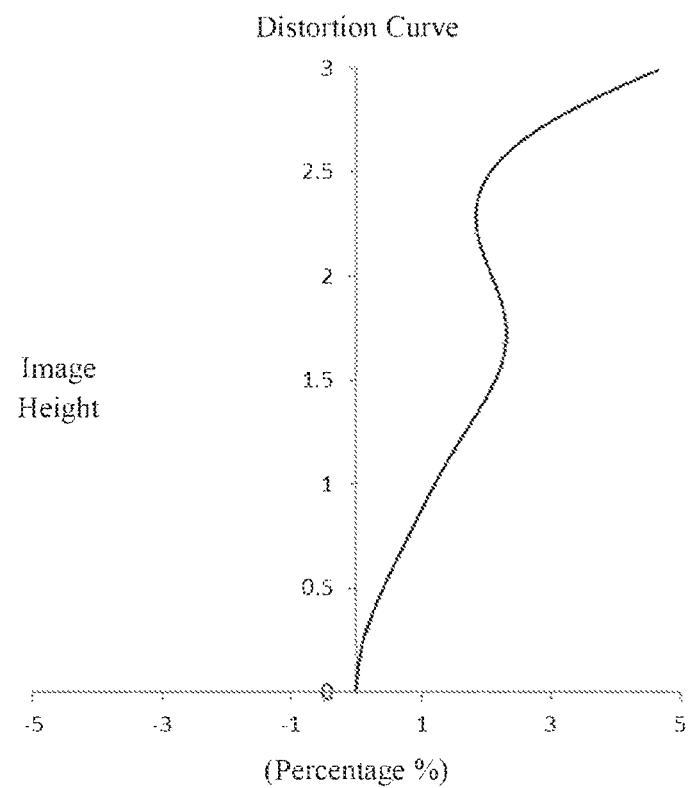
FIG. 4B illustrates a distortion curve of the camera lens assembly according to Embodiment 2.
Figure 4C:
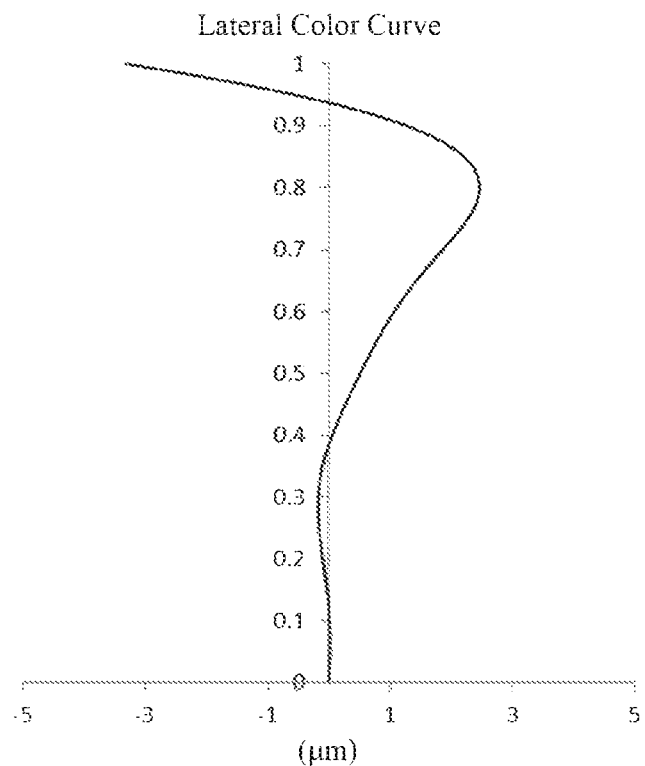
FIG. 4C illustrates a lateral color curve of the camera lens assembly according to Embodiment 2.
Figure 4D:
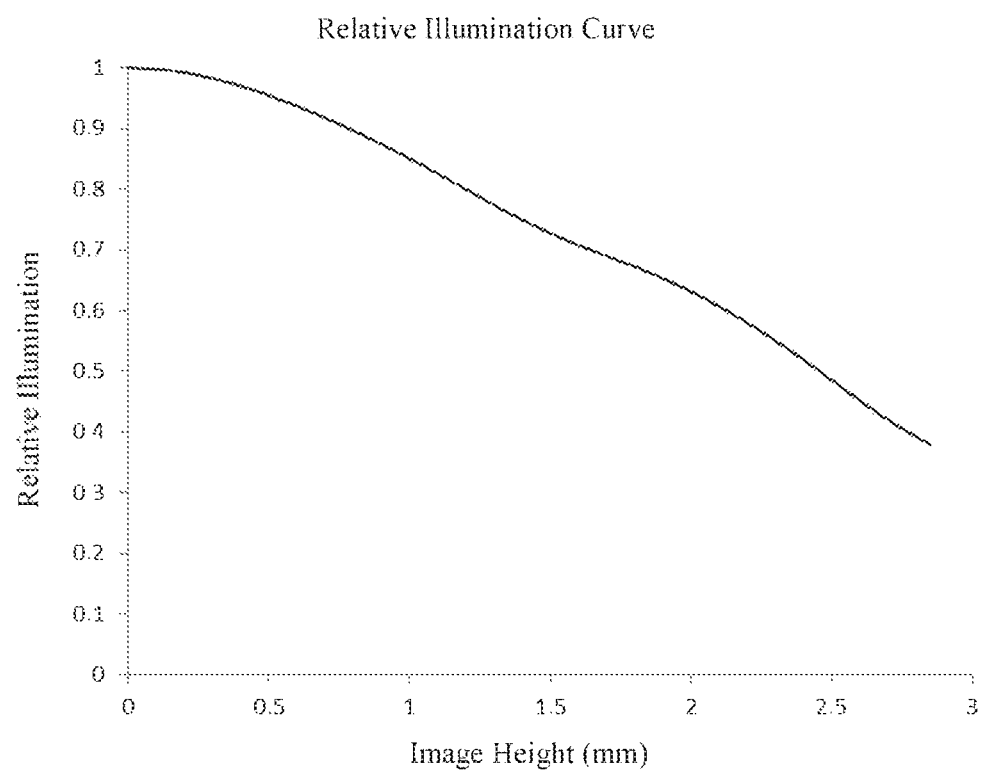
FIG. 4D illustrates a relative illumination curve of the camera lens assembly according to Embodiment 2.

FIG. 4A illustrates an longitudinal aberration curve of the camera lens assembly according to Embodiment 2, representing deviations of focal points of light of different wavelengths converged after passing through an optical system. FIG. 4B illustrates a distortion curve of the camera lens assembly according to Embodiment 2, representing amounts of distortion at different viewing angles. FIG. 4C illustrates a lateral color curve of the camera lens assembly according to Embodiment 2, representing deviations of different image heights on an image plane after light passes through the camera lens assembly. FIG. 4D illustrates a relative illumination curve of the camera lens assembly according to Embodiment 2, representing ratios of central illuminations to peripheral illuminations. It can be seen from FIG. 4A to FIG. 4D that the camera lens assembly provided in Embodiment 2 achieves good image quality.

Embodiment 3

Figure 5:
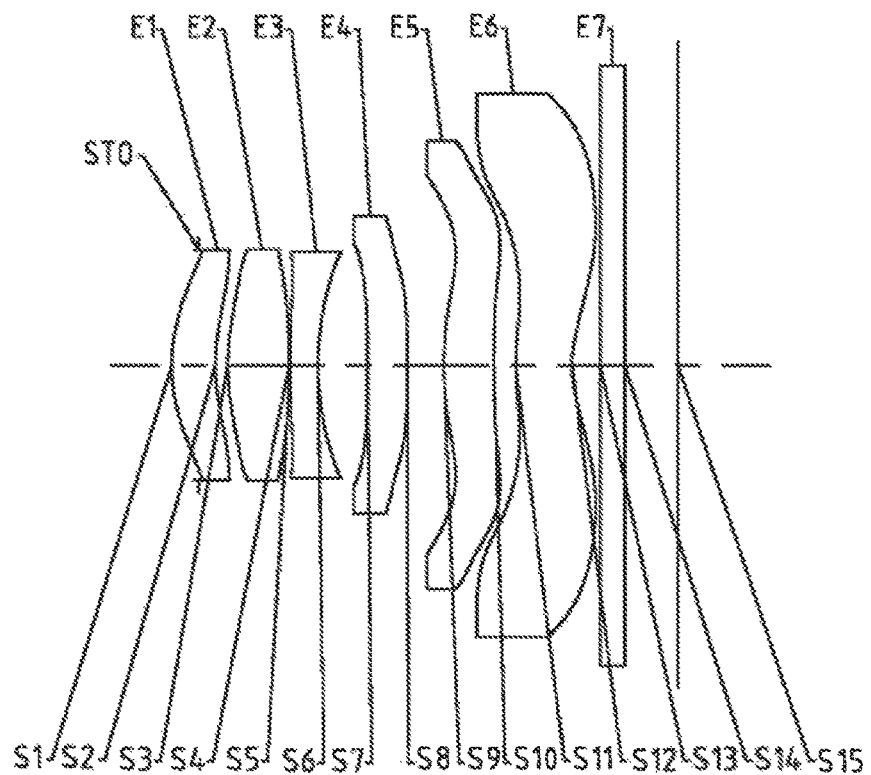
FIG. 5 is a schematic structural diagram of a camera lens assembly according to Embodiment 3 of the present application.

Embodiment 3 according to the camera lens assembly of the present application will be described below with reference to FIG. 5 to FIG. 6D. FIG. 5 is a schematic structural diagram of a camera lens assembly according to Embodiment 3. As shown in FIG. 5, the camera lens assembly according to Embodiment 3 includes a first lens to a sixth lens E1-E6 respectively having an object-side surface and an image-side surface. Table 7 below shows effective focal lengths f1 to f6 of the lenses, a total effective focal length f of the camera lens assembly, and a total track length TTL and a half field-of-view (diagonal) angle HFOV of the camera lens according to Embodiment 3.

TABLE 7

| f1 (mm) | 13.83 | f (mm) | 3.49 |
|---------|-------|--------|------|
| f2 (mm) | 2.91 | TTL (mm) | 4.31 |
| f3 (mm | −4.94 | HFOV (deg) | 37.51 |
| f4 (mm) | −117.27 | | |
| f5 (mm) | 5.92 | | |
| f6 (mm) | −4.47 | | |

In Embodiment 3, the effective focal length f1 of the first lens E1 and the total effective focal length f satisfy: f/f1=0.25. A combined focal length f12 of the first lens E1 and the second lens E2 and an effective focal length of the third lens E3 satisfy: f12/f3=−0.53. A combined focal length f23 of the second lens E2 and the third lens E3 and the total effective focal length f satisfy: f/f23=0.61. The effective focal length f4 of the fourth lens E4, the effective focal length f5 of the fifth lens E5 and the total effective focal length f satisfy: |f/f4|+|f/f5|=0.62. A combined focal length f56 of the fifth lens E5 and the sixth lens E6 and the total effective focal length f satisfy: f/f56=−0.04. The total effective focal length f and an entrance pupil diameter EPD of the camera lens assembly satisfy: f/EPD=1.78.

Table 8 shows a surface form, radius of curvature, thickness, material and conic coefficient of each lens in Embodiment 3. Table 9 shows high-order coefficients A4, A6, A8, A10, A12, A16, A18 and A20 that can be applied to the aspheric mirror surfaces S1-S12 in Embodiment 3.

Referring to Table 8 and Table 9, a center thickness CT2 of the second lens E2 and a center thickness CT5 of the fifth lens E5 satisfy: CT2/CT5=1.21.

TABLE 8

| surface number | surface form | radius of curvature | thickness | material | conic coefficient |
|---|---|---|---|---|---|
| OBJ | spherical | infinite | infinite | | |
| STO | spherical | infinite | −0.2315 | | |
| S1 | aspheric | 1.5241 | 0.3740 | 1.54, 56.1 | −11.5739 |
| S2 | aspheric | 1.7458 | 0.1051 | | −12.7148 |
| S3 | aspheric | 1.9481 | 0.5197 | 1.54, 56.1 | −8.8959 |
| S4 | aspheric | −7.7077 | 0.0087 | | −77.3896 |
| S5 | aspheric | 7.5470 | 0.2349 | 1.66, 20.4 | 12.4180 |
| S6 | aspheric | 2.2498 | 0.4264 | | −22.9189 |
| S7 | aspheric | −90.4969 | 0.3376 | 1.65, 21.5 | 99.0000 |
| S8 | aspheric | 488.7268 | 0.3078 | | 98.6788 |
| S9 | aspheric | 3.2188 | 0.4293 | 1.54, 56.1 | −13.7622 |
| S10 | aspheric | infinite | 0.1849 | | 98.1035 |
| S11 | aspheric | 2.1913 | 0.4742 | 1.54, 56.1 | −3.3391 |
| S12 | aspheric | 1.0646 | 0.2426 | | −4.7341 |
| S13 | spherical | infinite | 0.2100 | 1.52, 64.2 | |
| S14 | spherical | infinite | 0.4535 | | |
| S15 | spherical | infinite | | | |

TABLE 9

| surface number | A4 | A6 | A8 | A10 | A12 |
|---|---|---|---|---|---|
| S1 | 3.4717E−01 | −6.9996E−01 | 1.1140E+00 | −1.2580E+00 | 7.2630E−01 |
| S2 | 1.3634E−01 | −6.9223E−01 | 1.3867E+00 | −2.5347E+00 | 3.3864E+00 |
| S3 | 3.3082E−02 | −3.4566E−01 | 7.6049E−01 | −1.9137E+00 | 3.5717E+00 |
| S4 | −1.7834E−01 | 9.2245E−01 | −3.4096E+00 | 7.1450E+00 | −8.7032E+00 |
| S5 | −2.0744E−01 | 9.7073E−01 | −3.1852E+00 | 6.1943E+00 | −7.3447E+00 |
| S6 | 1.5788E−01 | −3.1730E−01 | 1.0403E+00 | −2.6998E+00 | 4.0796E+00 |
| S7 | −1.4083E−01 | −1.1692E−01 | 1.1103E+00 | −3.3637E+00 | 5.9285E+00 |
| S8 | −1.7512E−01 | −1.3284E−01 | 5.6367E−01 | −7.7901E−01 | 5.6529E−01 |
| S9 | 1.8442E−01 | −4.5890E−01 | 5.4140E−01 | −5.5520E−01 | 4.0871E−01 |
| S10 | 1.8957E−01 | −1.3849E−01 | −9.9395E−02 | 1.9145E−01 | −1.3298E−01 |
| S11 | −4.4297E−01 | 3.8666E−01 | −2.9695E−01 | 2.3656E−01 | −1.5545E−01 |
| S12 | −2.1375E−01 | 1.6642E−01 | −1.0147E−01 | 4.5043E−02 | −1.3616E−02 |

| surface number | A14 | A16 | A18 | A20 |
|---|---|---|---|---|
| S1 | −1.0345E−01 | −7.5999E−02 | 2.6053E−02 | 0 |
| S2 | −2.6064E+00 | 1.0376E+00 | −1.6847E−01 | 0 |
| S3 | −3.3548E+00 | 1.4909E+00 | −2.5113E−01 | 0 |
| S4 | 6.0900E+00 | −2.2511E+00 | 3.3709E−01 | 0 |
| S5 | 5.0415E+00 | −1.7606E+00 | 2.2914E−01 | 0 |
| S6 | −3.3080E+00 | 1.2418E+00 | −1.0485E−01 | 0 |
| S7 | −6.1557E+00 | 3.5035E+00 | −8.5913E−01 | 0 |
| S8 | −1.0914E−01 | −8.2595E−02 | 3.3165E−02 | 0 |
| S9 | −1.9070E−01 | 5.4808E−02 | −9.2184E−03 | 7.1895E−04 |
| S10 | 5.0283E−02 | −1.0390E−02 | 1.0486E−03 | −3.6490E−05 |
| S11 | 6.6612E−02 | −1.6760E−02 | 2.2462E−03 | −1.2394E−04 |
| S12 | 2.6723E−03 | −3.2437E−04 | 2.2089E−05 | −6.4398E−07 |

In Embodiment 3, a radius of curvature R5 of the object-side surface of the third lens E3 and a radius of curvature R6 of the image-side surface thereof satisfy: (R5−R6)/(R5+R6)=0.54. A radius of curvature R9 of the object-side surface of the fifth lens E5 and a radius of curvature R12 of the image-side surface of the sixth lens E6 satisfy: R12/R9=0.33. A radius of curvature R11 of the object-side surface of the sixth lens E6 and a radius of curvature R12 of the image-side surface thereof satisfy: (R11−R12)/(R11+R12)=0.35.

Moreover, in Embodiment 3, an axial spacing T23 between the second lens E2 and the third lens E3 and an axial spacing T12 between the first lens E1 and the second lens E2 satisfy: T23/T12=0.08. An axial spacing T34 between the third lens E3 and the fourth lens E4 and a center thickness of the fourth lens E4 satisfy T34/CT4=1.26. An axial distance TTL from the object-side surface of the first lens to an image-side surface of a photosensitive component and ImgH, ImgH being half a diagonal length of an effective pixel area of a photosensitive component, satisfy: TTL/ImgH=1.57.

Figure 6A:
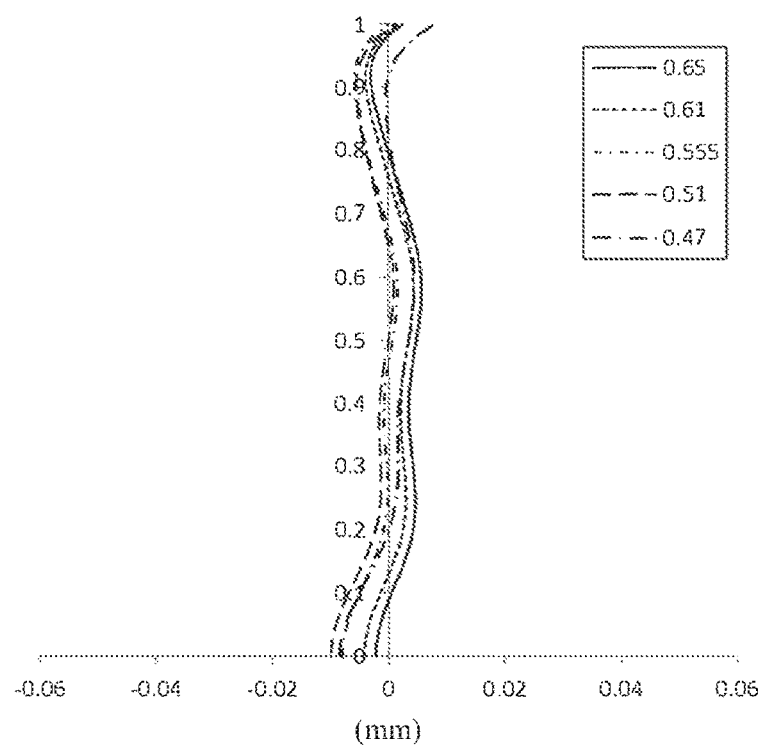
FIG. 6A illustrates an longitudinal aberration curve of the camera lens assembly according to Embodiment 3.
Figure 6B:
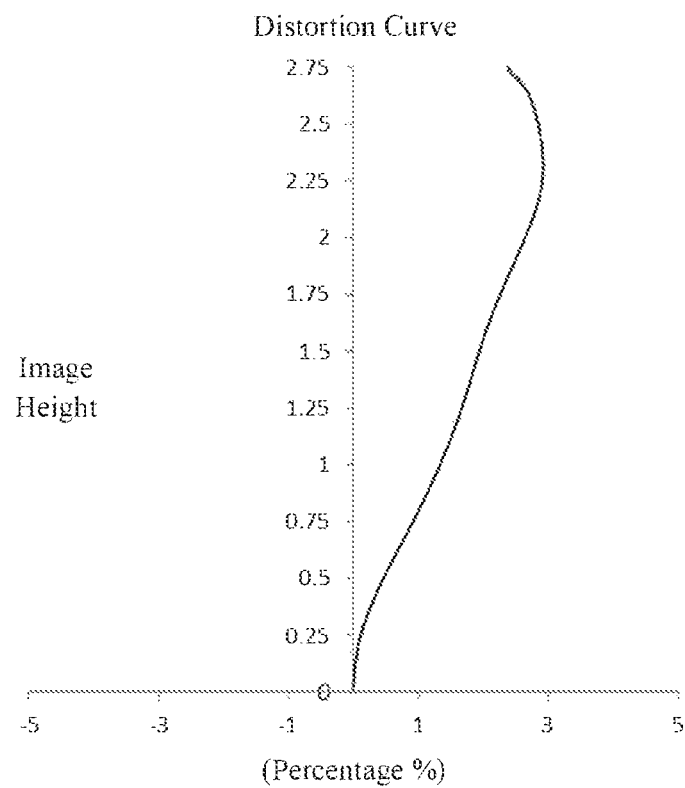
FIG. 6B illustrates a distortion curve of the camera lens assembly according to Embodiment 3.
Figure 6C:
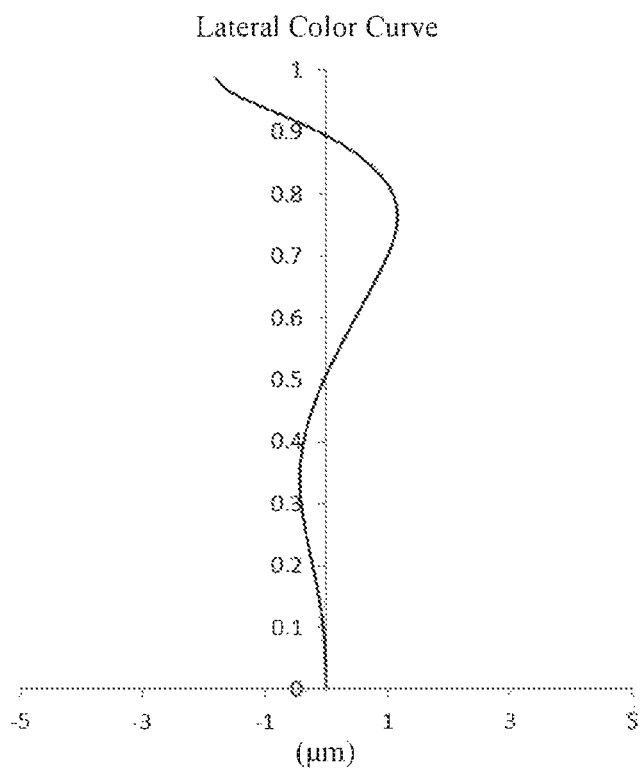
FIG. 6C illustrates a lateral color curve of the camera lens assembly according to Embodiment 3.
Figure 6D:
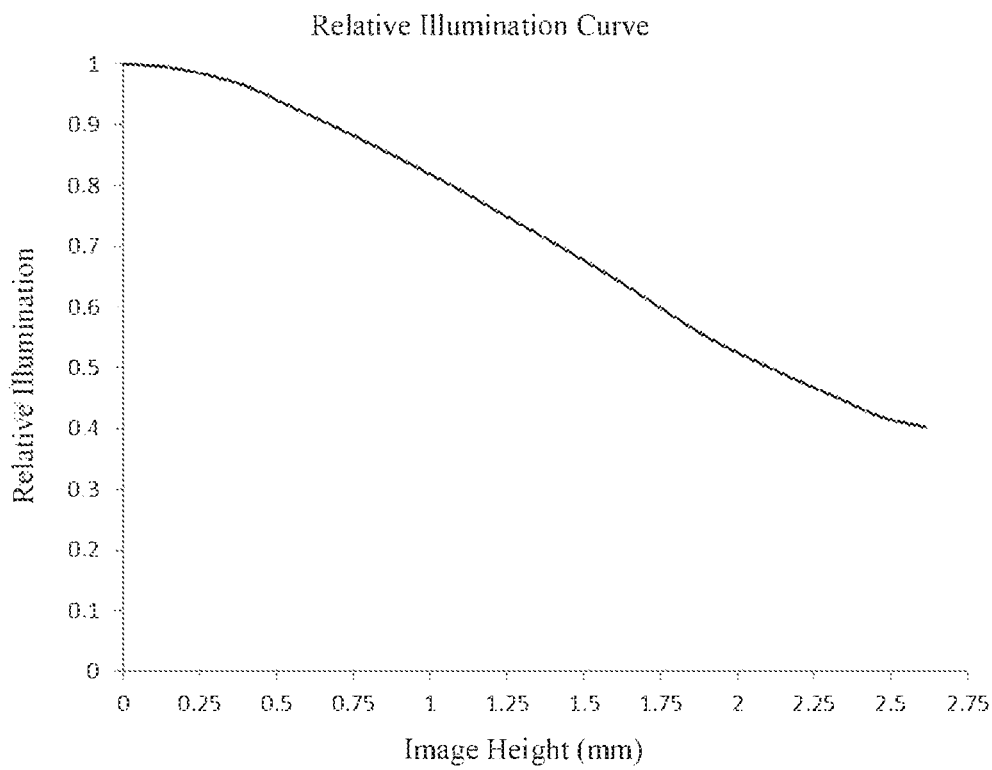
FIG. 6D illustrates a relative illumination curve of the camera lens assembly according to Embodiment 3.

FIG. 6A illustrates an longitudinal aberration curve of the camera lens assembly according to Embodiment 3, representing deviations of focal points of light of different wavelengths converged after passing through an optical system. FIG. 6B illustrates a distortion curve of the camera lens assembly according to Embodiment 3, representing amounts of distortion at different viewing angles. FIG. 6C illustrates a lateral color curve of the camera lens assembly according to Embodiment 3, representing deviations of different image heights on an image plane after light passes through the camera lens assembly. FIG. 6D illustrates a relative illumination curve of the camera lens assembly according to Embodiment 3, representing ratios of central illuminations to peripheral illuminations. It can be seen from FIG. 6A to FIG. 6D that the camera lens assembly provided in Embodiment 3 achieves good image quality.

Embodiment 4

Figure 7:
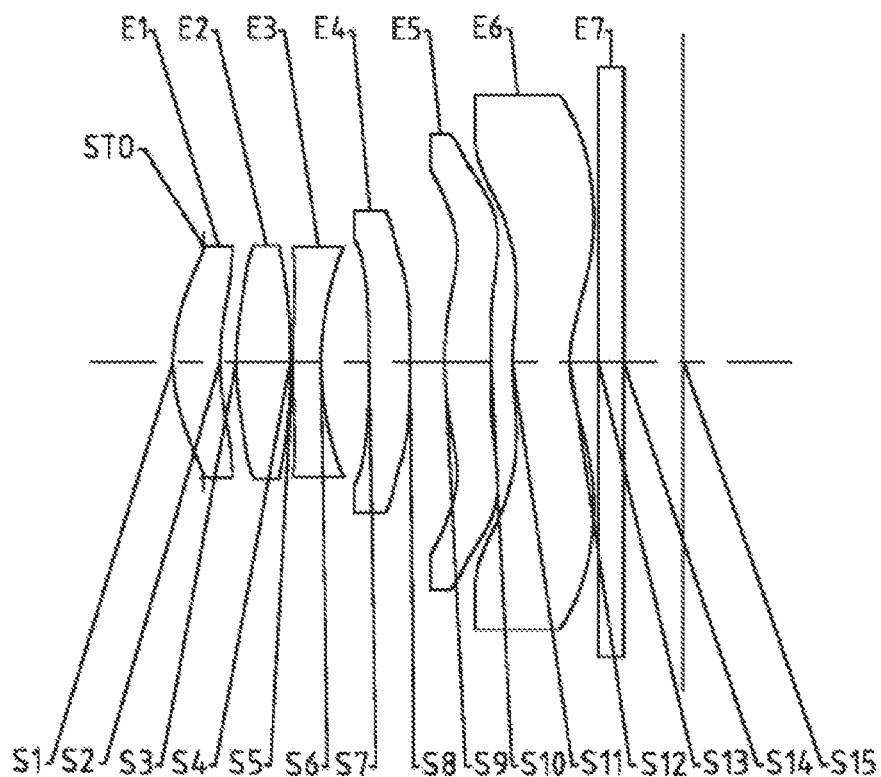
FIG. 7 is a schematic structural diagram of a camera lens assembly according to Embodiment 4 of the present application.

Embodiment 4 according to the camera lens assembly of the present application will be described below with reference to FIG. 7 to FIG. 8D. FIG. 7 is a schematic structural diagram of a camera lens assembly according to Embodiment 4. As shown in FIG. 7, the camera lens assembly according to Embodiment 4 includes the first lens to the sixth lens E1-E6 respectively having an object-side surface and an image-side surface.

Table 10 below shows effective focal lengths f1 to f6 of the lenses, a total effective focal length f of the camera lens assembly, and a total track length TTL and a half field-of-view (diagonal) angle HFOV of the camera lens according to Embodiment 3.

In Embodiment 4, the effective focal length f1 of the first lens E1 and the total effective focal length f satisfy: f/f1=0.41. A combined focal length f12 of the first lens E1 and the second lens E2 and an effective focal length of the third lens E3 satisfy: f12/f3=−0.54. A combined focal length f23 of the second lens E2 and the third lens E3 and the total effective focal length f satisfy: f/f23=0.42. The effective focal length f4 of the fourth lens E4, the effective focal length f5 of the fifth lens E5 and the total effective focal length f satisfy: |f/f4|+|f/f5|=0.62. A combined focal length f56 of the fifth lens E5 and the sixth lens E6 and the total effective focal length f satisfy: f/f56=−0.01. The total effective focal length f and an entrance pupil diameter EPD of the camera lens assembly satisfy: f/EPD=1.78.

TABLE 10

| f1 (mm) | 8.41 | f (mm) | 3.48 |
|---|---|---|---|
| f2 (mm) | 3.36 | TTL (mm) | 4.27 |
| f3 (mm) | −4.88 | HFOV (deg) | 37.48 |
| f4 (mm) | −117.27 | | |
| f5 (mm) | 5.89 | | |
| f6 (mm) | −4.66 | | |

Table 11 shows a surface form, radius of curvature, thickness, material and conic coefficient of each lens in Embodiment 4. Table 12 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 4.

TABLE 11

| surface number | surface form | radius of curvature | thickness | material | conic coefficient |
|---|---|---|---|---|---|
| OBJ | spherical | infinite | infinite | | |
| STO | spherical | infinite | −0.2544 | | |
| S1 | aspheric | 1.5227 | 0.3923 | 1.54, 56.1 | −11.6159 |
| S2 | aspheric | 2.0749 | 0.1353 | | −12.7994 |
| S3 | aspheric | 2.3964 | 0.4551 | 1.54, 56.1 | −8.8682 |
| S4 | aspheric | −7.1899 | 0.0212 | | −70.9073 |
| S5 | aspheric | 8.2341 | 0.2349 | 1.66, 20.4 | 5.9547 |
| S6 | aspheric | 2.2918 | 0.4026 | | −24.2663 |
| S7 | aspheric | −90.4969 | 0.3439 | 1.65, 21.5 | 99.0000 |
| S8 | aspheric | 488.7268 | 0.2856 | | 98.7059 |
| S9 | aspheric | 3.2023 | 0.3871 | 1.54, 56.1 | −12.0287 |
| S10 | aspheric | infinite | 0.1797 | | 98.1029 |
| S11 | aspheric | 2.1270 | 0.4826 | 1.54, 56.1 | −3.3659 |
| S12 | aspheric | 1.0646 | 0.2414 | | −4.5991 |

TABLE 11-continued

| surface number | surface form | radius of curvature | thickness | material | conic coefficient |
|---|---|---|---|---|---|
| S13 | spherical | infinite | 0.2100 | 1.52, 64.2 | |
| S14 | spherical | infinite | 0.5020 | | |
| S15 | spherical | infinite | | | |

Referring to Table 11 and Table 12, a center thickness CT2 of the second lens E2 and a center thickness CT5 of the fifth lens E5 satisfy: CT2/CT5=1.18.

In Embodiment 4, a radius of curvature R5 of the object-side surface of the third lens E3 and a radius of curvature R6 of the image-side surface thereof satisfy: (R5−R6)/(R5+R6)=0.56. A radius of curvature R9 of the object-side surface of the fifth lens E5 and a radius of curvature R12 of the image-side surface of the sixth lens E6 satisfy: R12/R9=0.33. A radius of curvature R11 of the object-side surface of the sixth lens E6 and a radius of curvature R12 of the image-side surface thereof satisfy: (R11−R12)/(R11+R12)=0.33.

Moreover, in Embodiment 4, an axial spacing T23 between the second lens E2 and the third lens E3 and an axial spacing T12 between the first lens E1 and the second lens E2 satisfy: T23/T12=0.16. An axial spacing 134 between the third lens E3 and the fourth lens E4 and a center thickness of the fourth lens E4 satisfy T34/CT4=1.17. An axial distance TTL from the object-side surface of the first lens to an image-side surface of a photosensitive component and ImgH, ImgH being half a diagonal length of an effective pixel area of a photosensitive component, satisfy: TTL/ImgH=1.55.

TABLE 12

| surface number | A4 | A6 | A8 | A10 | A12 |
|---|---|---|---|---|---|
| S1 | 3.5290E−01 | −6.5613E−0 | 8.8304E−01 | −6.7908E−0 | −1.0447E−0 |
| S2 | 7.1773E−02 | −4.0853E−0 | 8.2018E−01 | −1.6439E+0 | 2.1694E+00 |
| S3 | −7.6572E−0 | −1.9363E−0 | 4.5956E−01 | −1.0694E+0 | 1.5623E+00 |
| S4 | −1.5699E−0 | 7.8852E−01 | −2.7960E+0 | 5.3067E+00 | −5.6940E+0 |
| S5 | −1.8534E−0 | 8.8961E−01 | −2.7836E+0 | 4.5746E+00 | −4.0310E+0 |
| S6 | 1.5324E−01 | −3.0460E−0 | 1.1332E+00 | −3.4596E+0 | 6.0708E+00 |
| S7 | −1.4539E−0 | −1.9917E−0 | 1.8162E+00 | −5.8320E+0 | 1.0689E+01 |
| S8 | −1.9073E−0 | −1.7250E−0 | 8.1795E−01 | −1.3558E+0 | 1.2924E+00 |
| S9 | 1.9991E−01 | −5.1097E−0 | 6.5698E−01 | −7.5682E−0 | 6.2506E−01 |
| S10 | 2.0076E−01 | −1.0034E−0 | −2.0019E−0 | 2.8743E−01 | −1.8241E−0 |
| S11 | −4.6566E−0 | 4.4186E−01 | −3.3287E−0 | 2.2444E−01 | −1.2883E−0 |
| S12 | −2.3495E−0 | 2.0930E−01 | −1.4478E−0 | 7.0576E−02 | −2.3037E−0 |

| surface number | A14 | A16 | A18 | A20 |
|---|---|---|---|---|
| S1 | 5.6042E−01 | −3.5068E−0 | 7.2089E−02 | 0 |
| S2 | −1.5215E+0 | 5.3386E−01 | −7.6657E−0 | 0 |
| S3 | −7.8184E−0 | −1.1900E−0 | 1.4423E−01 | 0 |
| S4 | 3.4522E+00 | −1.0787E+0 | 1.2882E−01 | 0 |
| S5 | 1.5781E+00 | 2.7485E−02 | −1.3339E−0 | 0 |
| S6 | −5.8093E+0 | 2.7828E+00 | −4.7723E−0 | 0 |
| S7 | −1.1450E+0 | 6.6780E+00 | −1.6566E+0 | 0 |
| S8 | −6.4465E−0 | 1.3282E−01 | −3.4318E−0 | 0 |
| S9 | −3.2603E−0 | 1.0301E−01 | −1.8180E−0 | 1.3818E−03 |
| S10 | 6.5238E−02 | −1.3038E−0 | 1.3025E−03 | −4.6699E−0 |
| S11 | 5.2533E−02 | −1.3189E−0 | 1.8009E−03 | −1.0225E−0 |
| S12 | 4.8873E−03 | −6.4598E−0 | 4.8290E−05 | −1.5560E−0 |

Figure 8A:
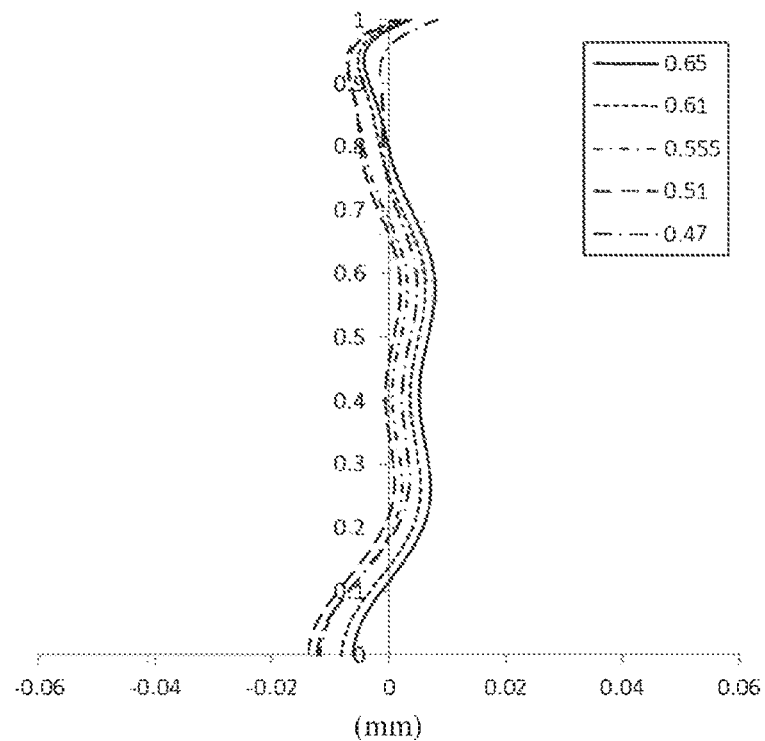
FIG. 8A illustrates an longitudinal aberration curve of the camera lens assembly according to Embodiment 4.
Figure 8B:
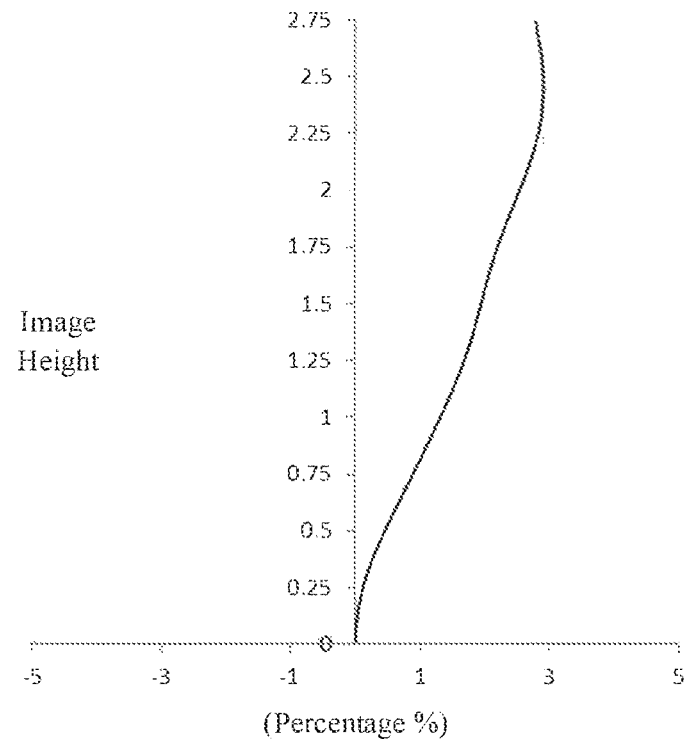
FIG. 8B illustrates a distortion curve of the camera lens assembly according to Embodiment 4.
Figure 8C:
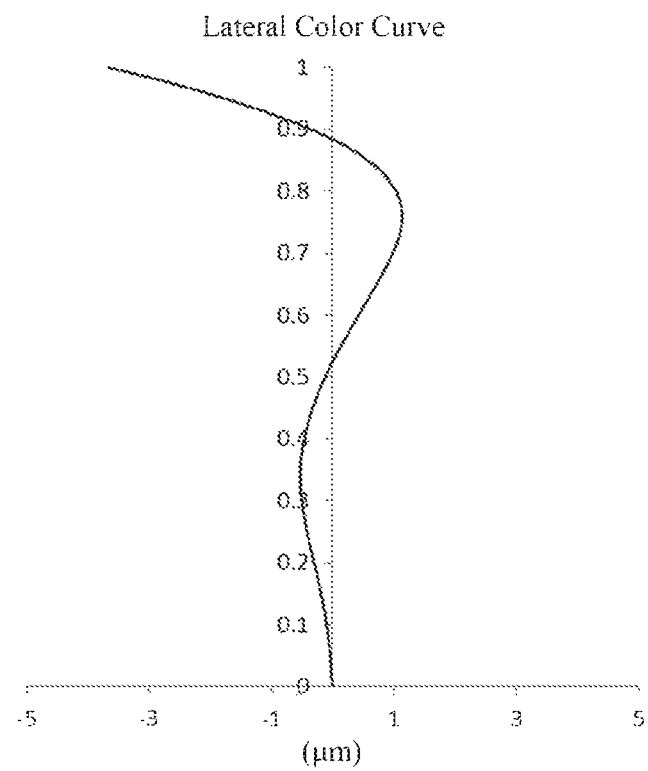
FIG. 8C illustrates a lateral color curve of the camera lens assembly according to Embodiment 4.
Figure 8D:
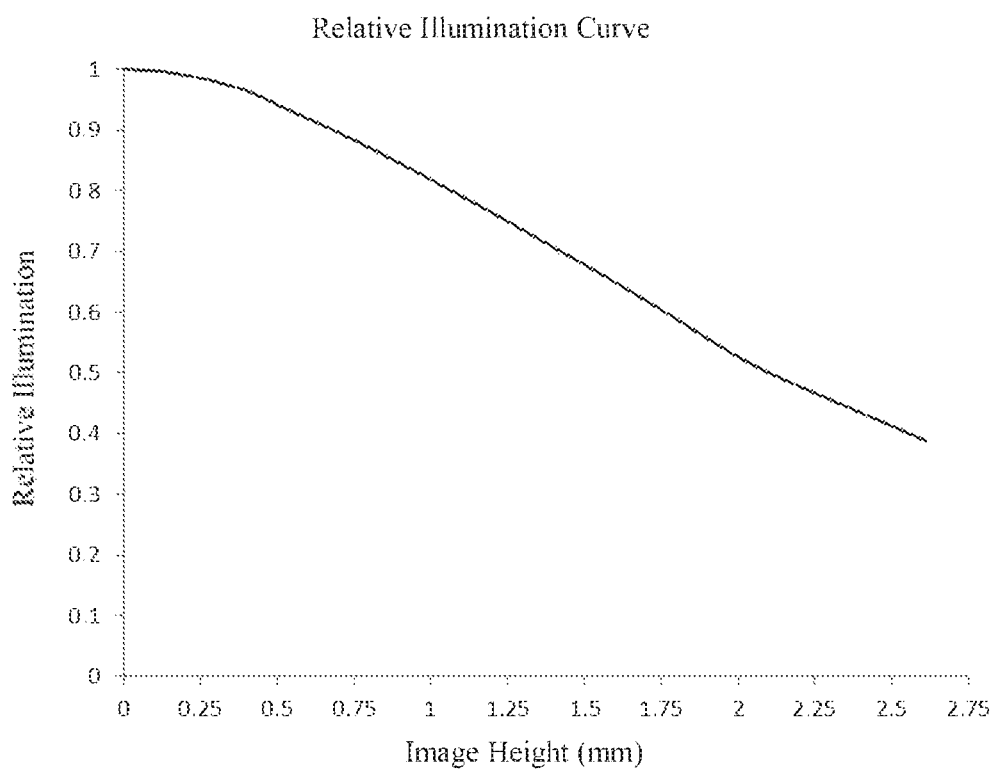
FIG. 8D illustrates a relative illumination curve of the camera lens assembly according to Embodiment 4.

FIG. 8A illustrates an longitudinal aberration curve of the camera lens assembly according to Embodiment 4, representing deviations of focal points of light of different wavelengths converged after passing through an optical system. FIG. 8B illustrates a distortion curve of the camera lens assembly according to Embodiment 4, representing amounts of distortion at different viewing angles. FIG. 8C illustrates a lateral color curve of the camera lens assembly according to Embodiment 4, representing deviations of different image heights on an image plane after light passes through the camera lens assembly. FIG. 8D illustrates a relative illumination curve of the camera lens assembly according to Embodiment 4, representing ratios of central illuminations to peripheral illuminations. It can be seen from FIG. 8A to FIG. 8D that the camera lens assembly provided in Embodiment 4 achieves good image quality.

Embodiment 5

Figure 9:
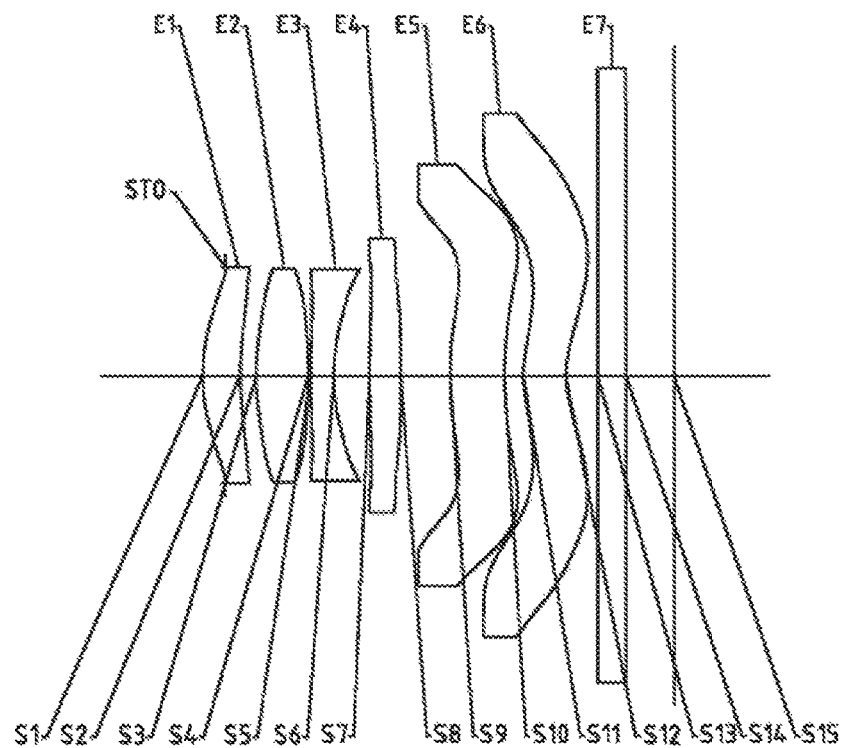
FIG. 9 is a schematic structural diagram of a camera lens assembly according to Embodiment 5 of the present application.

Embodiment 5 according to the camera lens assembly of the present application will be described below with reference to FIG. 9 to FIG. 10D. FIG. 9 is a schematic structural diagram of a camera lens assembly according to Embodiment 5. As shown in FIG. 9, the camera lens assembly according to Embodiment 5 includes the first lens to the sixth lens E1-E6 respectively having an object-side surface and an image-side surface. Table 13 below shows effective focal lengths f1 to f6 of the lenses, a total effective focal length f of the camera lens assembly, and a total track length TTL and a half field-of-view (diagonal) angle HFOV of the camera lens according to Embodiment 5.

TABLE 13

| f1 (mm) | 9.16 | f (mm) | 4.07 |
|---|---|---|---|
| f2 (mm) | 3.84 | TTL (mm) | 4.95 |
| f3 (mm) | −4.52 | HFOV (deg) | 40.29 |
| f4 (mm) | 18.03 | | |
| f5 (mm) | −128.45 | | |
| f6 (mm) | −22.89 | | |

In Embodiment 5, the effective focal length f1 of the first lens E1 and the total effective focal length f satisfy: f/f1=0.44. A combined focal length f12 of the first lens E1 and the second lens E2 and an effective focal length of the third lens E3 satisfy: f12/f3=−0.64. A combined focal length f23 of the second lens E2 and the third lens E3 and the total effective focal length f satisfy: f/f23=0.27. The effective focal length f4 of the fourth lens E4, the effective focal length f5 of the fifth lens E5 and the total effective focal length f satisfy: |f/f4|+|f/f5|=0.26. A combined focal length f56 of the fifth lens E5 and the sixth lens E6 and the total effective focal length f satisfy: f/f56=−0.21. The total effective focal length f and an entrance pupil diameter EPD of the camera lens assembly satisfy: f/EPD=1.79.

Table 14 shows a surface form, radius of curvature, thickness, material and conic coefficient of each lens in Embodiment 5. Table 15 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 5.

Referring to Table 14 and Table 15, a center thickness CT2 of the second lens E2 and a center thickness CT5 of the fifth lens E5 satisfy: CT2/CT5=0.96.

In Embodiment 5, a radius of curvature R5 of the object-side surface of the third lens E3 and a radius of curvature R6 of the image-side surface thereof satisfy: (R5−R6)/(R5+R6)=0.59.

A radius of curvature R9 of the object-side surface of the fifth lens E5 and a radius of curvature R12 of the image-side surface of the sixth lens E6 satisfy: R12/R9=0.28. A radius of curvature R11 of the object-side surface of the sixth lens E6 and a radius of curvature R12 of the image-side surface thereof satisfy: (R11−R12)/(R11+R12)=0.11.

TABLE 14

| surface number | surface form | radius of curvature | thickness | material | conic coefficient |
|---|---|---|---|---|---|
| OBJ | spherical | infinite | infinite | | |
| STO | spherical | infinite | −0.2368 | | |
| S1 | aspheric | 1.9710 | 0.3921 | 1.54, 56.1 | −14.2303 |
| S2 | aspheric | 3.0322 | 0.1702 | | −12.1722 |
| S3 | aspheric | 2.8222 | 0.5481 | 1.54, 56.1 | −7.9944 |
| S4 | aspheric | −7.5272 | 0.0250 | | −44.2499 |
| S5 | aspheric | 8.0810 | 0.2430 | 1.64, 23.5 | −3.7447 |
| S6 | aspheric | 2.1041 | 0.3740 | | −19.3801 |
| S7 | aspheric | 9.8789 | 0.3269 | 1.64, 23.5 | −84.2139 |
| S8 | aspheric | 67.9524 | 0.5142 | | −99.0000 |
| S9 | aspheric | 3.7884 | 0.5691 | 1.54, 56.1 | −18.2604 |
| S10 | aspheric | 3.4034 | 0.1984 | | −70.3564 |
| S11 | aspheric | 1.3473 | 0.4454 | 1.54, 56.1 | −5.8595 |
| S12 | aspheric | 1.0741 | 0.3357 | | −3.8056 |
| S13 | spherical | infinite | 0.3000 | 1.52, 64.2 | |
| S14 | spherical | infinite | 0.5079 | | |
| S15 | spherical | infinite | | | |

Moreover, in Embodiment 5, an axial spacing T23 between the second lens E2 and the third lens E3 and an axial spacing T12 between the first lens E1 and the second lens E2 satisfy: T23/T12=0.15. An axial spacing I34 between the third lens E3 and the fourth lens E4 and a center thickness of the fourth lens E4 satisfy T34/CT4=1.14. An axial distance TTL from the object-side surface of the first lens to an image-side surface of a photosensitive component and ImgH, ImgH being half a diagonal length of an effective pixel area of a photosensitive component, satisfy: TTL/ImgH=1.52.

TABLE 15

| surface number | A4 | A6 | A8 | A10 | A12 |
|---|---|---|---|---|---|
| S1 | 1.8635E−01 | −3.1227E−01 | 3.8896E−01 | −3.7525E−01 | 2.0968E−01 |
| S2 | 4.5378E−02 | −5.7885E−02 | 1.0454E−01 | −1.4841E−01 | 2.0039E−01 |
| S3 | −3.4072E−02 | −3.2170E−03 | 4.1444E−02 | 1.5186E−01 | −1.3068E−01 |
| S4 | −3.1326E−02 | −1.0249E−02 | −8.9273E−02 | 1.8694E−01 | −1.3236E−01 |
| S5 | −8.8522E−02 | 1.4399E−01 | −3.6826E−01 | 5.1184E−01 | −3.8631E−01 |
| S6 | 1.4904E−01 | −2.8883E−01 | 6.2783E−01 | −1.1366E+0 | 1.3886E+00 |
| S7 | −6.0769E−02 | 8.4533E−03 | 1.3332E−01 | −2.9038E−01 | 3.6766E−01 |
| S8 | −8.1298E−02 | −2.4028E−02 | 1.3619E−01 | −1.6374E−01 | 1.2156E−01 |
| S9 | 5.6918E−02 | −1.2940E−01 | 1.4320E−01 | −1.8514E−01 | 1.6186E−01 |
| S10 | 2.1183E−02 | 9.0568E−02 | −1.5729E−01 | 1.0570E−01 | −4.0158E−02 |
| S11 | −3.2688E−01 | 2.9554E−01 | −1.7475E−01 | 6.2179E−02 | −1.3683E−02 |
| S12 | −2.1661E−01 | 1.6163E−01 | −8.3445E−02 | 2.5834E−02 | −4.7292E−03 |

TABLE 15-continued

| surface number | A14 | A16 | A18 | A20 |
|---|---|---|---|---|
| S1 | −4.3099E−02 | −8.2667E−03 | 3.5610E−03 | 0 |
| S2 | −1.6017E−01 | 7.0374E−02 | −1.3559E−0 | 0 |
| S3 | 5.4225E−02 | −1.5651E−02 | 2.7121E−03 | 0 |
| S4 | 1.7276E−02 | 1.9836E−02 | −6.8301E−0 | 0 |
| S5 | 1.5875E−01 | −2.6210E−02 | −3.1534E−0 | 0 |
| S6 | −1.0152E+00 | 4.0032E−01 | −6.3130E−0 | 0 |
| S7 | −2.8526E−01 | 1.2298E−01 | −2.3128E−0 | 0 |
| S8 | −4.8319E−02 | 7.5607E−03 | −7.3130E−0 | 0 |
| S9 | −8.5188E−02 | 2.5984E−02 | 4.2006E−0 | 2.7718E−04 |
| S10 | 9.0277E−03 | −1.1694E−03 | 8.0163E−05 | −2.2699E−0 |
| S11 | 1.9436E−03 | −1.8090E−04 | 1.0447E−05 | −2.8975E−0 |
| S12 | 5.1032E−04 | −3.2224E−05 | 1.2175E−06 | −2.6914E−0 |

Figure 10A:
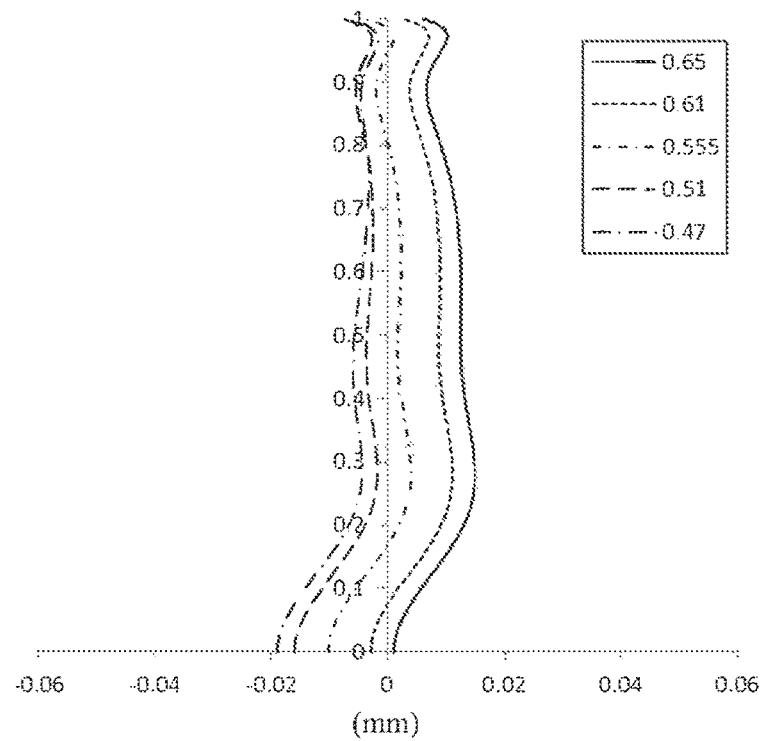
FIG. 10A illustrates an longitudinal aberration curve of the camera lens assembly according to Embodiment 5.
Figure 10B:
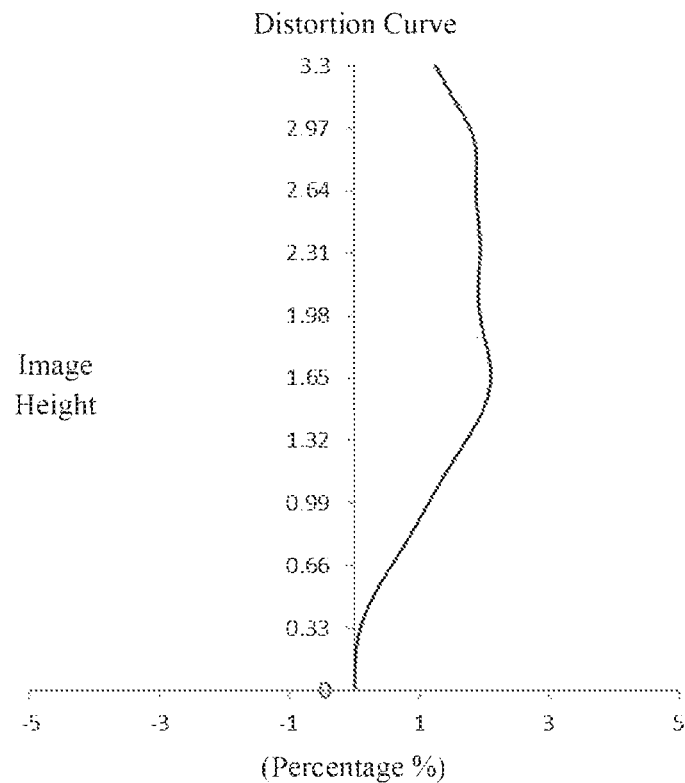
FIG. 10B illustrates a distortion curve of the camera lens assembly according to Embodiment 5.
Figure 10C:
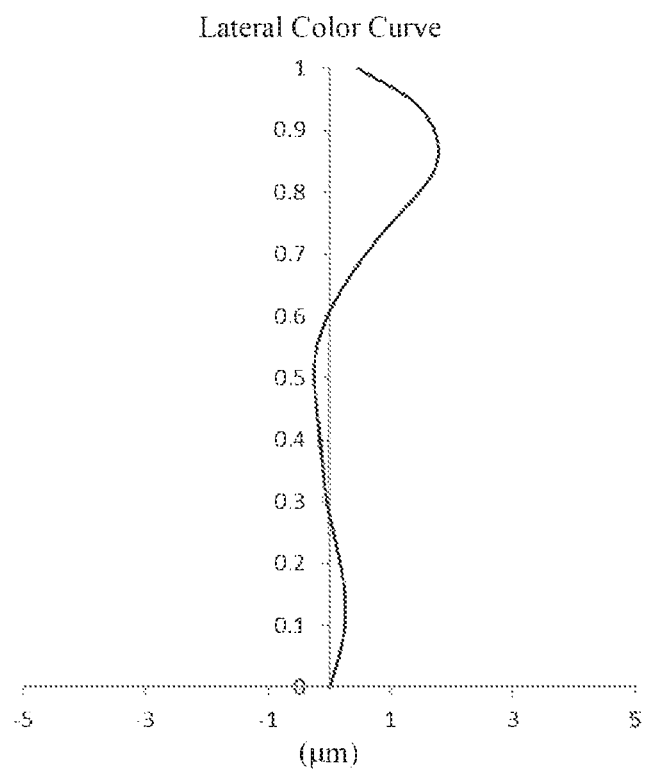
FIG. 10C illustrates a lateral color curve of the camera lens assembly according to Embodiment 5.
Figure 10D:
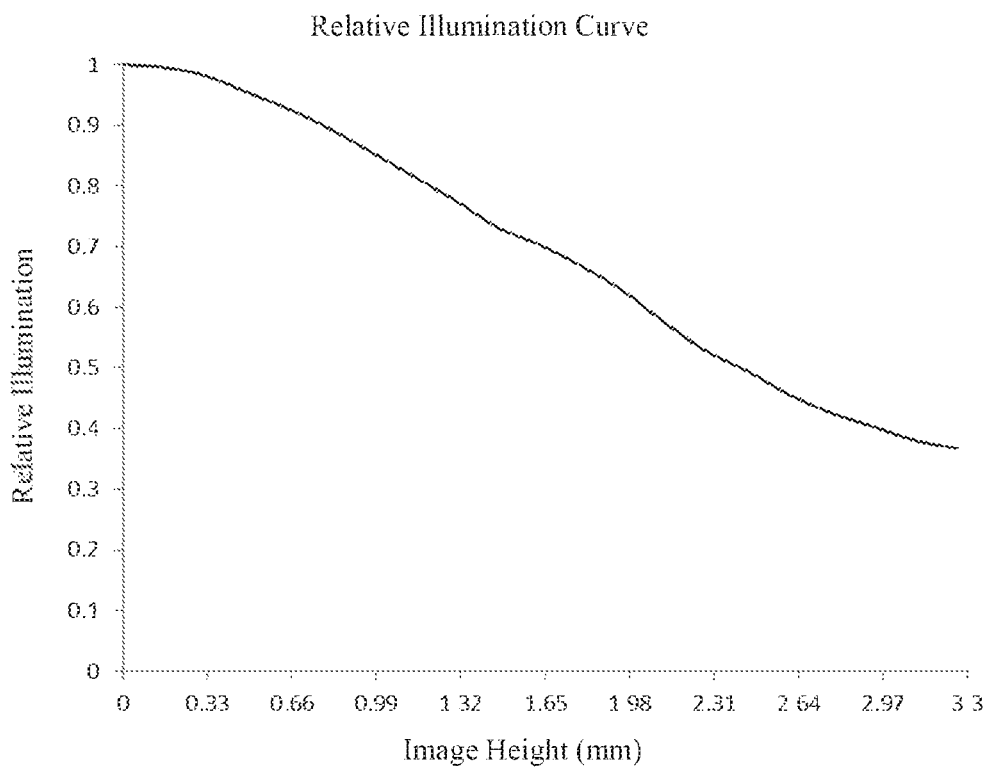
FIG. 10D illustrates a relative illumination curve of the camera lens assembly according to Embodiment 5.

FIG. 10A illustrates an longitudinal aberration curve of the camera lens assembly according to Embodiment 5, representing deviations of focal points of light of different wavelengths converged after passing through an optical system. FIG. 10B illustrates a distortion curve of the camera lens assembly according to Embodiment 5, representing amounts of distortion at different viewing angles. FIG. 10C illustrates a lateral color curve of the camera lens assembly according to Embodiment 5, representing deviations of different image heights on an image plane after light passes through the camera lens assembly. FIG. 10D illustrates a relative illumination curve of the camera lens assembly according to Embodiment 5, representing ratios of central illuminations to peripheral illuminations. It can be seen from FIG. 10A to FIG. 10D that the camera lens assembly provided in Embodiment 5 achieves good image quality.

Embodiment 6

Figure 11:
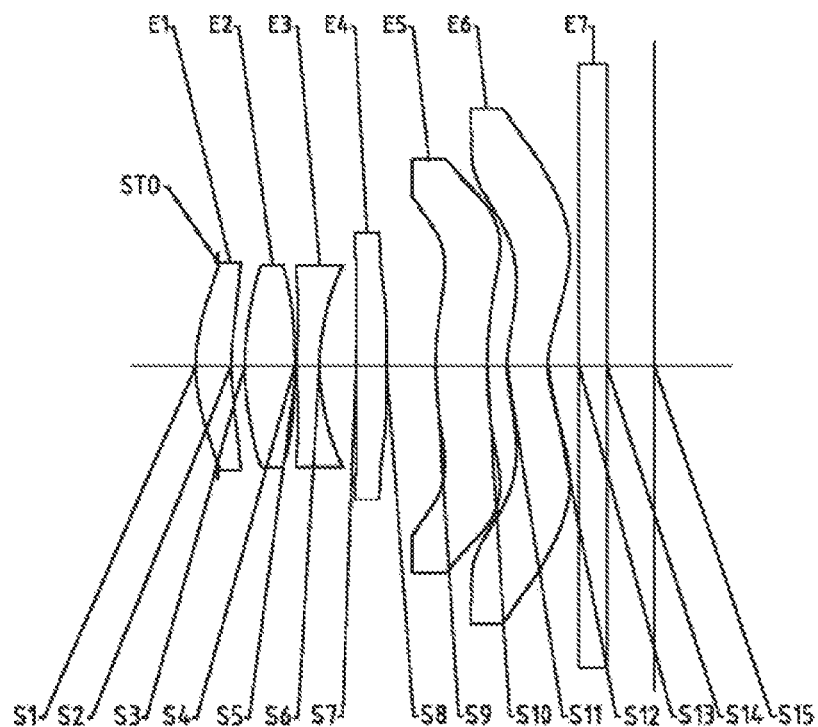
FIG. 11 is a schematic structural diagram of a camera lens assembly according to Embodiment 6 of the present application.

Embodiment 6 according to the camera lens assembly of the present application will be described below with reference to FIG. 11 to FIG. 12D. FIG. 11 is a schematic structural diagram of a camera lens assembly according to Embodiment 6. As shown in FIG. 11, the camera lens assembly according to Embodiment 6 includes the first lens to the sixth lens E1-E6 respectively having an object-side surface and an image-side surface. Table 16 below shows effective focal lengths f1 to f6 of the lenses, a total effective focal length f of the camera lens assembly, and a total track length TTL and a half field-of-view (diagonal) angle HFOV of the camera lens according to Embodiment 6.

TABLE 16

| f1 (mm) | 10.75 | f (mm) | 4.04 |
|---|---|---|---|
| f2 (mm) | 3.47 | TTL (mm) | 4.95 |
| f3 (mm) | −4.21 | HFOV (deg) | 40.47 |
| f4 (mm) | 17.22 | | |
| f5 (mm) | 111.24 | | |
| f6 (mm) | −16.19 | | |

According to Table 16, the effective focal length f1 of the first lens E1 and the total effective focal length f satisfy: f/f1=0.38.

In Embodiment 6, a combined focal length f12 of the first lens E1 and the second lens E2 and an effective focal length of the third lens E3 satisfy: f12/f3=−0.67. A combined focal length f23 of the second lens E2 and the third lens E3 and the total effective focal length f satisfy: f/f23=0.34. The effective focal length f4 of the fourth lens E4, the effective focal length f5 of the fifth lens E5 and the total effective focal length f satisfy: |f/f4|+|f/f5|=0.27. A combined focal length f56 of the fifth lens E5 and the sixth lens E6 and the total effective focal length f satisfy: f/f56=−0.19. The total effective focal length f and an entrance pupil diameter EPD of the camera lens assembly satisfy: f/EPD=1.79.

Table 17 shows a surface form, radius of curvature, thickness, material and conic coefficient of each lens in Embodiment 6. Table 18 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 6.

TABLE 17

| surface number | surface form | radius of curvature | thickness | material | conic coefficient |
|---|---|---|---|---|---|
| OBJ | spherical | infinite | infinite | | |
| STO | spherical | infinite | −0.2357 | | |
| S1 | aspheric | 1.9196 | 0.3810 | 1.54, 56.1 | −14.4979 |
| S2 | aspheric | 2.6573 | 0.1444 | | −12.5257 |
| S3 | aspheric | 2.5265 | 0.5431 | 1.54, 56.1 | −7.6710 |
| S4 | aspheric | −6.9129 | 0.0250 | | −54.6465 |
| S5 | aspheric | 9.3751 | 0.2430 | 1.64, 23.5 | −13.7674 |
| S6 | aspheric | 2.0723 | 0.3940 | | −19.3902 |
| S7 | aspheric | 10.9971 | 0.3312 | 1.64, 23.5 | −93.6272 |
| S8 | aspheric | 6000.0000 | 0.5239 | | 97.9230 |
| S9 | aspheric | 3.7059 | 0.5573 | 1.54, 56.1 | −15.5531 |
| S10 | aspheric | 3.7385 | 0.2135 | | −82.9364 |
| S11 | aspheric | 1.3681 | 0.4417 | 1.54, 56.1 | −5.3060 |
| S12 | aspheric | 1.0495 | 0.3390 | | −3.8667 |
| S13 | spherical | infinite | 0.3000 | 1.52, 64.2 | |
| S14 | spherical | infinite | 0.5130 | | |
| S15 | spherical | infinite | | | |

TABLE 18

| surface number | A4 | A6 | A8 | A10 | A12 |
|---|---|---|---|---|---|
| S1 | 2.0363E−01 | −3.5795E−01 | 4.8729E−01 | −5.2771E−01 | 3.4716E−01 |
| S2 | −4.4048E−02 | −5.2242E−02 | 4.0119E−02 | −3.1916E−02 | 1.0574E−01 |

TABLE 18-continued

| | | | | |
|---|---|---|---|---|
| S3  | −3.2904E−02 | −6.1378E−03 | −5.9546E−02 | 1.7153E−01  | −1.0337E−01 |
| S4  | −2.1839E−02 | 1.4197E−02  | −2.4503E−01 | 4.2936E−01  | −2.5079E−01 |
| S5  | −1.0983E−01 | 3.1091E−01  | −9.6715E−01 | 1.6300E+00  | −1.5762E+00 |
| S6  | 1.6380E−01  | −4.4298E−01 | 1.3143E+00  | −2.8573E+00 | 3.9296E+00  |
| S7  | −6.7440E−02 | 9.8224E−04  | 2.3133E−01  | −5.9646E−01 | 8.5306E−01  |
| S8  | −8.6422E−02 | −8.6525E−03 | 1.0844E−01  | −1.2544E−01 | 8.4342E−02  |
| S9  | 5.3133E−02  | −1.1442E−01 | 1.1910E−01  | −1.4664E−01 | 1.2187E−01  |
| S10 | 3.0545E−02  | 8.3963E−02  | −1.5676E−01 | 1.0907E−01  | −4.3452E−02 |
| S11 | −3.3747E−02 | 3.0962E−01  | −1.8576E−01 | 6.7143E−02  | −1.5019E−02 |
| S12 | −2.0801E−01 | 1.5313E−01  | −7.8307E−02 | 2.3905E−02  | −4.2792E−03 |

| surface number | A14 | A16 | A18 | A20 |
|---|---|---|---|---|
| S1  | −1.0634E−01 | 2.9194E−03  | 3.6717E−03  | 0 |
| S2  | −1.1180E−01 | 5.2980E−02  | −1.0626E−02 | 0 |
| S3  | 1.8949E−02  | −6.7933E−03 | 3.5983E−03  | 0 |
| S4  | −3.4031E−02 | 9.1307E−02  | −2.6373E−02 | 0 |
| S5  | 8.8964E−01  | −2.6780E−01 | 3.3135E−02  | 0 |
| S6  | −3.1960E+00 | 1.4053E+00  | −2.5507E−01 | 0 |
| S7  | −7.0799E−01 | 3.1621E−01  | −5.9803E−02 | 0 |
| S8  | −2.2325E−02 | −3.5741E−03 | 1.9277E−03  | 0 |
| S9  | −6.0593E−02 | 1.7473E−02  | −2.6813E−03 | 1.6860E−04  |
| S10 | 1.0577E−02  | −1.5621E−03 | 1.3119E−04  | −4.9383E−06 |
| S11 | 2.1701E−03  | −2.0572E−04 | 1.2120E−05  | −3.4321E−07 |
| S12 | 4.4247E−04  | −2.5307E−05 | 7.6309E−07  | −1.2642E−08 |

Referring to Table 17 and Table 18, a center thickness CT2 of the second lens E2 and a center thickness CT5 of the fifth lens E5 satisfy: CT2/CT5=0.97.

In Embodiment 6, a radius of curvature R5 of the object-side surface of the third lens E3 and a radius of curvature R6 of the image-side surface thereof satisfy: (R5−R6)/(R5+R6)=0.64. A radius of curvature R9 of the object-side surface of the fifth lens E5 and a radius of curvature R12 of the image-side surface of the sixth lens E6 satisfy: R12/R9=0.28. A radius of curvature R11 of the object-side surface of the sixth lens E6 and a radius of curvature R12 of the image-side surface thereof satisfy: (R11−R12)/(R11+R12)=0.13.

Moreover, in Embodiment 6, an axial spacing T23 between the second lens E2 and the third lens E3 and an axial spacing T12 between the first lens E1 and the second lens E2 satisfy: T23/T12=0.17. An axial spacing T34 between the third lens E3 and the fourth lens E4 and a center thickness of the fourth lens E4 satisfy T34/CT4=1.19. An axial distance TTL from the object-side surface of the first lens to an image-side surface of a photosensitive component and ImgH, ImgH being half a diagonal length of an effective pixel area of a photosensitive component, satisfy: TTL/ImgH=1.52.

Figure 12A:
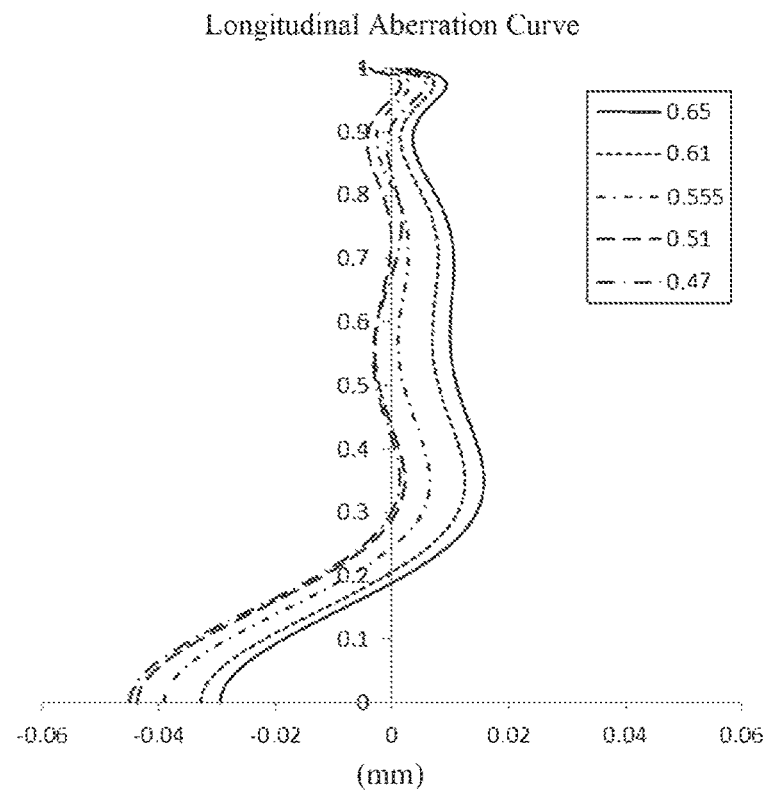
FIG. 12A illustrates an longitudinal aberration curve of the camera lens assembly according to Embodiment 6.
Figure 12B:
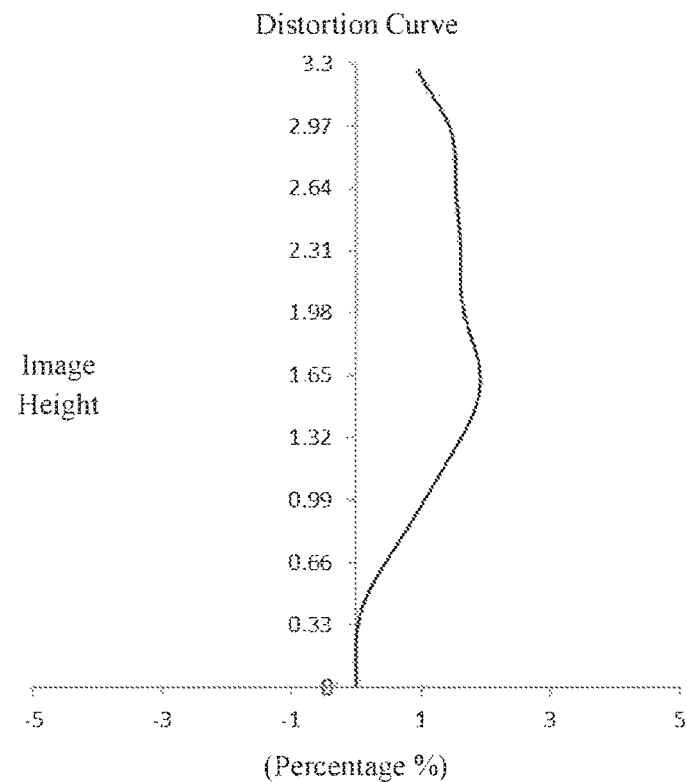
FIG. 12B illustrates a distortion curve of the camera lens assembly according to Embodiment 6.
Figure 12C:
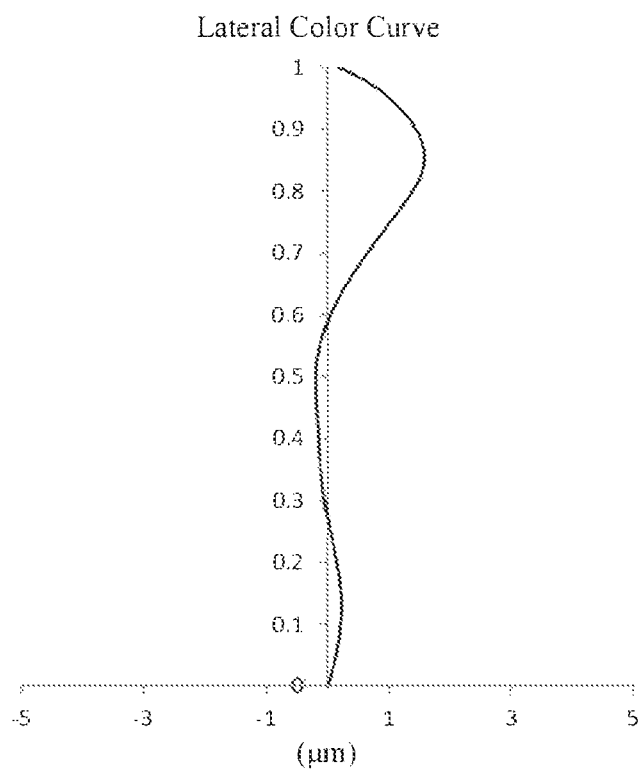
FIG. 12C illustrates a lateral color curve of the camera lens assembly according to Embodiment 6.
Figure 12D:
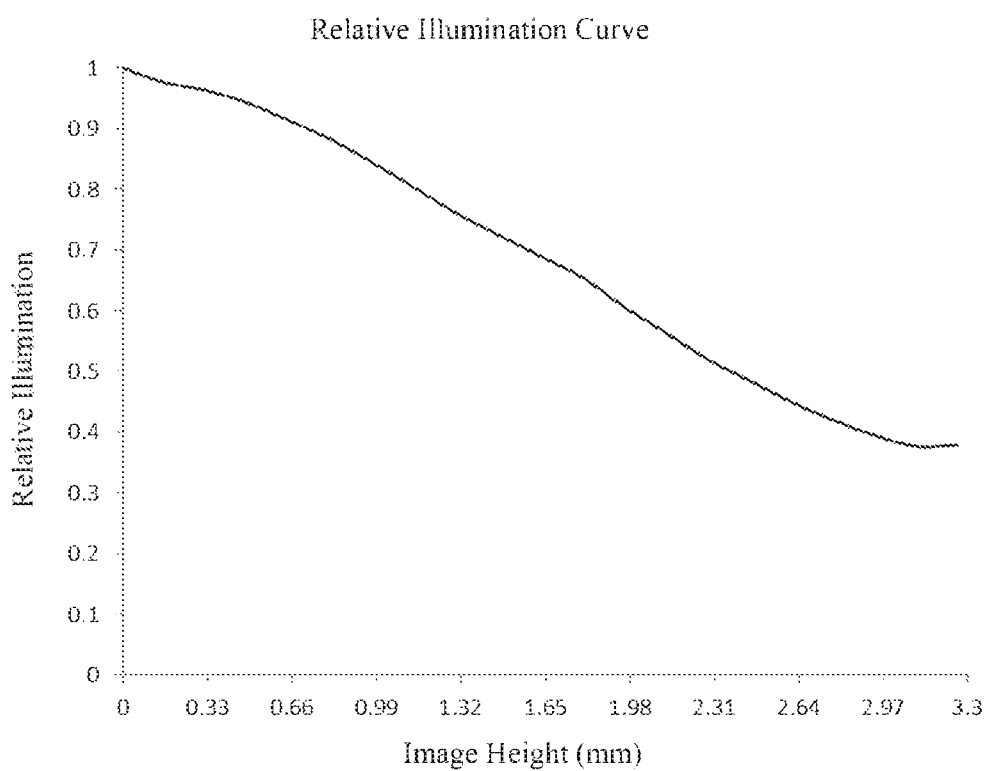
FIG. 12D illustrates a relative illumination curve of the camera lens assembly according to Embodiment 6.

FIG. 12A illustrates an longitudinal aberration curve of the camera lens assembly according to Embodiment 6, representing deviations of focal points of light of different wavelengths converged after passing through an optical system. FIG. 12B illustrates a distortion curve of the camera lens assembly according to Embodiment 6, representing amounts of distortion at different viewing angles. FIG. 12C illustrates a lateral color curve of the camera lens assembly according to Embodiment 6, representing deviations of different image heights on an image plane after light passes through the camera lens assembly. FIG. 12D illustrates a relative illumination curve of the camera lens assembly according to Embodiment 6, representing ratios of central illuminations to peripheral illuminations. It can be seen from FIG. 12A to FIG. 12D that the camera lens assembly provided in Embodiment 6 achieves good image quality.

Embodiment 7

Figure 13:
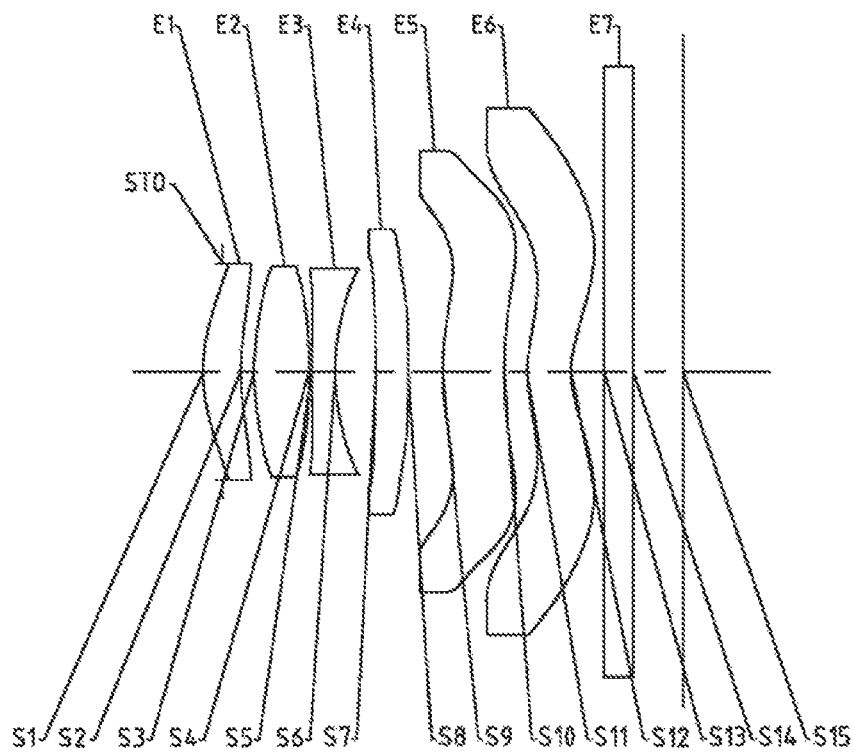
FIG. 13 is a schematic structural diagram of a camera lens assembly according to Embodiment 7 of the present application.

Embodiment 7 according to the camera lens assembly of the present application will be described below with reference to FIG. 13 to FIG. 14D. FIG. 13 is a schematic structural diagram of a camera lens assembly according to Embodiment 7. As shown in FIG. 13, the camera lens assembly according to Embodiment 7 includes the first lens to the sixth lens E1-E6 respectively having an object-side surface and an image-side surface. Table 19 below shows effective focal lengths f1 to f6 of the lenses, a total effective focal length f of the camera lens assembly, and a total track length TTL and a half field-of-view (diagonal) angle HFOV of the camera lens according to Embodiment 7.

TABLE 19

| f1 (mm) | 9.82    | f (mm)    | 4.02  |
|---|---|---|---|
| f2 (mm) | 3.54    | TTL (mm)  | 4.95  |
| f3 (mm) | −4.75   | HFOV (deg | 40.38 |
| f4 (mm) | −158.20 |           |       |
| f5 (mm) | 23.64   |           |       |
| f6 (mm) | −17.45  |           |       |

In Embodiment 7, the effective focal length f1 of the first lens E1 and the total effective focal length f satisfy: f/f1=0.41. A combined focal length f12 of the first lens E1 and the second lens E2 and an effective focal length of the third lens E3 satisfy: f12/f3=−0.59. A combined focal length f23 of the second lens E2 and the third lens E3 and the total effective focal length f satisfy: f/f23=0.41. The effective focal length f4 of the fourth lens E4, the effective focal length f5 of the fifth lens E5 and the total effective focal length f satisfy: f/f4|+|f/f5|=0.2. A combined focal length f56 of the fifth lens E5 and the sixth lens E6 and the total effective focal length f satisfy: f/f56=−0.02. The total effective focal length f and an entrance pupil diameter EPD of the camera lens assembly satisfy: f/EPD=1.79.

Table 20 shows a surface form, radius of curvature, thickness, material and conic coefficient of each lens in Embodiment 7. Table 21 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 7.

Referring to Table 20 and Table 21, a center thickness CT2 of the second lens E2 and a center thickness CT5 of the fifth lens E5 satisfy: CT2/CT5=0.9.

TABLE 20

| surface number | surface form | radius of curvature | thickness | material | conic coefficient |
|---|---|---|---|---|---|
| OBJ | spherical | infinite | infinite | | |
| STO | spherical | infinite | −0.1947 | | |
| S1 | aspheric | 1.8677 | 0.3886 | 1.54, 56.1 | −14.7486 |
| S2 | aspheric | 2.6615 | 0.1370 | | −13.1021 |
| S3 | aspheric | 2.6308 | 0.5688 | 1.54, 56.1 | −6.8547 |
| S4 | aspheric | −6.6362 | 0.0250 | | −40.4020 |
| S5 | aspheric | 11.1019 | 0.2430 | 1.64, 23.5 | −1.2159 |
| S6 | aspheric | 2.3648 | 0.4184 | | −17.7652 |
| S7 | aspheric | −92.5844 | 0.3375 | 1.65, 21.5 | 99.0000 |
| S8 | aspheric | −918.0000 | 0.3483 | | −99.0000 |
| S9 | aspheric | 3.1165 | 0.6347 | 1.54, 56.1 | −18.2054 |
| S10 | aspheric | 3.8178 | 0.2374 | | −99.0000 |
| S11 | aspheric | 1.3326 | 0.4532 | 1.54, 56.1 | −5.3538 |
| S12 | aspheric | 1.0285 | 0.3426 | | −3.8848 |
| S13 | spherical | infinite | 0.3000 | 1.52, 64.2 | |
| S14 | spherical | infinite | 0.5156 | | |
| S15 | spherical | infinite | | | |

In Embodiment 7, a radius of curvature R5 of the object-side surface of the third lens E3 and a radius of curvature R6 of the image-side surface thereof satisfy: (R5−R6)/(R5+R6)=0.65. A radius of curvature R9 of the object-side surface of the fifth lens E5 and a radius of curvature R12 of the image-side surface of the sixth lens E6 satisfy: R12/R9=0.33. A radius of curvature R11 of the object-side surface of the sixth lens E6 and a radius of curvature R12 of the image-side surface thereof satisfy: (R11−R12)/(R11+R12)=0.13.

TABLE 21

| surface number | A4 | A6 | A8 | A10 | A12 |
|---|---|---|---|---|---|
| S1 | 2.4003E−01 | −4.7530E−01 | 8.2097E−01 | −1.1469E+00 | 1.0397E+00 |
| S2 | −2.3511E−02 | −7.4759E−02 | 1.0380E−01 | −2.2464E−01 | 3.7414E−01 |
| S3 | −3.7414E−02 | 3.7187E−04 | 3.3517E−02 | −2.4100E−01 | 6.3799E−01 |
| S4 | 9.2500E−03 | −1.7535E−01 | 8.5619E−02 | 2.4745E−01 | −4.0348E−01 |
| S5 | −2.9603E−02 | 7.1362E−02 | −8.0356E−01 | 2.0478E+00 | −2.6434E+00 |
| S6 | 1.6424E−01 | −4.0806E−01 | 1.2438E+00 | −2.9900E+00 | 4.5489E+00 |
| S7 | −6.3734E−02 | 1.0321E−02 | 1.8479E−01 | −4.4292E−01 | 5.6550E−01 |
| S8 | −1.1266E−01 | 1.2914E−02 | 9.3922E−02 | −1.3529E−01 | 1.2358E−01 |
| S9 | 5.5681E−02 | −1.2089E−01 | 9.9654E−02 | −1.0740E−01 | 9.1879E−02 |
| S10 | 2.3182E−02 | 9.5532E−02 | −1.8206E−01 | 1.3688E−01 | −6.0355E−02 |
| S11 | −3.4233E−01 | 3.1261E−01 | −1.8672E−01 | 6.7292E−02 | −1.5021E−02 |
| S12 | −2.1426E−01 | 1.6273E−01 | −8.7048E−02 | 2.9395E−02 | −6.3371E−03 |

| surface number | A14 | A16 | A18 | A20 |
|---|---|---|---|---|
| S1 | −5.6136E−01 | 1.6139E−01 | −1.8512E−02 | 0 |
| S2 | −2.9492E−01 | 1.0773E−01 | −1.5033E−02 | 0 |
| S3 | −6.6665E−01 | 3.1909E−01 | −5.9496E−02 | 0 |
| S4 | 2.4870E−01 | −6.2307E−02 | 2.9247E−03 | 0 |
| S5 | 1.9507E+00 | −7.8057E−01 | 1.3203E−01 | 0 |
| S6 | −4.0385E+00 | 1.9185E+00 | −3.7401E−01 | 0 |
| S7 | −4.1737E−01 | 1.6401E−01 | −2.7316E−02 | 0 |
| S8 | −6.4393E−02 | 1.6206E−02 | −1.5132E−03 | 0 |
| S9 | −4.8024E−02 | 1.4469E−02 | −2.3085E−03 | 1.5087E−04 |
| S10 | 1.6681E−02 | −2.8571E−03 | 2.7919E−04 | −1.1931E−05 |
| S11 | 2.1689E−03 | −2.0648E−04 | 1.2333E−05 | −3.5733E−07 |
| S12 | 8.8836E−04 | −7.9999E−05 | 4.2725E−06 | −1.0360E−07 |

Moreover, in Embodiment 7, an axial spacing T23 between the second lens E2 and the third lens E3 and an axial spacing T12 between the first lens E1 and the second lens E2 satisfy: T23/T12=0.18. An axial spacing 134 between the third lens E3 and the fourth lens E4 and a center thickness of the fourth lens E4 satisfy T34/CT4=1.24. An axial distance TTL from the object-side surface of the first lens to an image-side surface of a photosensitive component and ImgH, ImgH being half a diagonal length of an effective pixel area of a photosensitive component, satisfy: TTL/ImgH=1.52.

Figure 14A:
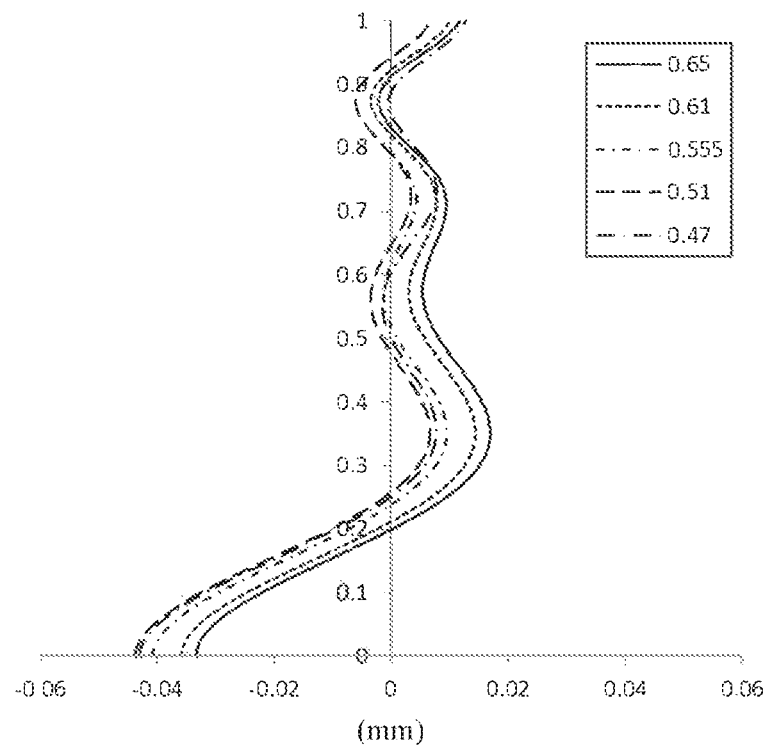
FIG. 14A illustrates an longitudinal aberration curve of the camera lens assembly according to Embodiment 7.
Figure 14B:
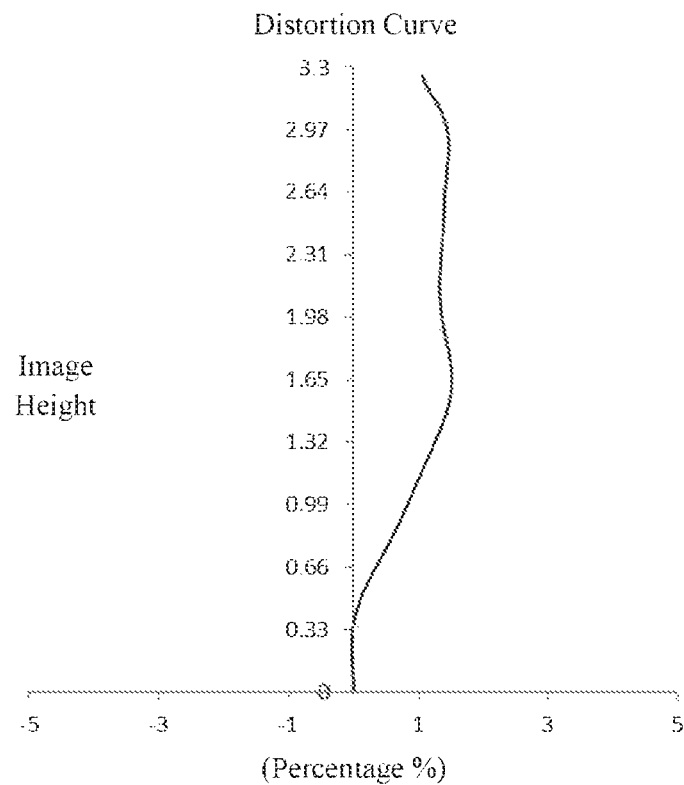
FIG. 14B illustrates a distortion curve of the camera lens assembly according to Embodiment 7.
Figure 14C:
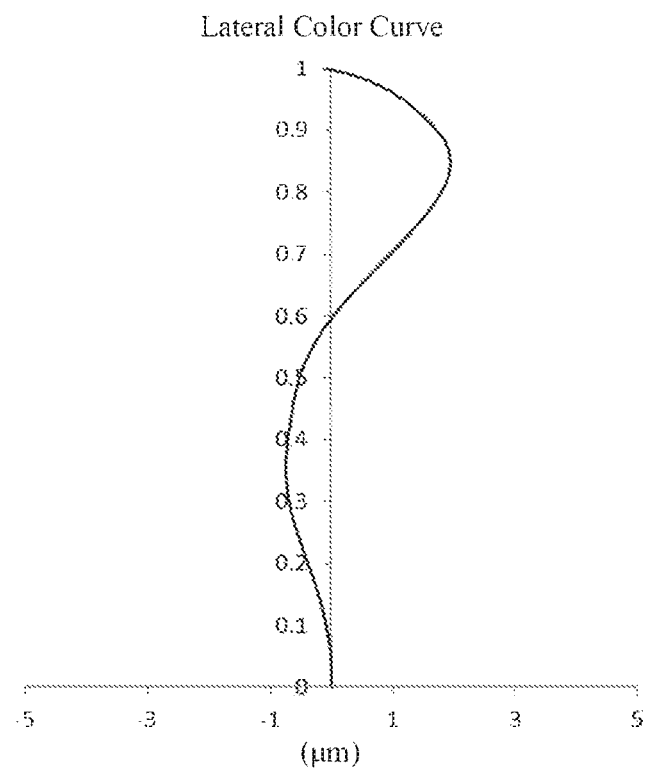
FIG. 14C illustrates a lateral color curve of the camera lens assembly according to Embodiment 7.
Figure 14D:
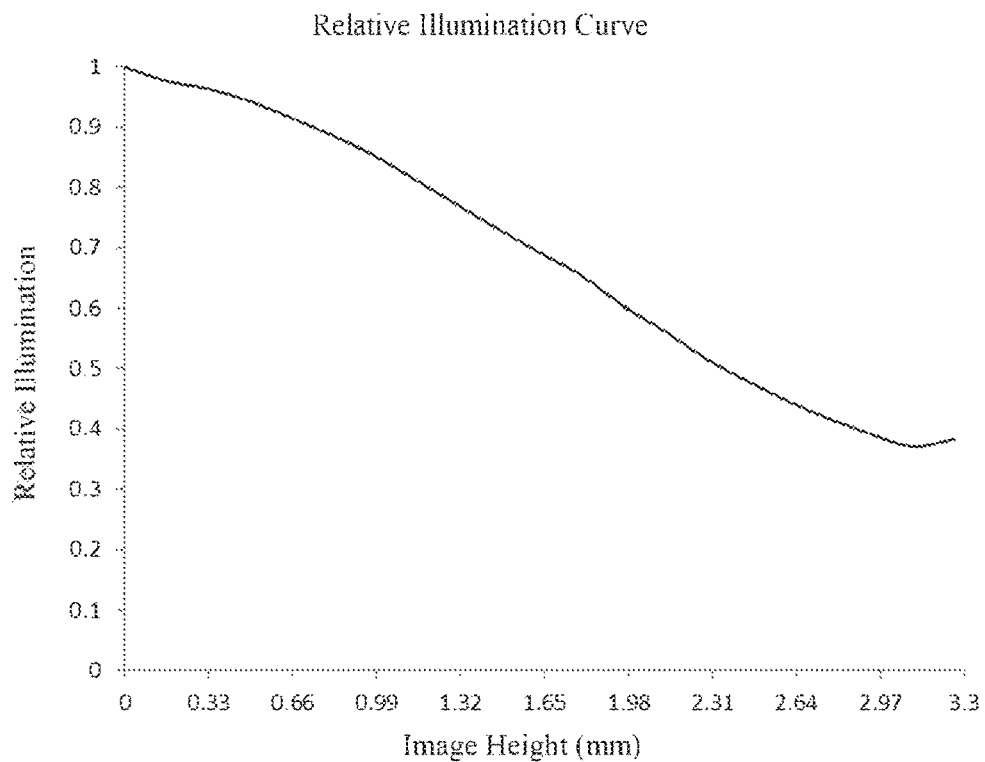
FIG. 14D illustrates a relative illumination curve of the camera lens assembly according to Embodiment 7.

FIG. 14A illustrates an longitudinal aberration curve of the camera lens assembly according to Embodiment 7, representing deviations of focal points of light of different wavelengths converged after passing through an optical system. FIG. 14B illustrates a distortion curve of the camera lens assembly according to Embodiment 7, representing amounts of distortion at different viewing angles. FIG. 14C illustrates a lateral color curve of the camera lens assembly according to Embodiment 7, representing deviations of different image heights on an image plane after light passes through the camera lens assembly. FIG. 14D illustrates a relative illumination curve of the camera lens assembly according to Embodiment 7, representing ratios of central illuminations to peripheral illuminations. It can be seen from FIG. 14A to FIG. 14D that the camera lens assembly provided in Embodiment 7 achieves good image quality.

Embodiment 8

Figure 15:
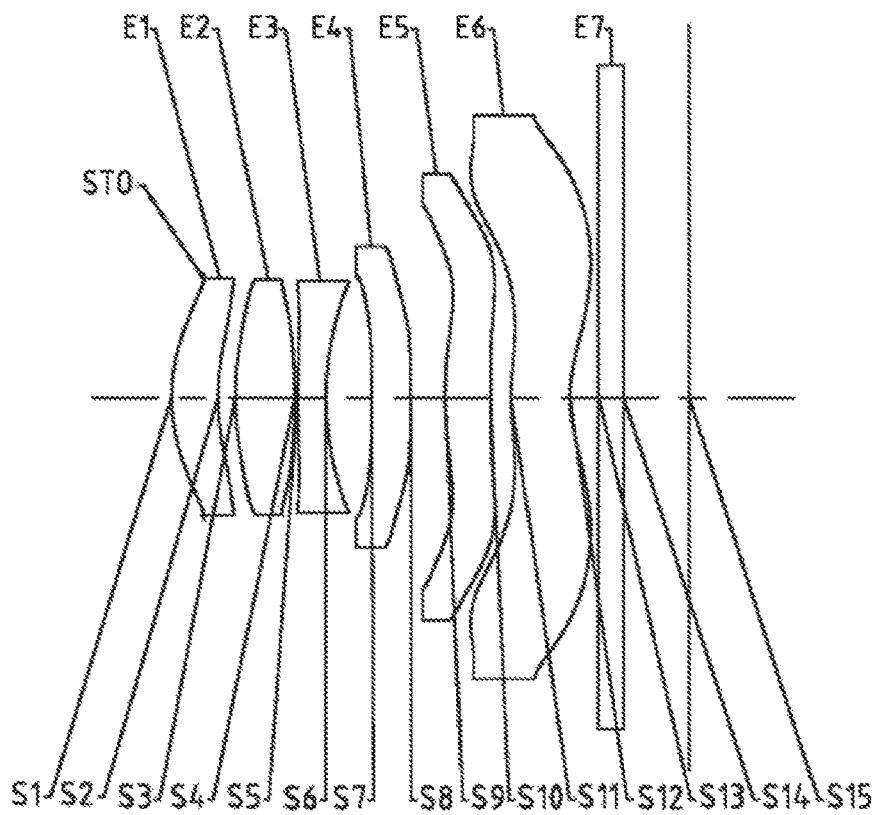
FIG. 15 is a schematic structural diagram of a camera lens assembly according to Embodiment 8 of the present application.

Embodiment 8 according to the camera lens assembly of the present application will be described below with reference to FIG. 15 to FIG. 16D. FIG. 15 is a schematic structural diagram of a camera lens assembly according to Embodiment 8. As shown in FIG. 15, the camera lens assembly according to Embodiment 8 includes the first lens to the sixth lens E1-E6 respectively having an object-side surface and an image-side surface.

Table 22 below shows effective focal lengths f1 to f6 of the lenses, a total effective focal length f of the camera lens assembly, and a total track length TTL and a half field-of-view (diagonal) angle HFOV of the camera lens according to Embodiment 8.

In Embodiment 8, the effective focal length f1 of the first lens E1 and the total effective focal length f satisfy: f/f1=0.4. A combined focal length f12 of the first lens E1 and the second lens E2 and an effective focal length of the third lens E3 satisfy: f12/f3=−0.55. A combined focal length f23 of the second lens E2 and the third lens E3 and the total effective focal length f satisfy: f/f23=0.49. The effective focal length f4 of the fourth lens E4, the effective focal length f5 of the fifth lens E5 and the total effective focal length f satisfy: |f/f4|+|f/f5|=0.54. A combined focal length f56 of the fifth lens E5 and the sixth lens E6 and the total effective focal length f satisfy: f/f56=−0.09. The total effective focal length f and an entrance pupil diameter EPD of the camera lens assembly satisfy: f/EPD=1.79.

TABLE 22

| f1 (mm) | 9.03 | f (mm) | 3.57 |
|---|---|---|---|
| f2 (mm) | 3.14 | TTL (mm) | 4.35 |
| f3 (mm) | −4.68 | HF V (deg) | 39.77 |
| f4 (mm) | −119.33 | | |
| f5 (mm) | 7.04 | | |
| f6 (mm) | −4.96 | | |

Table 23 shows a surface form, radius of curvature, thickness, material and conic coefficient of each lens in R6)=0.61. A radius of curvature R9 of the object-side surface of the fifth lens E5 and a radius of curvature R12 of the image-side surface of the sixth lens E6 satisfy: R12/R9=0.24. A radius of curvature R11 of the object-side surface of the sixth lens E6 and a radius of curvature R12 of the image-side surface thereof satisfy: (R11−R12)/(R11+R12)=0.32.

TABLE 23

| surface number | surface form | radius of curvature | thickness | material | conic coefficient |
|---|---|---|---|---|---|
| OBJ | spherical | infinite | infinite | | |
| STO | spherical | infinite | −0.2715 | | |
| S1 | aspheric | 1.4992 | 0.3919 | 1.54, 56.1 | −11.2662 |
| S2 | aspheric | 1.9584 | 0.1442 | | −11.2795 |
| S3 | aspheric | 2.2921 | 0.4986 | 1.54, 56.1 | −8.2426 |
| S4 | aspheric | −6.1706 | 0.0262 | | −55.1824 |
| S5 | aspheric | 9.5534 | 0.2360 | 1.66, 20.4 | 6.7006 |
| S6 | aspheric | 2.3133 | 0.3876 | | −22.8021 |
| S7 | aspheric | −90.4969 | 0.3273 | 1.64, 23.5 | −99.0000 |
| S8 | aspheric | 488.7268 | 0.2924 | | 98.9990 |
| S9 | aspheric | 4.5047 | 0.3750 | 1.64, 23.5 | −19.4117 |
| S10 | aspheric | infinite | 0.1735 | | 85.2988 |
| S11 | aspheric | 2.1311 | 0.4900 | 1.54, 56.1 | −3.7562 |
| S12 | aspheric | 1.0943 | 0.2457 | | −4.9767 |
| S13 | spherical | infinite | 0.2100 | 1.52, 64.2 | |
| S14 | spherical | infinite | 0.5517 | | |
| S15 | spherical | infinite | | | |

TABLE 24

| surface number | A4 | A6 | A8 | A10 | A12 |
|---|---|---|---|---|---|
| S1 | 3.4698E−01 | −6.0927E−01 | 7.1698E−01 | −1.4568E−01 | −1.3298E+00 |
| S2 | 7.1751E−02 | −3.4225E−01 | 6.9784E−01 | −1.3088E+00 | 1.2289E+00 |
| S3 | −8.1585E−02 | 6.4523E−01 | −4.6038E+00 | 1.7917E+01 | −4.2861E+01 |
| S4 | −2.1406E−01 | 1.1422E+00 | −4.3711E+00 | 9.3529E+00 | −1.1743E+01 |
| S5 | −2.0576E−01 | 1.2354E+00 | −4.6523E+00 | 9.7604E+00 | −1.2322E+01 |
| S6 | 1.2714E−01 | 7.9475E−02 | −8.8250E−01 | 2.3490E+00 | −3.9001E+00 |
| S7 | −1.4921E−01 | −1.3194E−01 | 1.1245E+00 | −2.1953E+00 | 1.2777E−01 |
| S8 | −1.9543E−01 | −1.6110E−01 | 8.0287E−01 | −1.3509E+00 | 1.2963E+00 |
| S9 | 1.8353E−01 | −5.3662E−01 | 7.5918E−01 | −9.5153E−01 | 8.5454E−01 |
| S10 | 1.4960E−01 | −5.9017E−02 | −2.0657E−01 | 2.6504E−01 | −1.5725E−01 |
| S11 | −5.2446E−01 | 5.8829E−01 | −4.5770E−01 | 2.3728E−01 | −8.4682E−02 |
| S12 | −2.6273E−01 | 2.6345E−01 | −1.9973E−01 | 1.0339E−01 | −3.5741E−02 |

| surface number | A14 | A16 | A18 | A20 |
|---|---|---|---|---|
| S1 | 2.3445E+00 | −1.8570E+00 | 7.3453E−01 | −1.1668E−01 |
| S2 | 4.6671E−02 | −8.8860E−01 | 5.7373E−01 | −1.1690E−01 |
| S3 | 6.3922E+01 | −5.7123E+01 | 2.7936E+01 | −5.7524E+00 |
| S4 | 8.7410E+00 | −3.6246E+00 | 6.9124E−01 | −2.8743E−02 |
| S5 | 9.5554E+00 | −4.4904E+00 | 1.2139E+00 | −1.5325E−01 |
| S6 | 4.3306E+00 | −2.8581E+00 | 8.4263E−01 | 0.0000E+00 |
| S7 | 6.4664E+00 | −1.1164E+01 | 8.0404E+00 | −2.2272E+00 |
| S8 | −6.4494E−01 | 1.2590E−01 | 3.4321E−03 | −2.1130E−03 |
| S9 | −4.8638E−01 | 1.6779E−01 | −3.2188E−02 | 2.6350E−03 |
| S10 | 5.3515E−02 | −1.0365E−02 | 1.0218E−03 | −3.7043E−05 |
| S11 | 2.1573E−02 | −3.7756E−03 | 3.9749E−04 | −1.8502E−05 |
| S12 | 8.1002E−03 | −1.1552E−03 | 9.3942E−05 | −3.3131E−06 |

Embodiment 8. Table 24 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 8.

Referring to Table 23 and Table 24, a center thickness CT2 of the second lens E2 and a center thickness CT5 of the fifth lens E5 satisfy: CT2/CT5=1.33.

In Embodiment 8, a radius of curvature R5 of the object-side surface of the third lens E3 and a radius of curvature R6 of the image-side surface thereof satisfy: (R5−R6)/(R5+

Moreover, in Embodiment 8, an axial spacing T23 between the second lens E2 and the third lens E3 and an axial spacing T12 between the first lens E1 and the second lens E2 satisfy: T23/T12=0.18. An axial spacing 134 between the third lens E3 and the fourth lens E4 and a center thickness of the fourth lens E4 satisfy T34/CT4=1.18. An axial distance TTL from the object-side surface of the first lens to an image-side surface of a photosensitive component and ImgH, ImgH being half a diagonal length of an effective pixel area of a photosensitive component, satisfy: TTL/ImgH=1.5.

Figure 16A:
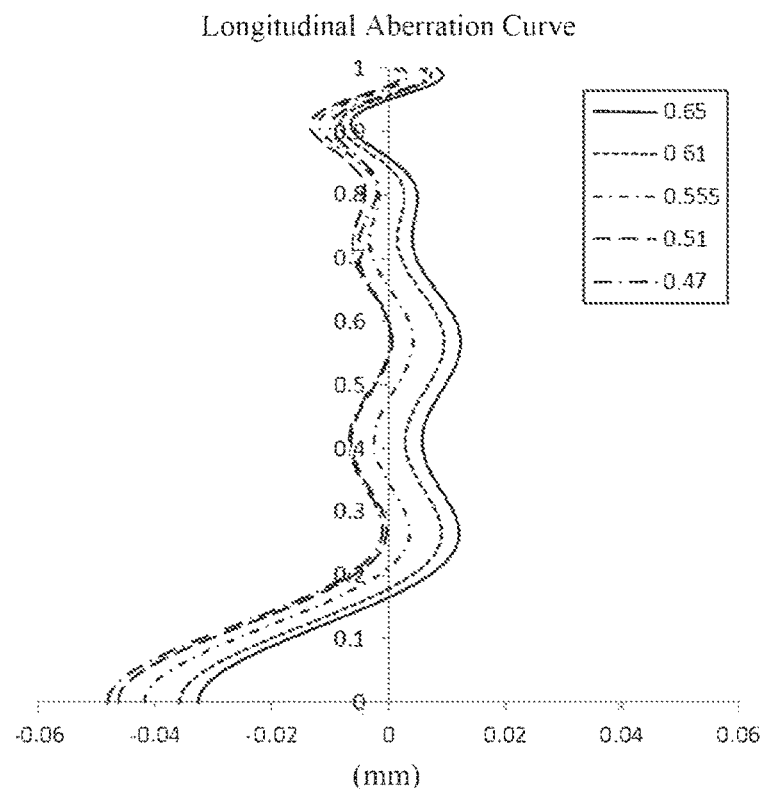
FIG. 16A illustrates an longitudinal aberration curve of the camera lens assembly according to Embodiment 8.
Figure 16B:
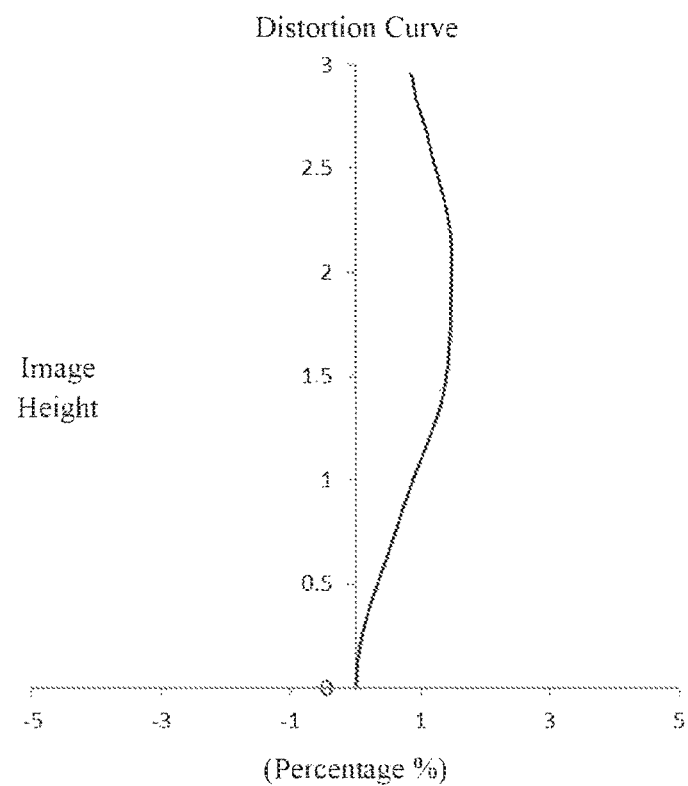
FIG. 16B illustrates a distortion curve of the camera lens assembly according to Embodiment 8.
Figure 16C:
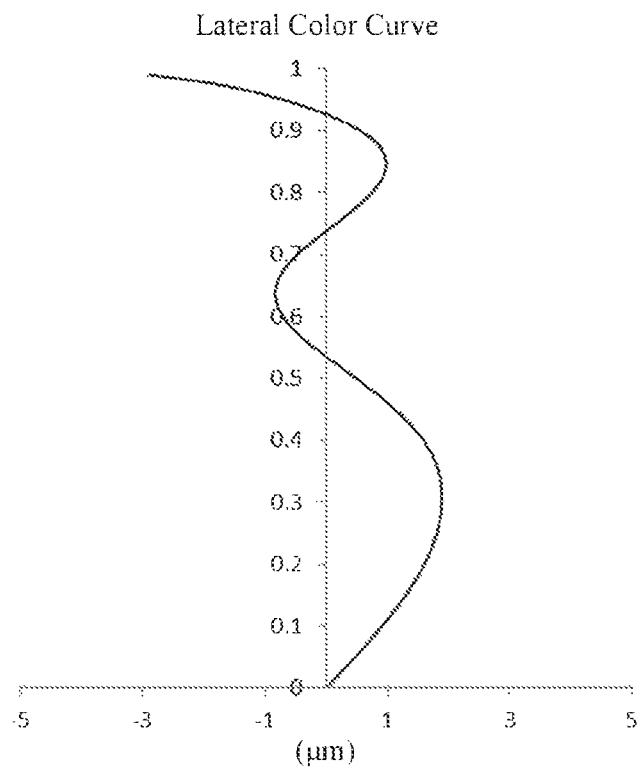
FIG. 16C illustrates a lateral color curve of the camera lens assembly according to Embodiment 8.
Figure 16D:
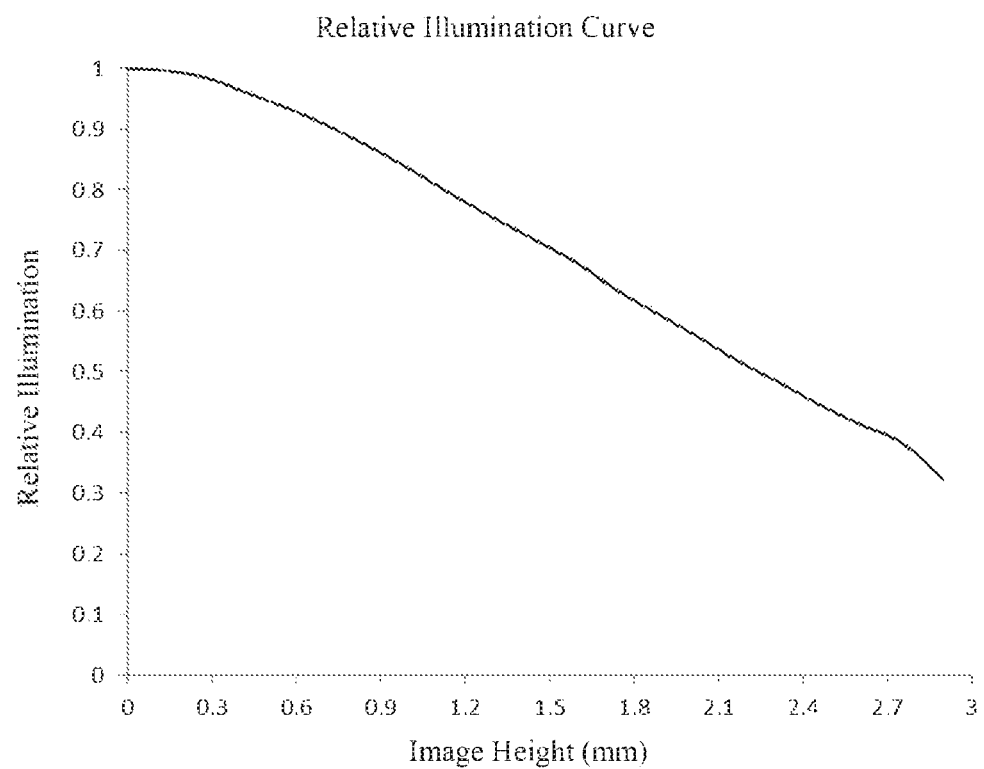
FIG. 16D illustrates a relative illumination curve of the camera lens assembly according to Embodiment 8.

FIG. 16A illustrates an longitudinal aberration curve of the camera lens assembly according to Embodiment 8, representing deviations of focal points of light of different wavelengths converged after passing through an optical system. FIG. 16B illustrates a distortion curve of the camera lens assembly according to Embodiment 8, representing amounts of distortion at different viewing angles. FIG. 16C illustrates a lateral color curve of the camera lens assembly according to Embodiment 8, representing deviations of different image heights on an image plane after light passes through the camera lens assembly. FIG. 16D illustrates a relative illumination curve of the camera lens assembly according to Embodiment 8, representing ratios of central illuminations to peripheral illuminations. It can be seen from FIG. 16A to FIG. 16D that the camera lens assembly provided in Embodiment 8 achieves good image quality.

Embodiment 9

Figure 17:
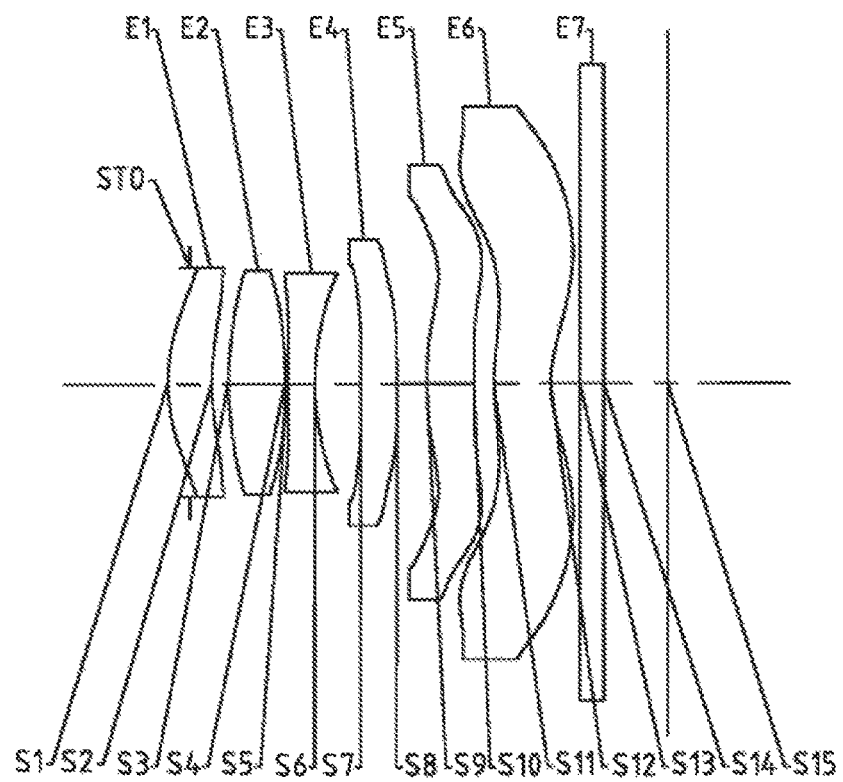
FIG. 17 is a schematic structural diagram of a camera lens assembly according to Embodiment 9 of the present application.

Embodiment 9 according to the camera lens assembly of the present application will be described below with reference to FIG. 17 to FIG. 18D. FIG. 17 is a schematic structural diagram of a camera lens assembly according to Embodiment 9. As shown in FIG. 17, the camera lens assembly according to Embodiment 9 includes the first lens to the sixth lens E1-E6 respectively having an object-side surface and an image-side surface. Table 25 below shows effective focal lengths f1 to f6 of the lenses, a total effective focal length f of the camera lens assembly, and a total track length TTL and a half field-of-view (diagonal) angle HFOV of the camera lens according to Embodiment 9.

According to Table 25, the effective focal length f1 of the first lens E1 and the total effective focal length f satisfy: f/f1=0.43.

TABLE 25

| f1 (mm) | 8.33 | f (mm) | 3.62 |
|---|---|---|---|
| f2 (mm) | 3.16 | TTL (mm) | 4.40 |
| f3 (mm) | −4.17 | HFOV (deg) | 39.65 |
| f4 (mm) | −117.27 | | |
| f5 (mm) | 7.45 | | |
| f6 (mm) | −5.66 | | |

In Embodiment 9, a combined focal length f12 of the first lens E1 and the second lens E2 and an effective focal length of the third lens E3 satisfy: f12/f3=−0.6. A combined focal length f23 of the second lens E2 and the third lens E3 and the total effective focal length f satisfy: f/f23=0.4. The effective focal length f4 of the fourth lens E4, the effective focal length f5 of the fifth lens E5 and the total effective focal length f satisfy: |f/f4|+|f/f5|=0.52. A combined focal length f56 of the fifth lens E5 and the sixth lens E6 and the total effective focal length f satisfy: f/f56=−0.03. The total effective focal length f and an entrance pupil diameter EPD of the camera lens assembly satisfy: f/EPD=1.79.

Table 26 shows a surface form, radius of curvature, thickness, material and conic coefficient of each lens in Embodiment 9. Table 27 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 9.

Referring to Table 26 and Table 27, a center thickness CT2 of the second lens E2 and a center thickness CT5 of the fifth lens E5 satisfy: CT2/CT5=1.22.

In Embodiment 9, a radius of curvature R5 of the object-side surface of the third lens E3 and a radius of curvature R6 of the image-side surface thereof satisfy: (R5−R6)/(R5+R6)=0.7. A radius of curvature R9 of the object-side surface of the fifth lens E5 and a radius of curvature R12 of the image-side surface of the sixth lens E6 satisfy: R12/R9=0.26. A radius of curvature R11 of the object-side surface of the sixth lens E6 and a radius of curvature R12 of the image-side surface thereof satisfy: (R11−R12)/(R11+R12)=0.28.

Moreover, in Embodiment 9, an axial spacing T23 between the second lens E2 and the third lens E3 and an axial spacing T12 between the first lens E1 and the second lens E2 satisfy: T23/T12=0.18. An axial spacing I34 between the third lens E3 and the fourth lens E4 and a center thickness of the fourth lens E4 satisfy T34/CT4=1.29. An axial distance TTL from the object-side surface of the first lens to an image-side surface of a photosensitive component and ImgH, ImgH being half a diagonal length of an effective pixel area of a photosensitive component, satisfy: TTL/ImgH=1.52.

TABLE 26

| surface number | surface form | radius of curvature | thickness | material | conic coefficient |
|---|---|---|---|---|---|
| OBJ | spherical | infinite | infinite | | |
| STO | spherical | infinite | −0.1908 | | |
| S1 | aspheric | 1.6080 | 0.3859 | 1.54, 56.1 | −13.2261 |
| S2 | aspheric | 2.2819 | 0.1424 | | −12.7361 |
| S3 | aspheric | 2.3765 | 0.5024 | 1.54, 56.1 | −8.4874 |
| S4 | aspheric | −5.7417 | 0.0250 | | −20.1558 |
| S5 | aspheric | 12.4555 | 0.2399 | 1.64, 23.5 | 0.2738 |
| S6 | aspheric | 2.1824 | 0.4065 | | −21.3390 |
| S7 | aspheric | −90.4969 | 0.3156 | 1.65, 21.5 | 99.0000 |
| S8 | aspheric | 488.7268 | 0.2660 | | −99.0000 |
| S9 | aspheric | 4.0509 | 0.4102 | 1.54, 56.1 | −8.4449 |
| S10 | aspheric | infinite | 0.1737 | | 98.1008 |
| S11 | aspheric | 1.8438 | 0.5000 | 1.54, 56.1 | −3.8567 |
| S12 | aspheric | 1.0434 | 0.2584 | | −4.7231 |
| S13 | spherical | infinite | 0.2100 | 1.52, 64.2 | |
| S14 | spherical | infinite | 0.5643 | | |
| S15 | spherical | infinite | | | |

TABLE 27

| surface number | A4 | A6 | A8 | A10 | A12 |
|---|---|---|---|---|---|
| S1 | 2.9791E−01 | −4.8221E−01 | 4.8092E−01 | −1.7267E−01 | −4.0148E−01 |
| S2 | −1.2057E−03 | −2.2500E−01 | 5.8668E−01 | −1.4390E+00 | 2.2524E+00 |
| S3 | −5.9103E−02 | 8.4616E−02 | −2.3054E−01 | 1.4903E−02 | 7.7640E−01 |
| S4 | −1.1663E−01 | 5.3687E−01 | −2.2898E+00 | 4.5967E+00 | −4.6244E+00 |
| S5 | −1.6694E−01 | 7.9205E−01 | −3.1582E+00 | 6.1734E+00 | −5.9659E+00 |
| S6 | 1.4051E−01 | −5.6459E−02 | −2.4367E−01 | −5.5150E−02 | 1.8706E+00 |
| S7 | −3.9482E−02 | −7.6093E−01 | 4.0932E+00 | −1.1192E+01 | 1.8064E+01 |

TABLE 27-continued

| | | | | | |
|---|---|---|---|---|---|
| S8 | −1.5982E−01 | −1.3799E−01 | 6.7552E−01 | −1.1827E+00 | 1.2552E+00 |
| S9 | 2.0932E−01 | −5.4585E−01 | 8.0540E−01 | −1.0516E+00 | 9.5469E−01 |
| S10 | 1.3994E−01 | 1.0063E−01 | −4.3904E−01 | 4.3021E−01 | −2.2035E−01 |
| S11 | −4.9451E−01 | 5.4807E−01 | −4.2175E−01 | 2.1402E−01 | −7.3974E−02 |
| S12 | −2.3636E−01 | 2.1424E−01 | −1.4811E−01 | 6.7810E−02 | −2.0038E−02 |

| surface number | A14 | A16 | A18 | A20 |
|---|---|---|---|---|
| S1 | 6.3628E−01 | −3.6636E−01 | 7.7415E−02 | 0 |
| S2 | −1.8974E+00 | 8.1355E−01 | −1.4190E−01 | 0 |
| S3 | −9.2457E−01 | 3.5108E−01 | −2.3115E−02 | 0 |
| S4 | 2.1270E+00 | −1.9764E−01 | −9.4899E−02 | 0 |
| S5 | 2.2525E+00 | 3.4074E−01 | −3.3380E−01 | 0 |
| S6 | −3.3984E+00 | 2.4542E+00 | −6.2502E−01 | 0 |
| S7 | −1.7192E+01 | 8.9280E+00 | −1.9662E+00 | 0 |
| S8 | −7.4391E−01 | 2.1551E−01 | −2.2904E−02 | 0 |
| S9 | −5.4711E−01 | 1.9029E−01 | −3.6748E−02 | 3.0162E−03 |
| S10 | 6.3418E−02 | −9.4667E−03 | 5.3163E−04 | 7.0442E−06 |
| S11 | 1.8047E−02 | −2.9993E−03 | 2.9882E−04 | −1.3169E−05 |
| S12 | 3.8043E−03 | −4.5157E−04 | 3.0675E−05 | −9.1196E−07 |

Figure 18A:
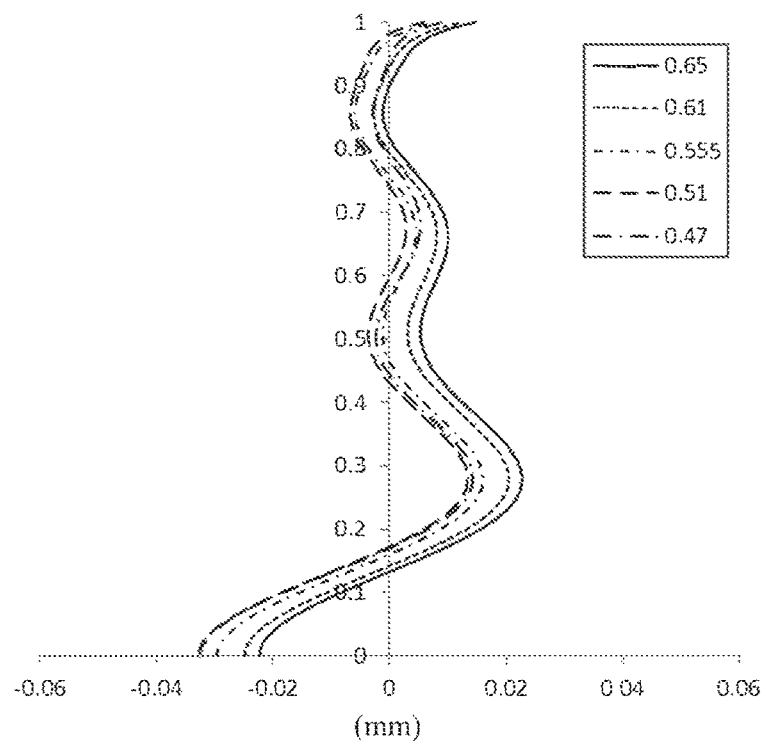
FIG. 18A illustrates an longitudinal aberration curve of the camera lens assembly according to Embodiment 9.
Figure 18B:
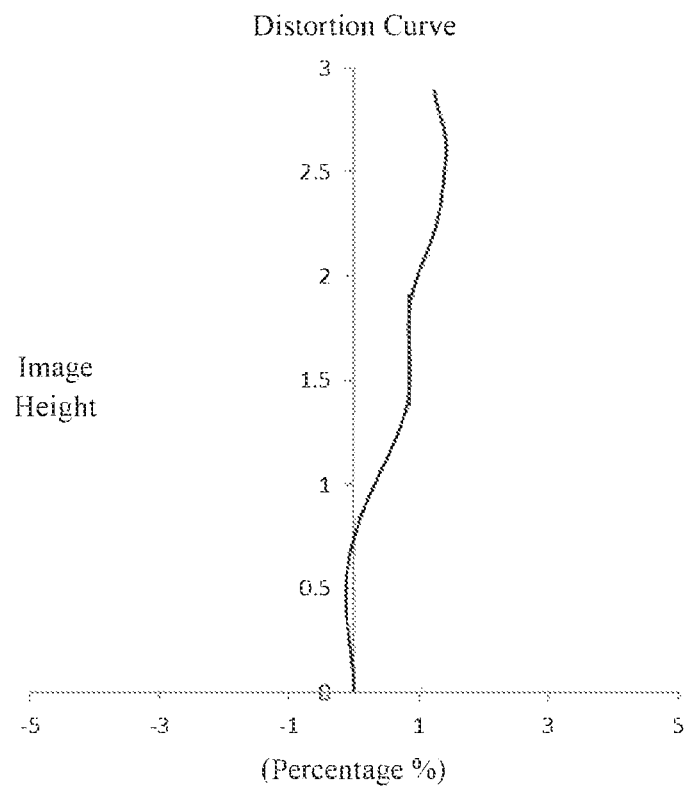
FIG. 18B illustrates a distortion curve of the camera lens assembly according to Embodiment 9.
Figure 18C:
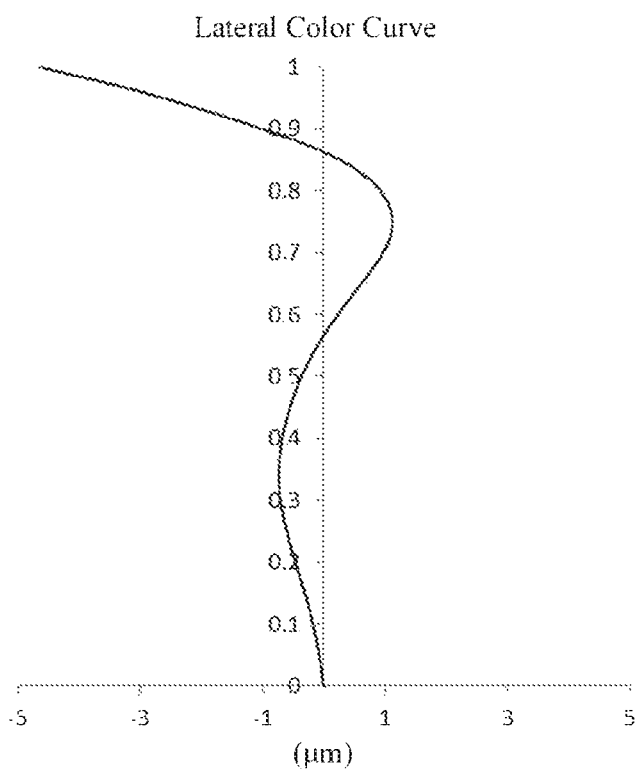
FIG. 18C illustrates a lateral color curve of the camera lens assembly according to Embodiment 9.
Figure 18D:
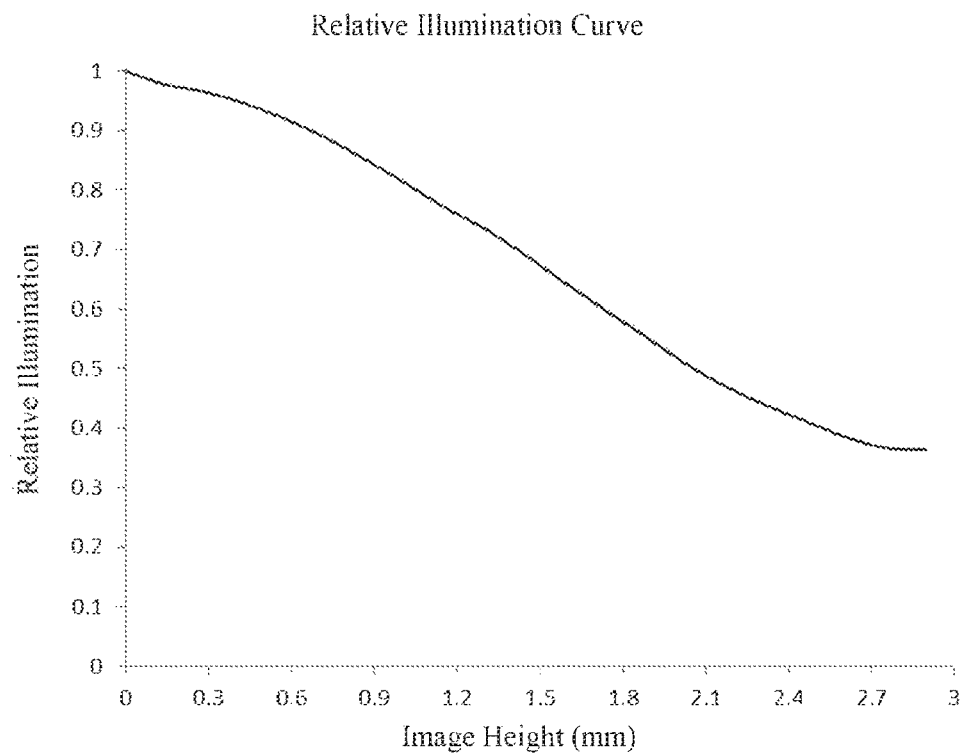
FIG. 18D illustrates a relative illumination curve of the camera lens assembly according to Embodiment 9.

FIG. 18A illustrates an longitudinal aberration curve of the camera lens assembly according to Embodiment 9, representing deviations of focal points of light of different wavelengths converged after passing through an optical system. FIG. 18B illustrates a distortion curve of the camera lens assembly according to Embodiment 9, representing amounts of distortion at different viewing angles. FIG. 18C illustrates a lateral color curve of the camera lens assembly according to Embodiment 9, representing deviations of different image heights on an image plane after light passes through the camera lens assembly. FIG. 18D illustrates a relative illumination curve of the camera lens assembly according to Embodiment 9, representing ratios of central illuminations to peripheral illuminations. It can be seen from FIG. 18A to FIG. 18D that the camera lens assembly provided in Embodiment 9 achieves good image quality.

Embodiment 10

Figure 19:
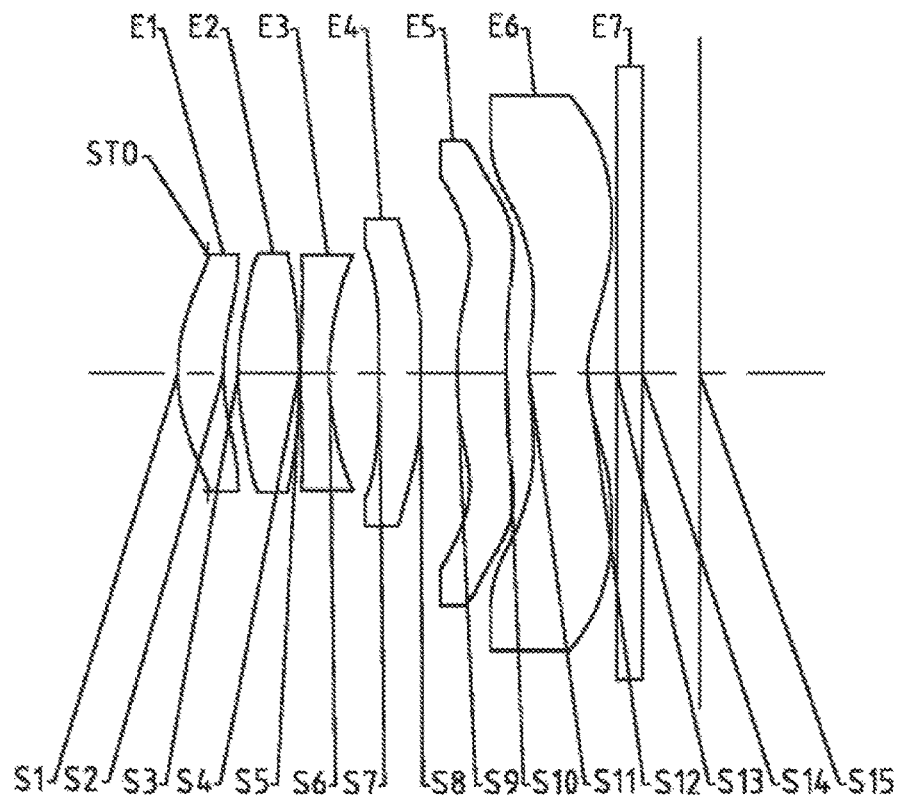
FIG. 19 is a schematic structural diagram of a camera lens assembly according to Embodiment 10 of the present application.

Embodiment 10 according to the camera lens assembly of the present application will be described below with reference to FIG. 19 to FIG. 20D. FIG. 19 is a schematic structural diagram of a camera lens assembly according to Embodiment 10. As shown in FIG. 19, the camera lens assembly according to Embodiment 10 includes the first lens to the sixth lens E1-E6 respectively having an object-side surface and an image-side surface. Table 28 below shows effective focal lengths f1 to f6 of the lenses, a total effective focal length f of the camera lens assembly, and a total track length TTL and a half field-of-view (diagonal) angle HFOV of the camera lens according to Embodiment 10.

TABLE 28

| f1 (mm) | 12.29 | f (mm) | 3.47 |
|---|---|---|---|
| f2 (mm) | 2.98 | TTL (mm) | 4.29 |
| f3 (mm) | −4.89 | HFOV (deg) | 37.54 |
| f4 (mm) | −117.27 | | |
| f5 (mm) | 5.90 | | |
| f6 (mm) | −4.61 | | |

According to Table 28, the effective focal length f1 of the first lens E1 and the total effective focal length f satisfy: f/f1=0.28.

In Embodiment 10, a combined focal length f12 of the first lens E1 and the second lens E2 and an effective focal length of the third lens E3 satisfy: f12/f3=−0.53. A combined focal length f23 of the second lens E2 and the third lens E3 and the total effective focal length f satisfy: f/f23=0.57. The effective focal length f4 of the fourth lens E4, the effective focal length f5 of the fifth lens E5 and the total effective focal length f satisfy: |f/f4|+|f/f5|=0.62. A combined focal length f56 of the fifth lens E5 and the sixth lens E6 and the total effective focal length f satisfy: f/f56=−0.01. The total effective focal length f and an entrance pupil diameter EPD of the camera lens assembly satisfy: f/EPD=1.7.

Table 29 shows a surface form, radius of curvature, thickness, material and conic coefficient of each lens in Embodiment 10. Table 30 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 10.

Referring to Table 29 and Table 30, a center thickness CT2 of the second lens E2 and a center thickness CT5 of the fifth lens E5 satisfy: CT2/CT5=1.25.

TABLE 29

| surface number | surface form | radius of curvature | thickness | material | conic coefficient |
|---|---|---|---|---|---|
| OBJ | spherical | infinite | infinite | | |
| STO | spherical | infinite | −0.2477 | | |
| S1 | aspheric | 1.5171 | 0.3772 | 1.54, 56.1 | −11.7161 |
| S2 | aspheric | 1.7903 | 0.1141 | | −12.6460 |
| S3 | aspheric | 2.0163 | 0.5028 | 1.54, 56.1 | −8.7998 |
| S4 | aspheric | −7.5577 | 0.0144 | | −74.2631 |
| S5 | aspheric | 7.7985 | 0.2349 | 1.66, 20.4 | 9.9919 |
| S6 | aspheric | 2.2569 | 0.4119 | | −23.3027 |
| S7 | aspheric | −90.4969 | 0.3425 | 1.65, 21.5 | 99.0000 |
| S8 | aspheric | 488.7268 | 0.3000 | | 98.6886 |
| S9 | aspheric | 3.2103 | 0.4011 | 1.54, 56.1 | −12.7167 |
| S10 | aspheric | infinite | 0.1816 | | 98.1035 |
| S11 | aspheric | 2.1299 | 0.4801 | 1.54, 56.1 | −3.3204 |
| S12 | aspheric | 1.0602 | 0.2440 | | −4.6608 |
| S13 | spherical | infinite | 0.2100 | 1.52, 64.2 | |
| S14 | spherical | infinite | 0.4741 | | |
| S15 | spherical | infinite | | | |

TABLE 30

| surface number | A4 | A6 | A8 | A10 | A12 |
|---|---|---|---|---|---|
| S1 | 3.5569E−01 | −7.1825E−01 | 1.1191E+00 | −1.1947E+00 | 5.7209E−01 |
| S2 | 1.2192E−01 | −6.3380E−01 | 1.3079E+00 | −2.4664E+00 | 3.2787E+00 |
| S3 | 2.0211E−02 | −3.0177E−01 | 6.8574E−01 | −1.6743E+00 | 2.9249E+00 |
| S4 | −1.7665E−01 | 8.9406E−01 | −3.1851E+00 | 6.3593E+00 | −7.3539E+00 |
| S5 | −2.0398E−01 | 9.6469E−01 | −3.0484E+00 | 5.4915E+00 | −5.8790E+00 |
| S6 | 1.5766E−01 | −3.1213E−01 | 1.0839E+00 | −3.0359E+00 | 4.9021E+00 |
| S7 | −1.4492E−01 | −1.5099E−01 | 1.4401E+00 | −4.5458E+00 | 8.2439E+00 |
| S8 | −1.8458E−01 | −1.5123E−01 | 6.9188E−01 | −1.0763E+00 | 9.4993E−01 |
| S9 | 1.9892E−01 | −5.0865E−01 | 6.3446E−01 | −6.8466E−01 | 5.2129E−01 |
| S10 | 2.0525E−01 | −1.5665E−01 | −9.2802E−02 | 1.8818E−01 | −1.2894E−01 |
| S11 | −4.4839E−01 | 3.9345E−01 | −2.8851E−01 | 2.1750E−01 | −1.4193E−01 |
| S12 | −2.2038E−01 | 1.7964E−01 | −1.1440E−01 | 5.2685E−02 | −1.6492E−02 |

| surface number | A14 | A16 | A18 | A20 |
|---|---|---|---|---|
| S1 | 5.2958E−02 | −1.5066E−01 | 3.9884E−02 | 0 |
| S2 | −2.4738E+00 | 9.6519E−01 | −1.5460E−01 | 0 |
| S3 | −2.4800E+00 | 9.3066E−01 | −1.1274E−01 | 0 |
| S4 | 4.8817E+00 | −1.7074E+00 | 2.3983E−01 | 0 |
| S5 | 3.5284E+00 | −9.9129E−01 | 7.5263E−02 | 0 |
| S6 | −4.2877E+00 | 1.8211E+00 | −2.4037E−01 | 0 |
| S7 | −8.7526E+00 | 5.0650E+00 | −1.2507E+00 | 0 |
| S8 | −3.9723E−01 | 3.3990E−02 | 1.3362E−02 | 0 |
| S9 | −2.4662E−01 | 6.9347E−02 | −1.0741E−02 | 7.1462E−04 |
| S10 | 4.7674E−02 | −9.5607E−03 | 9.1912E−04 | −2.8490E−05 |
| S11 | 6.1850E−02 | −1.5887E−02 | 2.1709E−03 | −1.2189E−04 |
| S12 | 3.3556E−03 | −4.2250E−04 | 2.9824E−05 | −9.0015E−07 |

In Embodiment 10, a radius of curvature R5 of the object-side surface of the third lens E3 and a radius of curvature R6 of the image-side surface thereof satisfy: (R5−R6)/(R5+R6)=0.55. A radius of curvature R9 of the object-side surface of the fifth lens E5 and a radius of curvature R12 of the image-side surface of the sixth lens E6 satisfy: R12/R9=0.33. A radius of curvature R11 of the object-side surface of the sixth lens E6 and a radius of curvature R12 of the image-side surface thereof satisfy: (R11−R12)/(R11+R12)=0.34.

Moreover, in Embodiment 10, an axial spacing T23 between the second lens E2 and the third lens E3 and an axial spacing T12 between the first lens E1 and the second lens E2 satisfy: T23/T12=0.13. An axial spacing l34 between the third lens E3 and the fourth lens E4 and a center thickness of the fourth lens E4 satisfy T34/CT4=1.2. An axial distance TTL from the object-side surface of the first lens to an image-side surface of a photosensitive component and ImgH, ImgH being half a diagonal length of an effective pixel area of a photosensitive component, satisfy: TTL/ImgH=1.56.

Figure 20A:
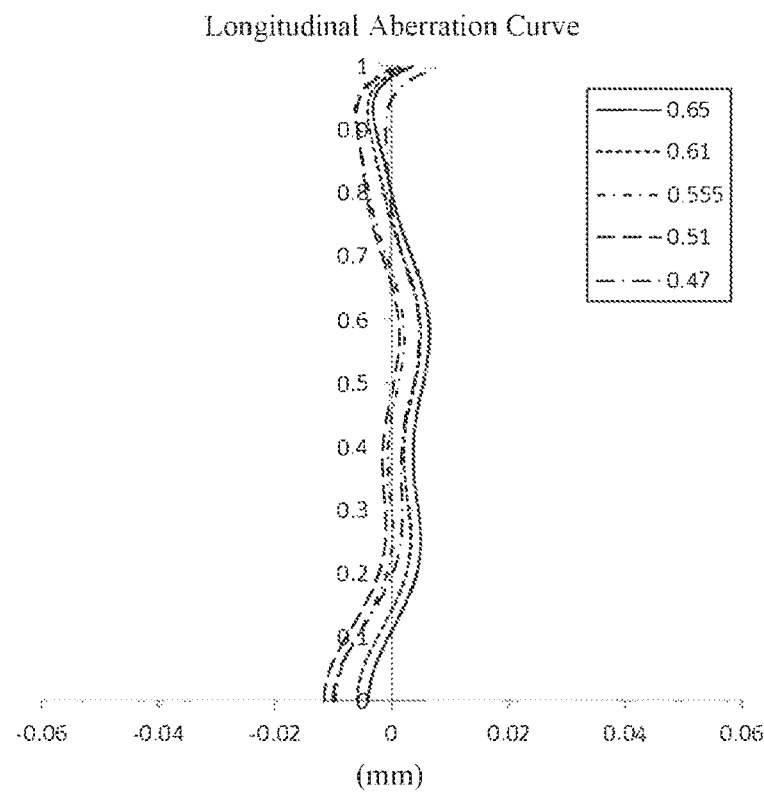
FIG. 20A illustrates an longitudinal aberration curve of the camera lens assembly according to Embodiment 10.
Figure 20B:
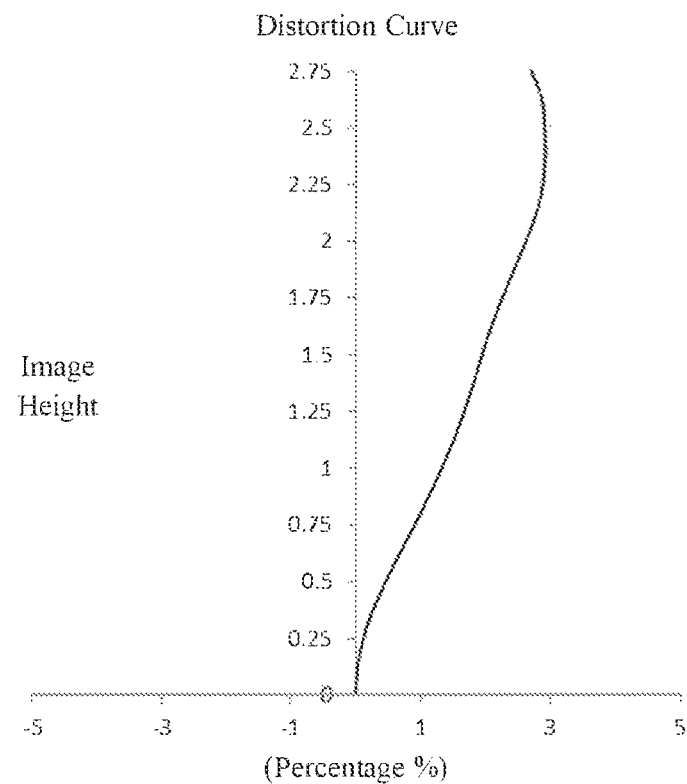
FIG. 20B illustrates a distortion curve of the camera lens assembly according to Embodiment 10.
Figure 20C:
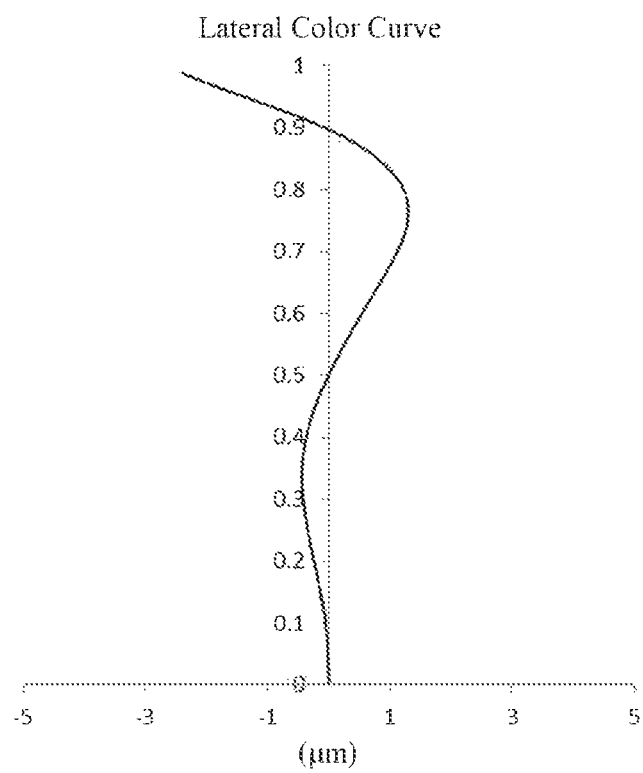
FIG. 20C illustrates a lateral color curve of the camera lens assembly according to Embodiment 10.
Figure 20D:
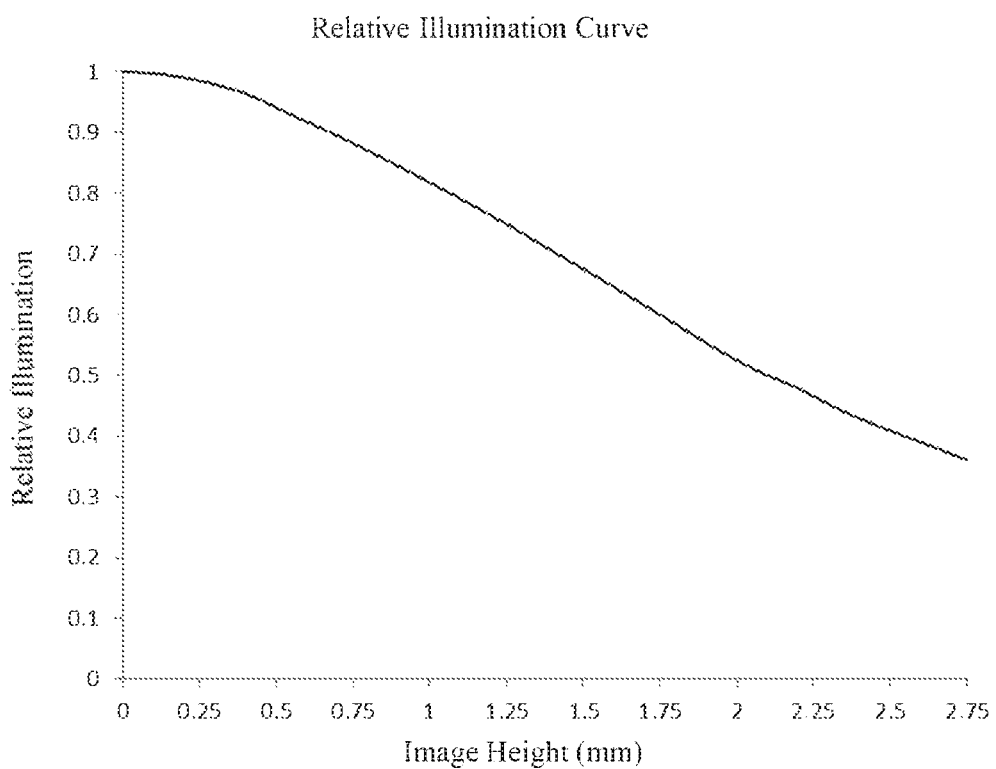
FIG. 20D illustrates a relative illumination curve of the camera lens assembly according to Embodiment 10.

FIG. 20A illustrates an longitudinal aberration curve of the camera lens assembly according to Embodiment 10, representing deviations of focal points of light of different wavelengths converged after passing through an optical system. FIG. 20B illustrates a distortion curve of the camera lens assembly according to Embodiment 10, representing amounts of distortion at different viewing angles. FIG. 20C illustrates a lateral color curve of the camera lens assembly according to Embodiment 10, representing deviations of different image heights on an image plane after light passes through the camera lens assembly. FIG. 20D illustrates a relative illumination curve of the camera lens assembly according to Embodiment 10, representing ratios of central illuminations to peripheral illuminations. It can be seen from FIG. 20A to FIG. 20D that the camera lens assembly provided in Embodiment 10 achieves good image quality.

Embodiment 11

Figure 21:
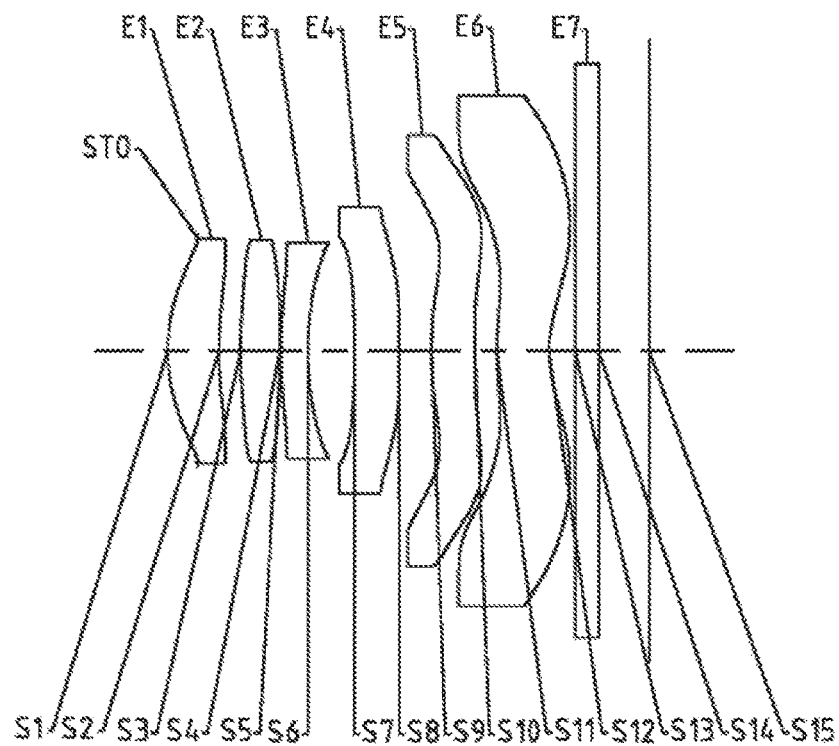
FIG. 21 is a schematic structural diagram of a camera lens assembly according to Embodiment 11 of the present application.

Embodiment 11 according to the camera lens assembly of the present application will be described below with reference to FIG. 21 to FIG. 22D. FIG. 21 is a schematic structural diagram of a camera lens assembly according to Embodiment 11. As shown in FIG. 21, the camera lens assembly according to Embodiment 11 includes the first lens to the sixth lens E1-E6 respectively having an object-side surface and an image-side surface. Table 31 below shows effective focal lengths f1 to f6 of the lenses, a total effective focal length f of the camera lens assembly, and a total track length TTL and a half field-of-view (diagonal) angle HFOV of the camera lens according to Embodiment 11.

According to Table 31, the effective focal length f1 of the first lens E1 and the total effective focal length f satisfy: f/f1=0.75.

TABLE 31

| f1 (mm) | 4.72 | f (mm) | 3.55 |
|---|---|---|---|
| f2 (mm) | 7.87 | TTL (mm) | 4.25 |
| f3 (mm) | −11.06 | HFOV (deg) | 37.23 |
| f4 (mm) | −117.27 | | |
| f5 (mm) | 8.30 | | |
| f6 (mm) | −4.29 | | |

In Embodiment 11, a combined focal length f12 of the first lens E1 and the second lens E2 and an effective focal length of the third lens E3 satisfy: f12/f3=−0.28. A combined focal length f23 of the second lens E2 and the third lens E3 and the total effective focal length f satisfy: f/f23=0.15. The effective focal length f4 of the fourth lens E4, the effective focal length f5 of the fifth lens E5 and the total effective focal length f satisfy: |f/f4|+|f/f5|=0.46. A combined focal length f56 of the fifth lens E5 and the sixth lens E6 and the total effective focal length f satisfy: f/f56=−0.29. The total effective focal length f and an entrance pupil diameter EPD of the camera lens assembly satisfy: f/EPD=1.78.

Table 32 shows a surface form, radius of curvature, thickness, material and conic coefficient of each lens in Embodiment 11. Table 33 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 11.

TABLE 32

| surface number | surface form | radius of curvature | thickness | material | conic coefficient |
|---|---|---|---|---|---|
| OBJ | spherical | infinite | infinite | | |
| STO | spherical | infinite | −0.2643 | | |
| S1 | aspheric | 1.5608 | 0.4550 | 1.54, 56.1 | −11.1952 |
| S2 | aspheric | 3.5701 | 0.1903 | | −15.7496 |
| S3 | aspheric | 4.7843 | 0.3453 | 1.54, 56.1 | −5.8579 |
| S4 | aspheric | −39.5607 | 0.0078 | | 99.0000 |
| S5 | aspheric | 4.2448 | 0.2349 | 1.66, 20.4 | 2.8185 |
| S6 | aspheric | 2.6259 | 0.4129 | | −25.0613 |
| S7 | aspheric | −90.4969 | 0.3962 | 1.65, 21.5 | 99.0000 |
| S8 | aspheric | 488.7268 | 0.2853 | | 98.8180 |
| S9 | aspheric | 4.5174 | 0.3816 | 1.54, 56.1 | −19.0657 |
| S10 | aspheric | infinite | 0.1917 | | 98.1122 |
| S11 | aspheric | 2.2437 | 0.4634 | 1.54, 56.1 | −3.3062 |
| S12 | aspheric | 1.0605 | 0.2247 | | −5.3646 |

TABLE 32-continued

| surface number | surface form | radius of curvature | thickness | material | conic coefficient |
|---|---|---|---|---|---|
| S13 | spherical | infinite | 0.2100 | 1.52, 64.2 | |
| S14 | spherical | infinite | 0.4472 | | |
| S15 | spherical | infinite | | | |

Referring to Table 32 and Table 33, a center thickness CT2 of the second lens E2 and a center thickness CT5 of the fifth lens E5 satisfy: CT2/CT5=0.9.

In Embodiment 11, a radius of curvature R5 of the object-side surface of the third lens E3 and a radius of curvature R6 of the image-side surface thereof satisfy: (R5−R6)/(R5+R6)=0.24. A radius of curvature R9 of the object-side surface of the fifth lens E5 and a radius of curvature R12 of the image-side surface of the sixth lens E6 satisfy: R12/R9=0.23. A radius of curvature R11 of the object-side surface of the sixth lens E6 and a radius of curvature R12 of the image-side surface thereof satisfy: (R11−R12)/(R11+R12)=0.36.

Moreover, in Embodiment 11, an axial spacing T23 between the second lens E2 and the third lens E3 and an axial spacing T12 between the first lens E1 and the second lens E2 satisfy: T23/T12=0.04. An axial spacing 134 between the third lens E3 and the fourth lens E4 and a center thickness of the fourth lens E4 satisfy T34/CT4=1.04. An axial distance TTL from the object-side surface of the first lens to an image-side surface of a photosensitive component and ImgH, ImgH being half a diagonal length of an effective pixel area of a photosensitive component, satisfy: TTL/ImgH=1.54.

TABLE 33

| surface number | A4 | A6 | A8 | A10 | A12 |
|---|---|---|---|---|---|
| S1 | 3.1142E−01 | −4.0650E−01 | 7.6350E−02 | 9.6175E−01 | −2.1206E+00 |
| S2 | −7.6863E−03 | −1.4326E−01 | 2.6721E−01 | −6.0647E−01 | 8.0428E−01 |
| S3 | −4.6235E−02 | −3.7411E−02 | 8.0973E−02 | −1.1844E−01 | −1.1125E−01 |
| S4 | −2.1628E−01 | 1.4286E+00 | −5.6670E+00 | 1.1595E+01 | −1.3378E+01 |
| S5 | −2.0365E−01 | 1.3109E+00 | −4.8836E+00 | 9.1831E+00 | −9.5073E+00 |
| S6 | 1.3234E−01 | −2.3087E−01 | 1.1559E+00 | −4.2409E+00 | 8.2767E+00 |
| S7 | −1.6189E−01 | 4.8560E−03 | 8.3695E−01 | −3.5594E+00 | 7.7056E+00 |
| S8 | −1.5405E−01 | −1.3654E−01 | 5.5110E−01 | −8.3778E−01 | 7.4645E−01 |
| S9 | 2.3245E−01 | −6.6007E−01 | 9.1307E−01 | −1.0984E+00 | 9.5159E−01 |
| S10 | 2.5867E−01 | −2.9808E−01 | 9.3562E−02 | 3.1197E−02 | −3.8326E−02 |
| S11 | −4.6487E−01 | 4.0117E−01 | −2.4928E−01 | 1.4358E−01 | −8.4030E−02 |
| S12 | −2.2356E−01 | 1.8324E−01 | −1.2108E−01 | 5.6946E−02 | −1.8052E−02 |

| surface number | A14 | A16 | A18 | A20 |
|---|---|---|---|---|
| S1 | 1.9990E+00 | −8.9628E−01 | 1.5670E−01 | 0 |
| S2 | −5.2531E−01 | 1.8063E−01 | −3.0401E−02 | 0 |
| S3 | 9.1966E−01 | −1.0517E+00 | 3.6281E−01 | 0 |
| S4 | 8.8125E+00 | −3.0624E+00 | 4.2757E−01 | 0 |
| S5 | 5.2767E+00 | −1.3114E+00 | 6.8047E−02 | 0 |
| S6 | −8.5687E+00 | 4.4266E+00 | −8.4198E−01 | 0 |
| S7 | −9.3896E+00 | 6.1211E+00 | −1.6807E+00 | 0 |
| S8 | −3.3685E−01 | 5.3876E−02 | 2.3068E−03 | 0 |
| S9 | −5.2686E−01 | 1.7853E−01 | −3.4116E−02 | 2.8343E−03 |
| S10 | 1.2793E−02 | −1.2559E−03 | −1.6714E−04 | 3.0646E−05 |
| S11 | 3.7544E−02 | −1.0181E−02 | 1.4655E−03 | −8.6152E−05 |
| S12 | 3.7583E−03 | −4.9426E−04 | 3.7303E−05 | −1.2285E−06 |

Figure 22A:
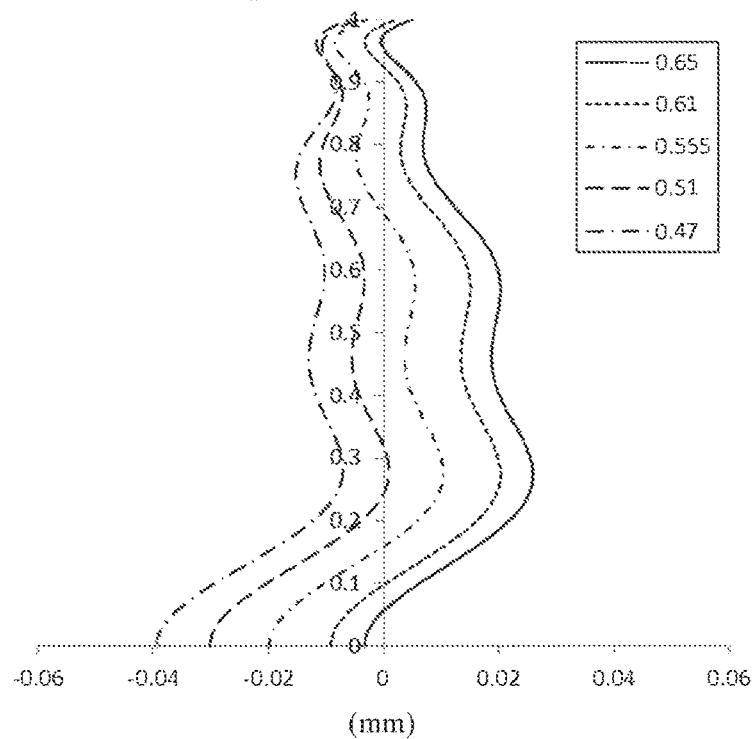
FIG. 22A illustrates an longitudinal aberration curve of the camera lens assembly according to Embodiment 11.
Figure 22B:
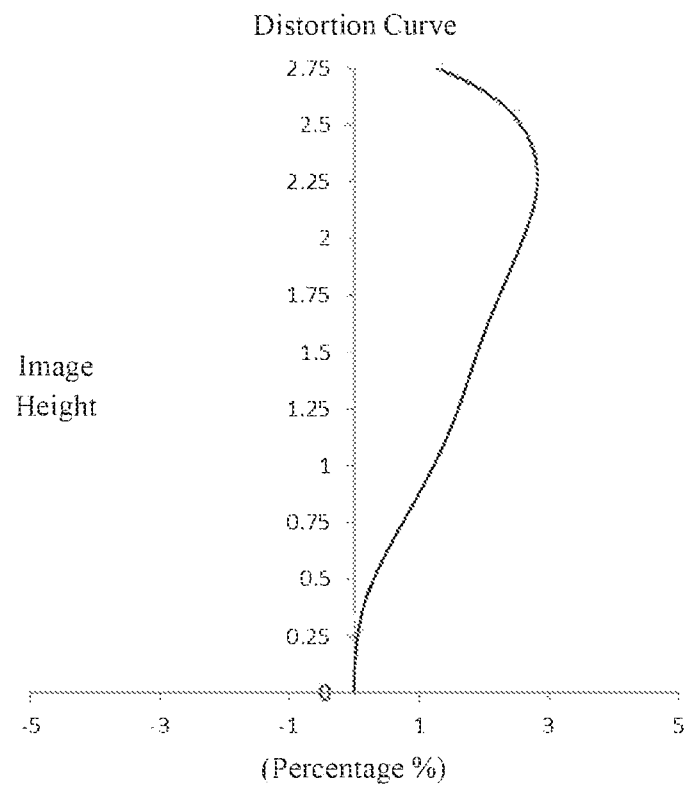
FIG. 22B illustrates a distortion curve of the camera lens assembly according to Embodiment 11.
Figure 22C:
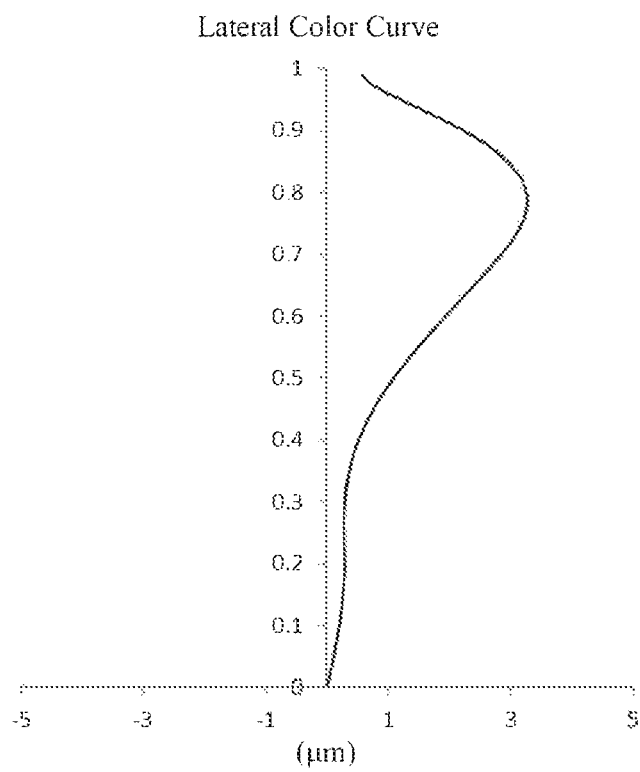
FIG. 22C illustrates a lateral color curve of the camera lens assembly according to Embodiment 11.
Figure 22D:
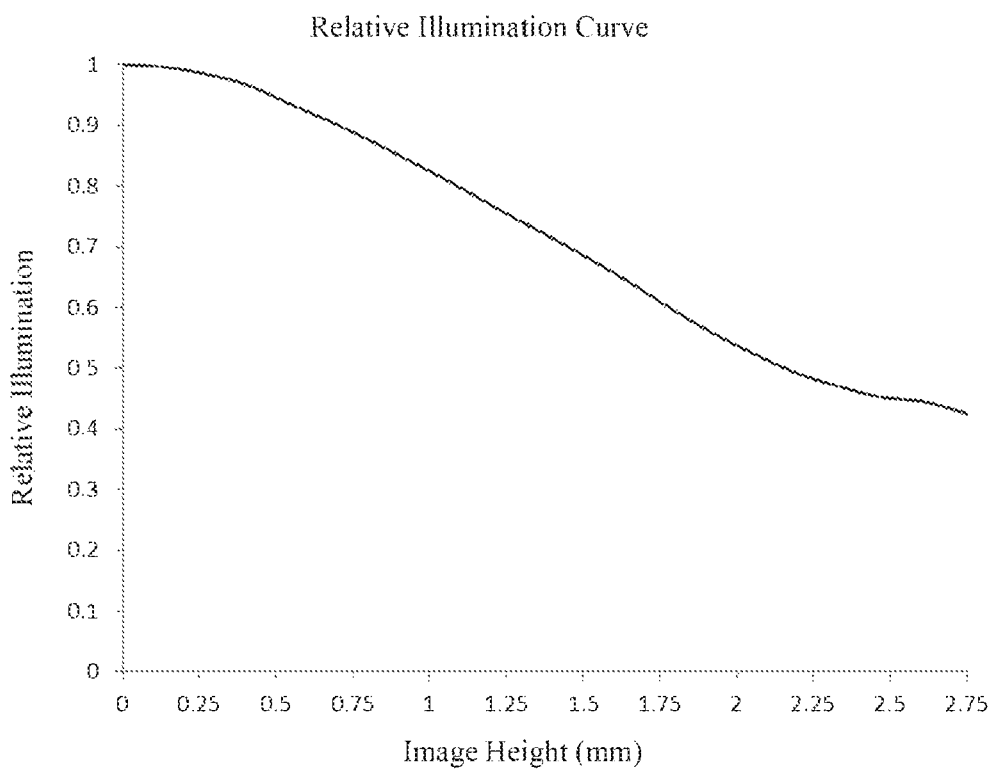
FIG. 22D illustrates a relative illumination curve of the camera lens assembly according to Embodiment 11.

FIG. 22A illustrates an longitudinal aberration curve of the camera lens assembly according to Embodiment 11, representing deviations of focal points of light of different wavelengths converged after passing through an optical system. FIG. 22B illustrates a distortion curve of the camera lens assembly according to Embodiment 11, representing amounts of distortion at different viewing angles. FIG. 22C illustrates a lateral color curve of the camera lens assembly according to Embodiment 11, representing deviations of different image heights on an image plane after light passes through the camera lens assembly. FIG. 22D illustrates a relative illumination curve of the camera lens assembly according to Embodiment 11, representing ratios of central illuminations to peripheral illuminations. It can be seen from FIG. 22A to FIG. 22D that the camera lens assembly provided in Embodiment 11 achieves good image quality.

Embodiment 12

Figure 23:
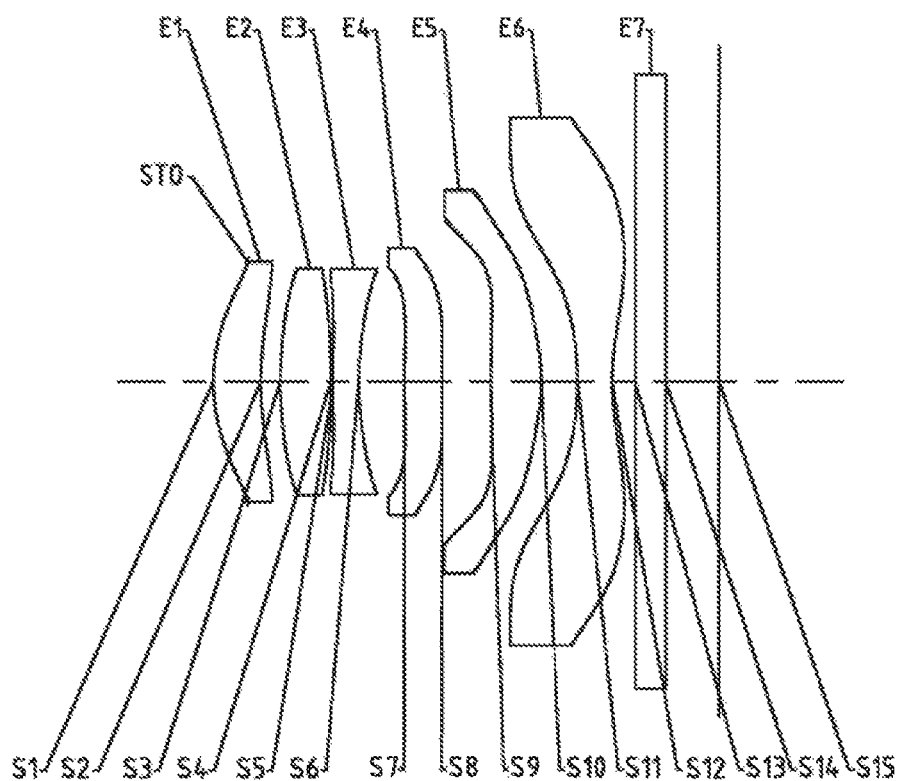
FIG. 23 is a schematic structural diagram of a camera lens assembly according to Embodiment 12 of the present application.

Embodiment 12 according to the camera lens assembly of the present application will be described below with reference to FIG. 23 to FIG. 24D. FIG. 23 is a schematic structural diagram of a camera lens assembly according to Embodiment 12. As shown in FIG. 23, the camera lens assembly according to Embodiment 12 includes the first lens to the sixth lens E1-E6 respectively having an object-side surface and an image-side surface. Table 34 below shows effective focal lengths f1 to f6 of the lenses, a total effective focal length f of the camera lens assembly, and a total track length TTL and a half field-of-view (diagonal) angle HFOV of the camera lens according to Embodiment 12.

TABLE 34

| f1 (mm) | 6.61  | f (mm)     | 4.21  |
|---------|-------|------------|-------|
| f2 (mm) | 4.89  | TTL (mm)   | 4.95  |
| f3 (mm) | −5.25 | HFOV (deg) | 37.62 |
| f4 (mm) | 33.09 |            |       |
| f5 (mm) | 3.15  |            |       |
| f6 (mm) | −2.25 |            |       |

According to Table 34, the effective focal length f1 of the first lens E1 and the total effective focal length f satisfy: f/f1=0.64.

In Embodiment 12, a combined focal length f12 of the first lens E1 and the second lens E2 and an effective focal length of the third lens E3 satisfy: f12/f3=−0.58. A combined focal length f23 of the second lens E2 and the third lens E3 and the total effective focal length f satisfy: f/f23=0.13. A combined focal length f56 of the fifth lens E5 and the sixth lens E6 and the total effective focal length f satisfy: f/f56=−0.23. The total effective focal length f and an entrance pupil diameter EPD of the camera lens assembly satisfy: f/EPD=1.79.

Table 35 shows a surface form, radius of curvature, thickness, material and conic coefficient of each lens in Embodiment 12. Table 36 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 12.

Referring to Table 35 and Table 36, a center thickness CT2 of the second lens E2 and a center thickness CT5 of the fifth lens E5 satisfy: CT2/CT5=1.

In Embodiment 12, a radius of curvature R5 of the object-side surface of the third lens E3 and a radius of curvature R6 of the image-side surface thereof satisfy: (R5−R6)/(R5+R6)=0.71. A radius of curvature R9 of the object-side surface of the fifth lens E5 and a radius of curvature R12 of the image-side surface of the sixth lens E6 satisfy: R12/R9=0.18.

TABLE 35

| surface number | surface form | radius of curvature | thickness | material   | conic coefficient |
|----------------|--------------|---------------------|-----------|------------|-------------------|
| OBJ            | spherical    | infinite            | infinite  |            |                   |
| STO            | spherical    | infinite            | −0.3352   |            |                   |
| S1             | aspheric     | 1.7793              | 0.4649    | 1.54, 56.1 | −8.1965           |
| S2             | aspheric     | 3.1962              | 0.1894    |            | −14.8247          |
| S3             | aspheric     | 3.5142              | 0.4952    | 1.54, 56.1 | −1.2453           |
| S4             | aspheric     | −10.4391            | 0.0250    |            | 24.4553           |
| S5             | aspheric     | 16.6267             | 0.2494    | 1.66, 20.4 | 97.5933           |
| S6             | aspheric     | 2.8510              | 0.4508    |            | −21.6009          |
| S7             | aspheric     | 8.3360              | 0.3663    | 1.64, 23.5 | −94.6520          |
| S8             | aspheric     | 13.5142             | 0.4698    |            | 98.6505           |
| S9             | aspheric     | 13.1233             | 0.4968    | 1.54, 56.1 | 25.2283           |
| S10            | aspheric     | −1.9478             | 0.3566    |            | −0.5103           |
| S11            | aspheric     | −2.7042             | 0.3350    | 1.54, 56.1 | −0.5055           |
| S12            | aspheric     | 2.3289              | 0.2276    |            | −0.8880           |
| S13            | spherical    | infinite            | 0.3000    | 1.52, 64.2 |                   |
| S14            | spherical    | infinite            | 0.5228    |            |                   |
| S15            | spherical    | infinite            |           |            |                   |

TABLE 36

| surface number | A4          | A6          | A8          | A10         | A12         | A14         | A16         | A18         | A20 |
|----------------|-------------|-------------|-------------|-------------|-------------|-------------|-------------|-------------|-----|
| S1  | 1.5921E−01  | −1.5214E−01 | 8.8496E−02  | 1.5914E−02  | −1.0721E−01 | 9.3723E−02  | −3.4408E−02 | 4.7081E−03  | 0   |
| S2  | 1.6011E−02  | −8.3018E−02 | 7.5432E−02  | −6.4719E−02 | 3.1592E−02  | 1.4272E−02  | −1.7926E−02 | 4.2271E−03  | 0   |
| S3  | −2.2814E−02 | −2.6109E−02 | 3.9351E−03  | 9.7926E−02  | −2.0164E−01 | 2.5473E−01  | −1.5944E−01 | 3.7761E−02  | 0   |
| S4  | −8.5414E−02 | 4.2935E−01  | −1.2046E+00 | 1.9914E+00  | −2.2029E+00 | 1.6603E+00  | −7.6307E−01 | 1.5768E−01  | 0   |
| S5  | −1.6721E−01 | 5.0778E−01  | −1.0784E+00 | 1.3127E+00  | −1.0103E+00 | 5.5028E−01  | −2.1820E−01 | 4.7859E−02  | 0   |
| S6  | −7.8252E−03 | 1.2562E−01  | −3.4381E−01 | 7.4151E−01  | −1.2435E+00 | 1.3441E+00  | −7.8761E−01 | 1.9178E−01  | 0   |
| S7  | −1.3185E−01 | 6.7105E−02  | −4.4621E−02 | −1.6659E−01 | 4.4300E−01  | −5.1129E−01 | 2.8261E−01  | −6.0576E−02 | 0   |
| S8  | −1.4925E−01 | −1.2912E−02 | 1.6648E−01  | −4.0885E−01 | 5.2265E−01  | −3.7901E−01 | 1.4557E−01  | −2.2494E−02 | 0   |
| S9  | −6.9311E−04 | −5.6093E−02 | −3.7797E−03 | 1.0339E−02  | −1.2257E−02 | 8.6975E−03  | −2.4864E−03 | 2.5052E−04  | 0   |
| S10 | 2.1065E−01  | −1.8640E−01 | 1.0459E−01  | −6.0928E−02 | 3.0562E−02  | −9.1497E−03 | 1.3950E−03  | −8.4146E−05 | 0   |
| S11 | 7.3905E−02  | −1.9020E−01 | 1.5969E−01  | −7.0110E−02 | 1.8778E−02  | −3.0916E−03 | 2.8680E−04  | −1.1432E−05 | 0   |
| S12 | −1.3854E−01 | 4.4879E−02  | −1.0443E−02 | 1.6203E−03  | −2.2016E−04 | 3.0371E−05  | −2.8312E−06 | 1.1028E−07  | 0   |

Moreover, in Embodiment 12, an axial spacing T23 between the second lens E2 and the third lens E3 and an axial spacing T12 between the first lens E1 and the second lens E2 satisfy: T23/T12=0.13. An axial spacing 134 between the third lens E3 and the fourth lens E4 and a center thickness of the fourth lens E4 satisfy T34/CT4=1.23. An axial distance TTL from the object-side surface of the first lens to an image-side surface of a photosensitive component and ImgH, ImgH being half a diagonal length of an effective pixel area of a photosensitive component, satisfy: TTL/ImgH=1.5.

Figure 24A:
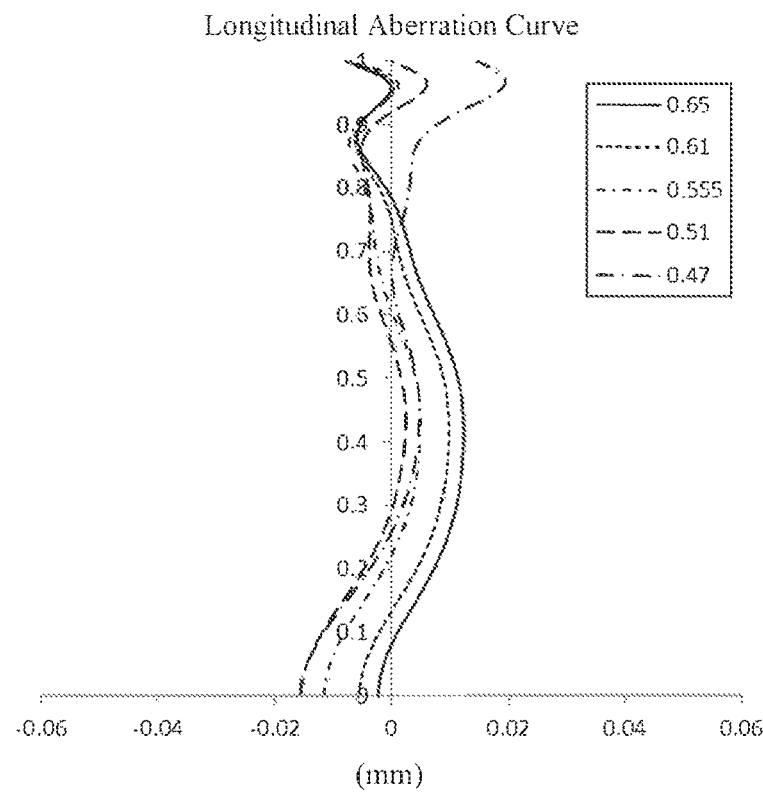
FIG. 24A illustrates an longitudinal aberration curve of the camera lens assembly according to Embodiment 12.
Figure 24B:
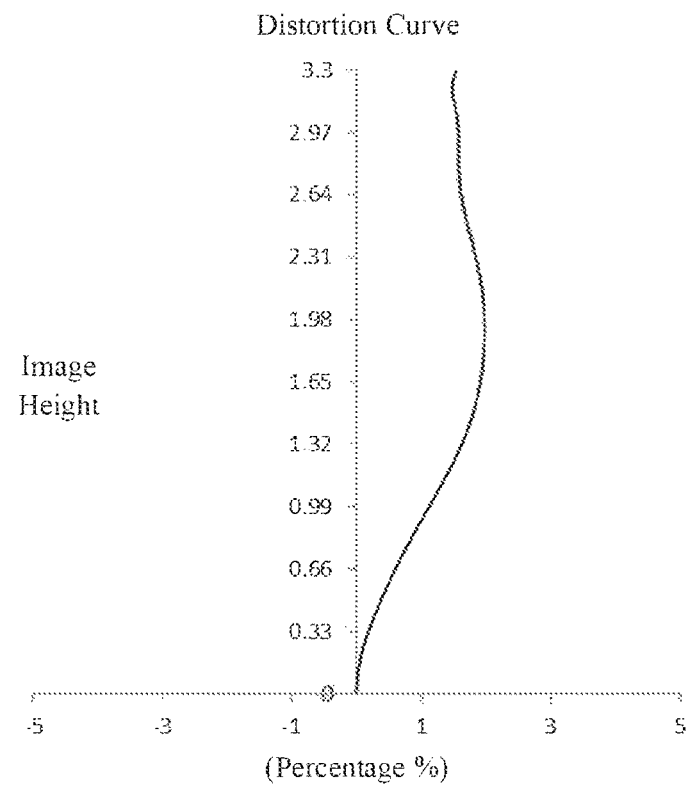
FIG. 24B illustrates a distortion curve of the camera lens assembly according to Embodiment 12.
Figure 24C:
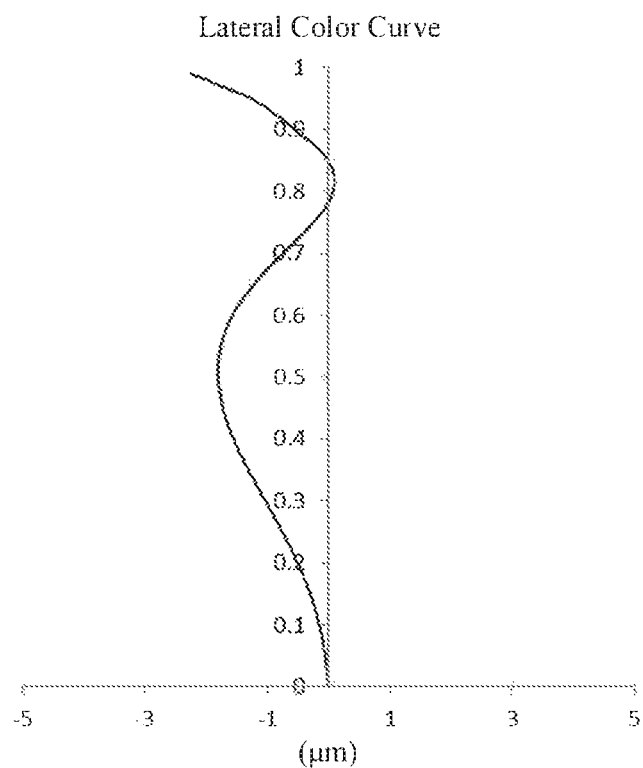
FIG. 24C illustrates a lateral color curve of the camera lens assembly according to Embodiment 12.
Figure 24D:
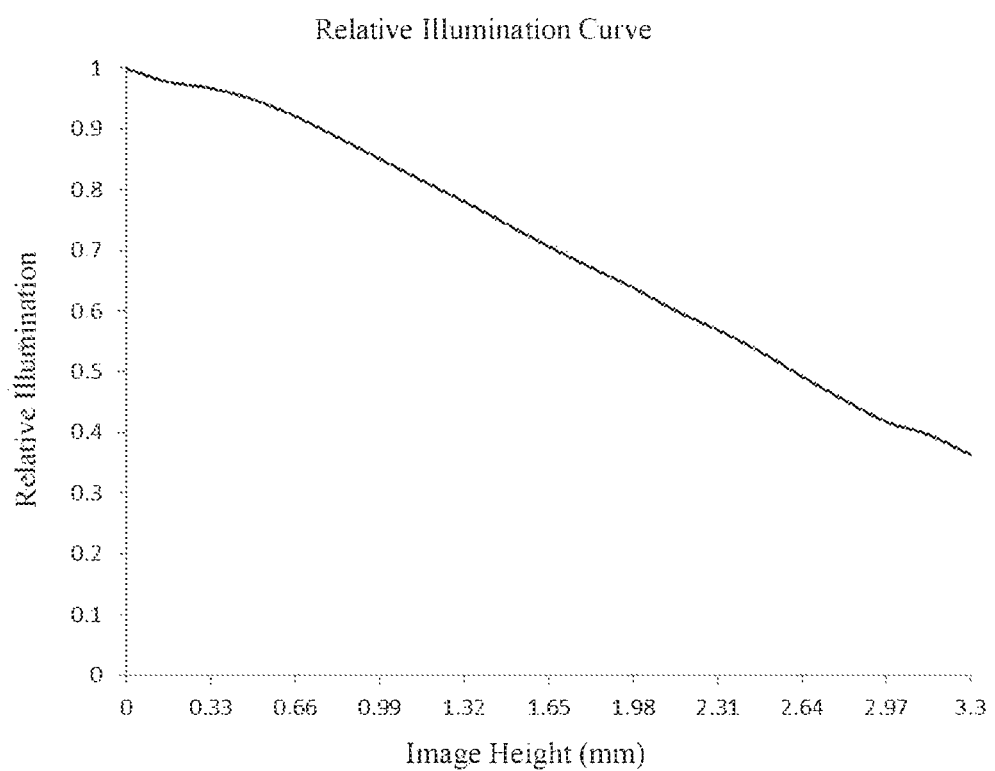
FIG. 24D illustrates a relative illumination curve of the camera lens assembly according to Embodiment 12.

FIG. 24A illustrates an longitudinal aberration curve of the camera lens assembly according to Embodiment 12, representing deviations of focal points of light of different wavelengths converged after passing through an optical system. FIG. 24B illustrates a distortion curve of the camera lens assembly according to Embodiment 12, representing amounts of distortion at different viewing angles. FIG. 24C illustrates a lateral color curve of the camera lens assembly according to Embodiment 12, representing deviations of different image heights on an image plane after light passes through the camera lens assembly. FIG. 24D illustrates a relative illumination curve of the camera lens assembly according to Embodiment 12, representing ratios of central illuminations to peripheral illuminations. It can be seen from FIG. 24A to FIG. 24D that the camera lens assembly provided in Embodiment 12 achieves good image quality.

Embodiment 13

Figure 25:
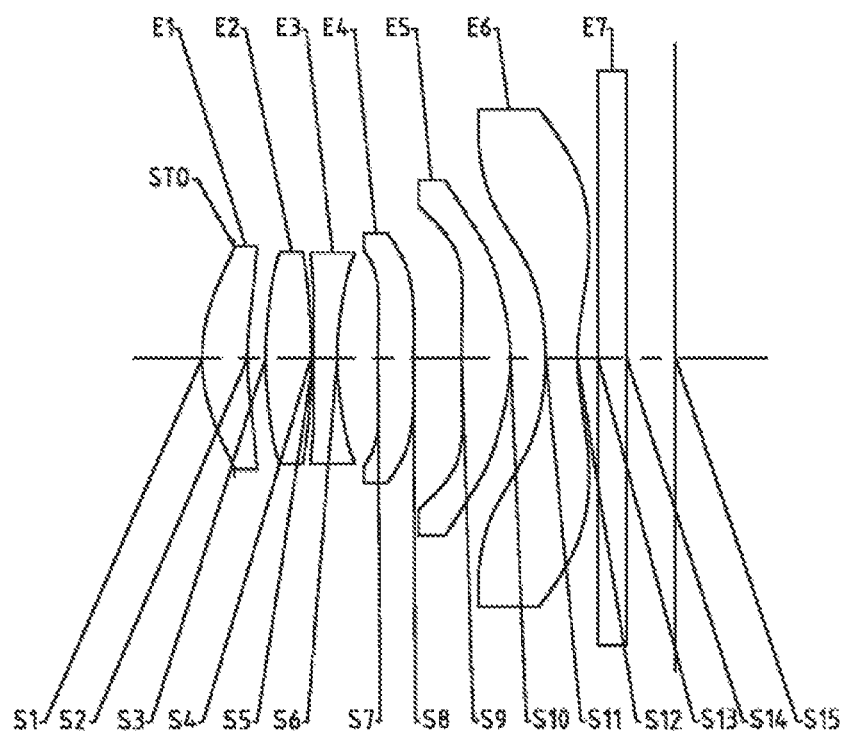
FIG. 25 is a schematic structural diagram of a camera lens assembly according to Embodiment 13 of the present application.

Embodiment 13 according to the camera lens assembly of the present application will be described below with reference to FIG. 25 to FIG. 26D. FIG. 25 is a schematic structural diagram of a camera lens assembly according to Embodiment 13. As shown in FIG. 25, the camera lens assembly according to Embodiment 13 includes the first lens to the sixth lens E1-E6 respectively having an object-side surface and an image-side surface. Table 37 below shows effective focal lengths f1 to f6 of the lenses, a total effective focal length f of the camera lens assembly, and a total track length TTL and a half field-of-view (diagonal) angle HFOV of the camera lens according to Embodiment 13. According to Table 37, the effective focal length f1 of the first lens E1 and the total effective focal length f satisfy: f/f1=0.69.

In Embodiment 13, a combined focal length f12 of the first lens E1 and the second lens E2 and an effective focal length of the third lens E3 satisfy: f12/f3=−0.6. A combined focal length f23 of the second lens E2 and the third lens E3 and the total effective focal length f satisfy: f/f23=0.04. A combined focal length f56 of the fifth lens E5 and the sixth lens E6 and the total effective focal length f satisfy: f/f56=−0.23. The total effective focal length f and an entrance pupil diameter EPD of the camera lens assembly satisfy: f/EPD=1.79.

TABLE 37

| f1 (mm) | 6.09 | f (mm) | 4.19 |
|---|---|---|---|
| f2 (mm) | 5.27 | TTL (mm) | 4.95 |
| f3 (mm) | −5.09 | HFOV (deg) | 37.79 |
| f4 (mm) | 26.33 | | |
| f5 (mm) | 3.11 | | |
| f6 (mm) | −2.21 | | |

Table 38 shows a surface form, radius of curvature, thickness, material and conic coefficient of each lens in Embodiment 13. Table 39 shows high-order coefficients $A_4$, $A_6$, $A_8$, $A_{10}$, $A_{12}$, $A_{16}$, $A_{18}$ and $A_{20}$ that can be applied to the aspheric mirror surfaces S1-S12 in Embodiment 13.

TABLE 38

| surface number | surface form | radius of curvature | thickness | material | conic coefficient |
|---|---|---|---|---|---|
| OBJ | spherical | infinite | infinite | | |
| STO | spherical | infinite | −0.3349 | | |
| S1 | aspheric | 1.7883 | 0.4750 | 1.54, 56.1 | −8.0596 |
| S2 | aspheric | 3.5223 | 0.1906 | | −15.9176 |
| S3 | aspheric | 3.9423 | 0.4765 | 1.54, 56.1 | −1.0720 |
| S4 | aspheric | −10.0617 | 0.0250 | | 25.2203 |
| S5 | aspheric | 17.9496 | 0.2468 | 1.66, 20.4 | 87.4022 |
| S6 | aspheric | 2.8177 | 0.4283 | | −21.3109 |
| S7 | aspheric | 7.6526 | 0.3696 | 1.64, 23.5 | −84.6185 |
| S8 | aspheric | 13.7582 | 0.4980 | | 99.0000 |
| S9 | aspheric | 15.3067 | 0.5138 | 1.54, 56.1 | 34.6603 |
| S10 | aspheric | −1.8771 | 0.3682 | | −0.5314 |
| S11 | aspheric | −2.6530 | 0.3300 | 1.54, 56.1 | −0.4954 |
| S12 | aspheric | 2.2936 | 0.2164 | | −0.9028 |
| S13 | spherical | infinite | 0.3000 | 1.52, 64.2 | |
| S14 | spherical | infinite | 0.5116 | | |
| S15 | spherical | infinite | | | |

Referring to Table 38 and Table 39, a center thickness CT2 of the second lens E2 and a center thickness CT5 of the fifth lens E5 satisfy: CT2/CT5=0.93.

TABLE 39

| surface number | A4 | A6 | A8 | A10 | A12 | A14 | A16 | A18 | A20 |
|---|---|---|---|---|---|---|---|---|---|
| S1 | 1.5477E−01 | −1.4163E−01 | 7.9949E−02 | 1.6065E−02 | −9.7879E−02 | 0.083302785 | −0.029618449 | 0.00386441 | 0 |
| S2 | 3.3449E−03 | −6.1072E−02 | 5.7341E−02 | −6.1729E−02 | 5.1448E−02 | −0.015824674 | 0.000381971 | 3.4529E−05 | 0 |
| S3 | −2.8798E−02 | −1.9353E−02 | 2.5950E−02 | 1.1079E−02 | −4.3641E−02 | 0.09419556 | −0.073244622 | 0.018744202 | 0 |
| S4 | −1.0388E−01 | 6.1492E−01 | −1.9421E+00 | 3.5723E+00 | −4.2269E+00 | 3.213887101 | −1.420265758 | 0.27467163 | 0 |
| S5 | −1.8603E−01 | 6.9761E−01 | −1.8312E+00 | 2.9143E+00 | −3.0555E+00 | 2.1340E+00 | −0.902976904 | 0.173923561 | 0 |
| S6 | −1.3333E−02 | 1.5539E−01 | −4.1305E−01 | 7.9419E−01 | −1.1781E+00 | 1.1936E+00 | −0.681718946 | 0.164740882 | 0 |
| S7 | −1.2482E−01 | 3.7955E−02 | 4.1097E−02 | −3.3817E−01 | 6.6407E−01 | −6.8748E−01 | 0.363232112 | −0.076743507 | 0 |
| S8 | −1.4326E−01 | −1.1784E−02 | 1.4101E−01 | −3.4430E−01 | 4.3515E−01 | −3.1262E−01 | 0.119156258 | −0.018241102 | 0 |
| S9 | −9.5045E−03 | −3.5571E−02 | −2.6048E−02 | 3.4670E−02 | −3.0176E−02 | 1.6504E−02 | −4.3799E−03 | 0.000445961 | 0 |
| S10 | 1.9028E−01 | −1.7305E−01 | 1.1095E−01 | −7.3016E−02 | 3.7499E−02 | −1.1171E−02 | 1.6937E−03 | −0.000101833 | 0 |
| S11 | 5.3498E−02 | −1.6150E−01 | 1.3674E−01 | −5.8808E−02 | 1.5386E−02 | −2.4866E−03 | 2.2758E−04 | −8.9770E−06 | 0 |
| S12 | −1.4568E−01 | 5.4083E−02 | −1.6298E−02 | 3.8827E−03 | −7.6402E−04 | 1.0962E−04 | −9.1999E−06 | 3.2435E−07 | 0 |

In Embodiment 13, a radius of curvature R5 of the object-side surface of the third lens E3 and a radius of curvature R6 of the image-side surface thereof satisfy: (R5−R6)/(R5+R6)=0.73. A radius of curvature R9 of the object-side surface of the fifth lens E5 and a radius of curvature R12 of the image-side surface of the sixth lens E6 satisfy: R12/R9=0.15.

Moreover, in Embodiment 13, an axial spacing T23 between the second lens E2 and the third lens E3 and an axial spacing T12 between the first lens E1 and the second lens E2 satisfy: T23/T12=0.13. An axial spacing 134 between the third lens E3 and the fourth lens E4 and a center thickness of the fourth lens E4 satisfy T34/CT4=1.16. An axial distance TTL from the object-side surface of the first lens to an image-side surface of a photosensitive component and ImgH, ImgH being half a diagonal length of an effective pixel area of a photosensitive component, satisfy: TTL/ImgH=1.5.

Figure 26A:
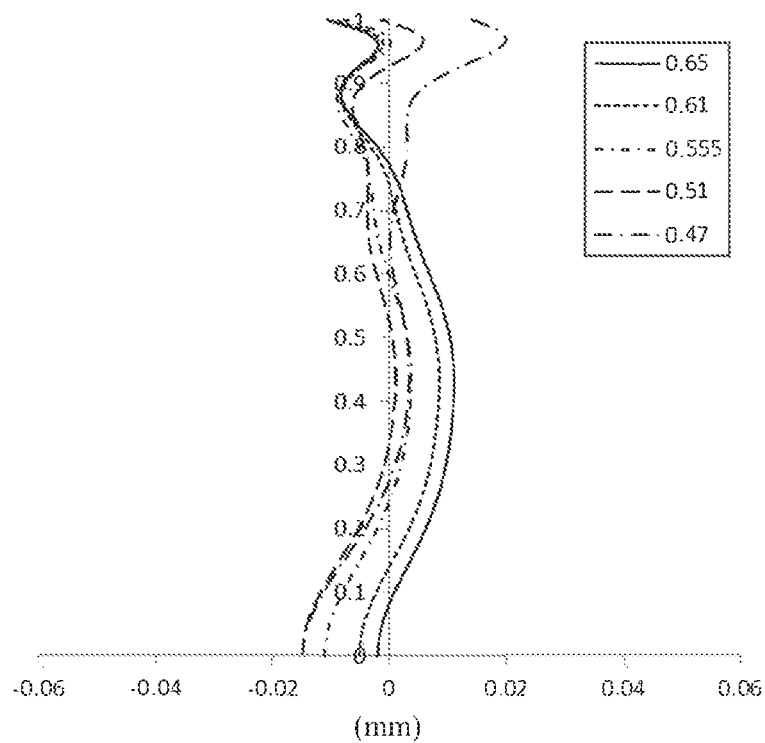
FIG. 26A illustrates an longitudinal aberration curve of the camera lens assembly according to Embodiment 13.
Figure 26B:
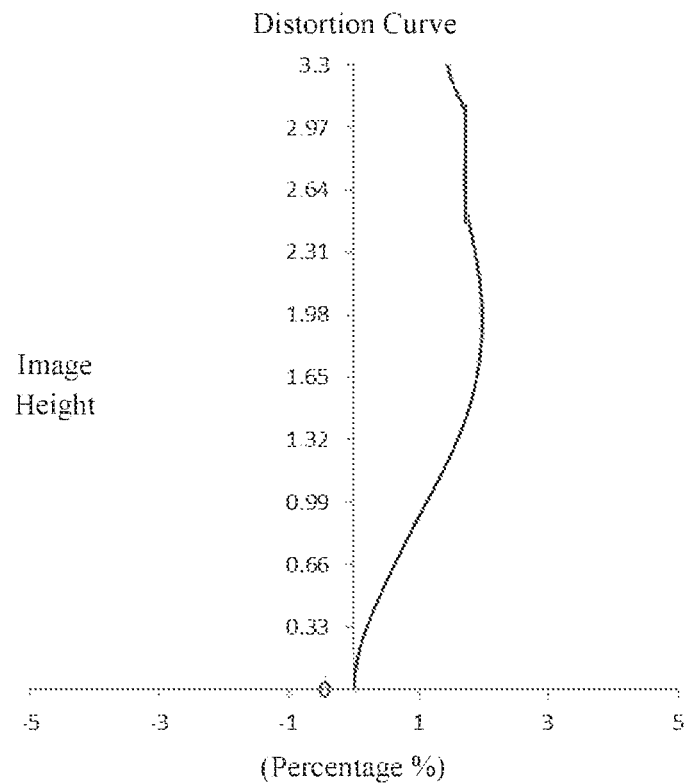
FIG. 26B illustrates a distortion curve of the camera lens assembly according to Embodiment 13.
Figure 26C:
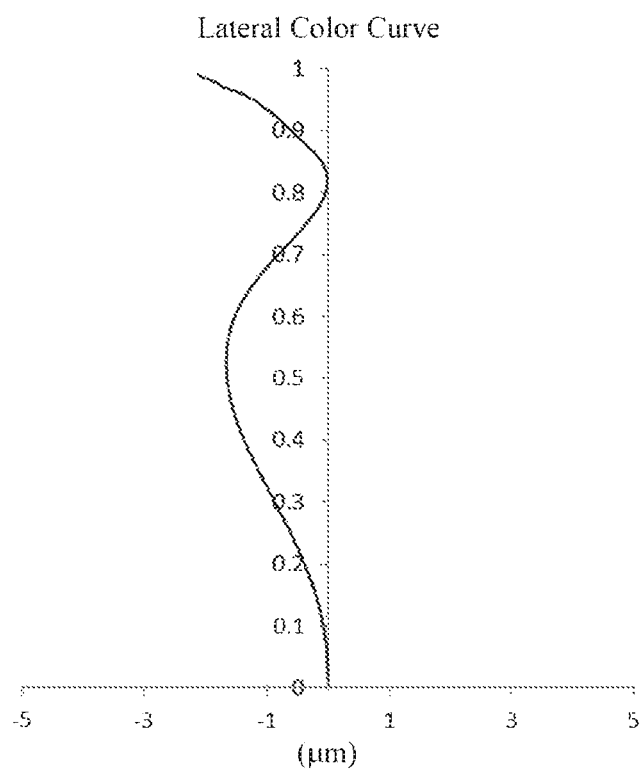
FIG. 26C illustrates a lateral color curve of the camera lens assembly according to Embodiment 13.
Figure 26D:
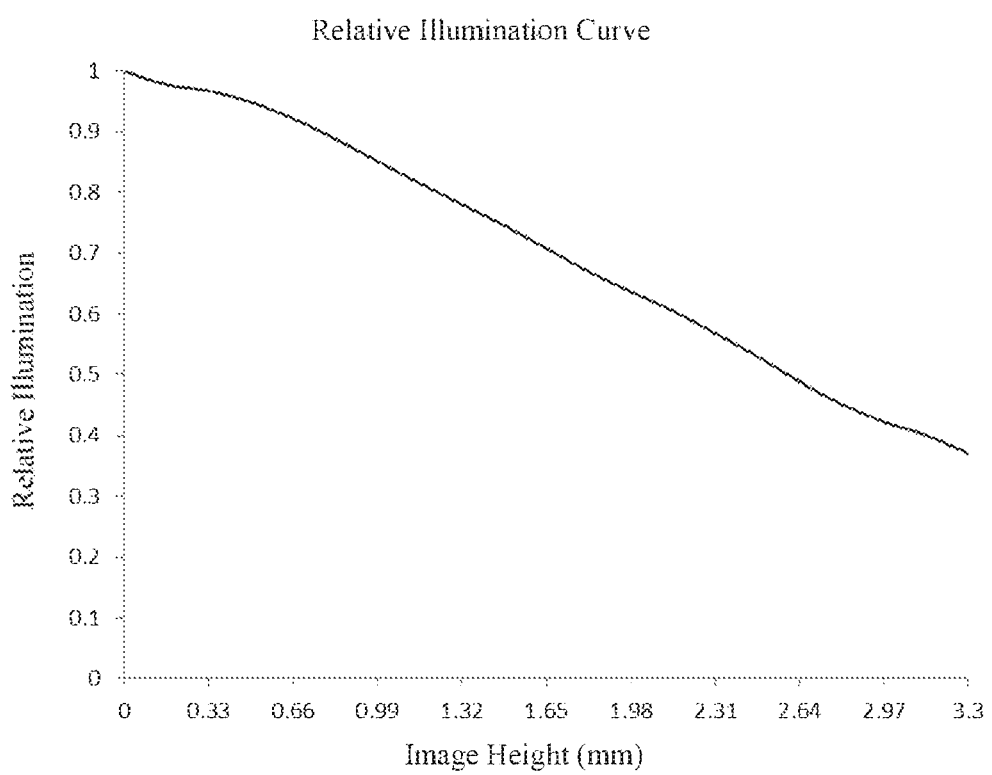
FIG. 26D illustrates a relative illumination curve of the camera lens assembly according to Embodiment 13.

FIG. 26A illustrates an longitudinal aberration curve of the camera lens assembly according to Embodiment 13, representing deviations of focal points of light of different wavelengths converged after passing through an optical system. FIG. 26B illustrates a distortion curve of the camera lens assembly according to Embodiment 13, representing amounts of distortion at different viewing angles. FIG. 26C illustrates a lateral color curve of the camera lens assembly according to Embodiment 13, representing deviations of different image heights on an image plane after light passes through the camera lens assembly. FIG. 26D illustrates a relative illumination curve of the camera lens assembly according to Embodiment 13, representing ratios of central illuminations to peripheral illuminations. It can be seen from FIG. 26A to FIG. 26D that the camera lens assembly provided in Embodiment 13 achieves good image quality.

To sum up, Embodiment 1 to Embodiment 13 respectively satisfy the relations shown in Table 40 below.

TABLE 40

| conditional formula | embodiment | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| f/f56 | 0.03 | 0.02 | −0.04 | −0.01 | −0.21 | −0.19 | −0.02 | −0.09 | −0.03 | −0.01 | −0.29 | −0.23 | −0.23 |
| T23/T12 | 0.12 | 0.12 | 0.08 | 0.16 | 0.15 | 0.17 | 0.18 | 0.18 | 0.18 | 0.13 | 0.04 | 0.13 | 0.13 |
| CT2/CT5 | 0.98 | 0.98 | 1.21 | 1.18 | 0.96 | 0.97 | 0.90 | 1.33 | 1.22 | 1.25 | 0.90 | 1.00 | 0.93 |
| f/f1 | 0.51 | 0.51 | 0.25 | 0.41 | 0.44 | 0.38 | 0.41 | 0.40 | 0.43 | 0.28 | 0.75 | 0.64 | 0.69 |
| f/f23 | 0.27 | 0.27 | 0.61 | 0.42 | 0.27 | 0.34 | 0.41 | 0.49 | 0.40 | 0.57 | 0.15 | 0.13 | 0.04 |
| f12/f3 | −0.58 | −0.58 | −0.53 | −0.54 | −0.64 | −0.67 | −0.59 | −0.55 | −0.60 | −0.53 | −0.28 | −0.58 | −0.60 |
| R12/R9 | 0.32 | 0.32 | 0.33 | 0.33 | 0.28 | 0.28 | 0.33 | 0.24 | 0.26 | 0.33 | 0.23 | 0.18 | 0.15 |
| (R5 − R6)/(R5 + R6) | 0.68 | 0.68 | 0.54 | 0.56 | 0.59 | 0.64 | 0.65 | 0.61 | 0.70 | 0.55 | 0.24 | 0.71 | 0.73 |
| T34/CT4 | 1.20 | 1.20 | 1.26 | 1.17 | 1.14 | 1.19 | 1.24 | 1.18 | 1.29 | 1.20 | 1.04 | 1.23 | 1.16 |
| (R11 − R12)/(R11 + R12) | 0.31 | 0.31 | 0.35 | 0.33 | 0.11 | 0.13 | 0.13 | 0.32 | 0.28 | 0.34 | 0.36 | — | — |
| |f/f4| + |f/f5| | 0.62 | 0.62 | 0.62 | 0.62 | 0.26 | 0.27 | 0.20 | 0.54 | 0.52 | 0.62 | 0.46 | — | — |
| f/EPD | 2.40 | 2.40 | 1.78 | 1.78 | 1.79 | 1.79 | 1.79 | 1.79 | 1.79 | 1.78 | 1.78 | 1.79 | 1.79 |
| TTL/ImgH | 1.65 | 1.65 | 1.57 | 1.55 | 1.52 | 1.52 | 1.52 | 1.50 | 1.52 | 1.56 | 1.54 | 1.50 | 1.50 |

The present application further provides a camera device, having a photosensitive element which may be a photosensitive charge-coupled device (CCD) or complementary metal-oxide semiconductor (CMOS) element. The camera device may be an independent camera device, such as a digital camera, or may be a camera module integrated in a mobile electronic device, such as a mobile phone. The camera device is equipped with the camera lens assembly described above.

Exemplary embodiments of the present application are described above with reference to the accompany drawings. It should be appreciated by those skilled in the art that the above exemplary embodiments are merely examples taken for the purpose of description, rather than the limitation to the scope of the present application. Any modification and equivalent substitution, etc. made within the extent of protection of the teachings and claims of the present application shall be included in the extent of protection of the present application.

What is claimed is:

1. A camera lens assembly, comprising a first lens, a second lens, a third lens, a fourth lens, a fifth lens and a sixth lens arranged in sequence from an object side to an image side along an optical axis,
wherein the first lens has a positive focal power,
the second lens has a positive focal power,
the third lens has a negative focal power, and
the sixth lens has a negative focal power,
wherein a combined focal length f12 of the first lens and the second lens and a focal length f3 of the third lens satisfy: −0.7<f12/f3<0,
wherein a combined focal length f56 of the fifth lens and the sixth lens and a total effective focal length f of the camera lens assembly satisfy: |f/f56|≤0.23.

2. The camera lens assembly according to claim 1, wherein an object-side surface of the first lens is a convex surface, wherein an effective focal length f1 of the first lens satisfies: 0.2<f/f1<0.8.

3. The camera lens assembly according to claim 1, wherein an object-side surface of the second lens and an image-side surface of the second lens are convex surfaces.

4. The camera lens assembly according to claim 1, wherein a combined focal length f23 of the second lens and the third lens satisfies: 0<f/f23<0.65.

5. The camera lens assembly according to claim 1, wherein an axial spacing T23 between the second lens and the third lens and an axial spacing T12 between the first lens and the second lens satisfy: T23/T12<0.2.

6. The camera lens assembly according to claim 1, wherein a radius of curvature R5 of an object-side surface of the third lens and a radius of curvature R6 of an image-side surface of the third lens satisfy: 0<(R5−R6)/(R5+R6)<1.0.

7. The camera lens assembly according to claim 1, wherein an axial spacing T34 between the third lens and the fourth lens and a center thickness CT4 of the fourth lens satisfy: 1.0<T34/CT4<1.5.

8. The camera lens assembly according to claim 1, wherein an entrance pupil diameter EPD of the camera lens assembly satisfies: 1.5<f/EPD≤2.4.

9. The camera lens assembly according to claim 1, wherein an axial distance TTL from the object-side surface of the first lens to an image-side surface of a photosensitive component and ImgH, ImgH being half a diagonal length of an effective pixel area of the photosensitive component, satisfy: TTL/ImgH≤1.65.

10. A camera lens assembly, comprising a first lens, a second lens, a third lens, a fourth lens, a fifth lens and a sixth lens arranged in sequence from an object side to an image side along an optical axis, wherein,
each of the first lens and the second lens has a positive focal power,
the third lens has a negative focal power, and
the sixth lens has a negative focal power,
wherein a total effective focal length f of the camera lens assembly and a combined focal length f23 of the second lens and the third lens satisfies: 0<f/f23<0.65, wherein a combined focal length f56 of the fifth lens and the sixth lens and a total effective focal length f of the camera lens assembly satisfy: |f/f56|≤0.23.

11. The camera lens assembly according to claim 10, wherein an effective focal length f1 of the first lens satisfies: 0.2<f/f1<0.8.

12. The camera lens assembly according to claim 10, wherein an object-side surface of the second lens and an image-side surface of the second lens are convex surfaces.

13. The camera lens assembly according to claim 12, wherein an axial spacing T23 between the second lens and the third lens and an axial spacing T12 between the first lens and the second lens satisfy: T23/T12<0.2.

14. The camera lens assembly according to claim 12, wherein a radius of curvature R5 of an object-side surface of the third lens and a radius of curvature R6 of an image-side surface of the third lens satisfy: 0<(R5−R6)/(R5+R6)<1.0.

15. The camera lens assembly according to claim 10, wherein an object-side surface of the fifth lens is a convex surface at a position near the axis, and an image-side surface of the sixth lens is a concave surface at a position near the axis and an object-side surface of the sixth lens is a convex surface at the position near the axis.

16. The camera lens assembly according to claim 15, wherein a center thickness CT2 of the second lens and a center thickness CT5 of the fifth lens satisfy: 0.8<CT2/CT5<1.5.

17. The camera lens assembly according to claim 15, wherein a radius of curvature R9 of the object-side surface of the fifth lens and a radius of curvature R12 of the image-side surface of the sixth lens satisfy: 0<R12/R9<0.5.

18. The camera lens assembly according to claim 15, wherein a radius of curvature R11 of the object-side surface of the sixth lens and the radius of curvature R12 of the image-side surface of the sixth lens satisfy: 0<(R11−R12)/(R11+R12)<0.5.

19. The camera lens assembly according to claim 15, wherein an effective focal length f4 of the fourth lens and an effective focal length f5 of the fifth lens satisfy: |f/f4|+|f/f5|<1.0.

20. The camera lens assembly according to claim 19, wherein an entrance pupil diameter EPD of the camera lens assembly satisfies: 1.5<f/EPD≤2.4.

21. The camera lens assembly according to claim 10, wherein an axial distance TTL from an object-side surface of the first lens to an image-side surface of a photosensitive component and ImgH, ImgH being half a diagonal length of an effective pixel area of the photosensitive component, satisfy: TTL/ImgH≤1.65.

* * * * *